(12) United States Patent
Haddock

(10) Patent No.: US 11,668,332 B2
(45) Date of Patent: Jun. 6, 2023

(54) MOUNTING DEVICE FOR NAIL STRIP PANELS

(71) Applicant: RMH Tech LLC, Colorado Springs, CO (US)

(72) Inventor: Dustin M. M. Haddock, Colorado Springs, CO (US)

(73) Assignee: RMH TECH LLC, Colorado Springs, CO (US)

( * ) Notice: Subject to any disclaimer, the term of this patent is extended or adjusted under 35 U.S.C. 154(b) by 18 days.

(21) Appl. No.: 17/199,947

(22) Filed: Mar. 12, 2021

(65) Prior Publication Data

US 2021/0199141 A1 Jul. 1, 2021

Related U.S. Application Data

(63) Continuation of application No. 16/714,060, filed on Dec. 13, 2019, now Pat. No. 10,948,002.

(60) Provisional application No. 62/828,913, filed on Apr. 3, 2019, provisional application No. 62/779,789, filed on Dec. 14, 2018.

(51) Int. Cl.
*F16B 2/26* (2006.01)
*F16B 2/06* (2006.01)
*H02S 20/23* (2014.01)

(52) U.S. Cl.
CPC .............. *F16B 2/065* (2013.01); *H02S 20/23* (2014.12)

(58) Field of Classification Search
CPC .. F16B 2/065; F16B 2/10; F16B 5/121; F24S 25/67; H02S 20/23; Y02B 10/10; Y02E 10/50
See application file for complete search history.

(56) References Cited

U.S. PATENT DOCUMENTS

| 42,992 | A | ‡ | 5/1864 | Howe | E04D 13/10 52/25 |
| 97,316 | A | ‡ | 11/1869 | Rogers | E04D 13/10 52/24 |
| 106,580 | A | ‡ | 8/1870 | Hathorn | E04D 13/10 52/25 |
| 189,431 | A | ‡ | 4/1877 | Creighton | E04D 13/10 52/11 |

(Continued)

FOREIGN PATENT DOCUMENTS

AT 13076 ‡ 8/1903
AT 26329 11/1906

(Continued)

OTHER PUBLICATIONS

Merriam-Wester Dictionary, "slot" definition, Aug. 24, 2022, https://www.merriam-webster.com/dictionary/slot (Year: 2022).*

(Continued)

*Primary Examiner* — James M Ference
(74) *Attorney, Agent, or Firm* — Sheridan Ross P.C.

(57) ABSTRACT

A mounting assembly disposable on a nail strip seam rib of a building surface includes a mounting body having an exterior, which in turn comprises a slot configured to separately receive a plurality of different nail strip seam rib profiles. The mounting assembly also includes an insert that is at least partially disposable in the slot, and a threaded fastener that extends through the mounting body, into the slot, and engages the insert.

20 Claims, 19 Drawing Sheets

(56) References Cited

U.S. PATENT DOCUMENTS

| | | | | |
|---|---|---|---|---|
| 224,608 A ‡ | 2/1880 | Rendle | ............... | E04D 3/366 |
| | | | | 52/470 |
| 250,580 A ‡ | 12/1881 | Rogers | ............... | E04D 13/10 |
| | | | | 52/25 |
| 332,413 A ‡ | 12/1885 | List | ............... | E04D 3/366 |
| | | | | 52/466 |
| 386,316 A ‡ | 7/1888 | Hawthorne | ............... | E04D 3/08 |
| | | | | 52/395 |
| 405,605 A ‡ | 6/1889 | Sagendorph | ............... | E04D 3/362 |
| | | | | 52/520 |
| 407,772 A ‡ | 7/1889 | Curtis et al. | ............... | E04D 3/362 |
| | | | | 52/520 |
| 446,217 A ‡ | 2/1891 | Dickelman | ............... | E04D 3/362 |
| | | | | 52/520 |
| 459,876 A ‡ | 9/1891 | Powers | ............... | E04D 13/10 |
| | | | | 52/25 |
| 472,014 A ‡ | 3/1892 | Densmore | ............... | E04D 13/10 |
| | | | | 52/15 |
| 473,512 A ‡ | 4/1892 | Laird | ............... | E04D 13/10 |
| | | | | 52/25 |
| 491,173 A ‡ | 2/1893 | Hayward | ............... | F16B 39/24 |
| | | | | 411/15 |
| 507,776 A ‡ | 10/1893 | Berger et al. | ............... | E04D 13/10 |
| | | | | 52/24 |
| 529,774 A ‡ | 11/1894 | Baird | ............... | E04D 13/10 |
| | | | | 52/25 |
| 602,983 A ‡ | 4/1898 | Folsom | ............... | E04D 13/10 |
| | | | | 52/25 |
| 733,697 A ‡ | 7/1903 | Chronik | ............... | H01R 4/64 |
| | | | | 439/52 |
| 756,884 A ‡ | 4/1904 | Parry | ............... | E04D 13/10 |
| | | | | 52/25 |
| 831,445 A ‡ | 9/1906 | Kosmatka | ............... | B42F 1/06 |
| | | | | 24/563 |
| 881,757 A ‡ | 3/1908 | Winsor | ............... | A45F 5/022 |
| | | | | 24/10 A |
| 884,850 A ‡ | 4/1908 | Peter | ............... | E04D 13/10 |
| | | | | 52/24 |
| 927,522 A ‡ | 7/1909 | Gery | ............... | E04D 13/10 |
| | | | | 52/24 |
| 933,784 A ‡ | 9/1909 | Peter | ............... | E04D 13/10 |
| | | | | 52/24 |
| 939,516 A ‡ | 11/1909 | Laird | ............... | E04D 13/10 |
| | | | | 52/25 |
| 1,054,091 A ‡ | 2/1913 | Darnall | ............... | E04D 13/10 |
| | | | | 248/23 |
| 1,085,474 A ‡ | 1/1914 | Peterson | ............... | E04D 13/10 |
| | | | | 52/15 |
| 1,136,460 A ‡ | 4/1915 | Wright | ............... | E04B 1/4107 |
| | | | | 52/708 |
| 1,230,363 A ‡ | 6/1917 | Baird | ............... | E04D 13/10 |
| | | | | 52/25 |
| 1,330,309 A ‡ | 2/1920 | Dixon | ............... | E04D 13/10 |
| | | | | 52/24 |
| 1,399,461 A ‡ | 12/1921 | Childs | ............... | B60R 1/06 |
| | | | | 248/48 |
| 1,463,065 A ‡ | 7/1923 | Sieger | ............... | E04D 13/10 |
| | | | | 52/24 |
| 1,465,042 A | 8/1923 | Hruska | | |
| 1,477,088 A | 12/1923 | Turner | | |
| 1,511,529 A | 10/1924 | Standlee | | |
| 1,620,428 A ‡ | 3/1927 | Becker | ............... | H01R 4/64 |
| | | | | 191/29 |
| 1,735,927 A | 11/1929 | Shaffer | | |
| 1,735,937 A | 11/1929 | Shaffer | | |
| 1,893,481 A | 1/1933 | Adams | | |
| 1,946,862 A ‡ | 2/1934 | Koch, Jr. | ............... | H01R 4/64 |
| | | | | 439/79 |
| 1,957,933 A | 5/1934 | Brandl | | |
| 2,079,768 A | 5/1937 | Levow | | |
| 2,150,497 A | 3/1939 | Berg | | |
| 2,183,008 A ‡ | 12/1939 | Camp | ............... | E04D 1/34 |
| | | | | 52/716 |
| 2,183,844 A | 12/1939 | Murphy | | |
| 2,192,720 A | 3/1940 | Tapman | | |
| 2,201,320 A | 5/1940 | Place | | |
| 2,250,401 A | 7/1941 | Sylvester | | |
| 2,274,010 A | 2/1942 | Stellin | | |
| 2,340,692 A | 2/1944 | Ridd | | |
| 2,429,833 A | 10/1947 | Luce | | |
| 2,443,362 A | 6/1948 | Tinnerman | | |
| 2,448,752 A | 9/1948 | Wagner | | |
| 2,457,250 A | 12/1948 | Macomber | | |
| 2,472,586 A | 6/1949 | Harvey | | |
| 2,504,776 A | 4/1950 | Woodfield et al. | | |
| 2,525,217 A | 10/1950 | Glitsch | | |
| 2,574,007 A | 11/1951 | Anderson | | |
| 2,658,247 A | 11/1953 | Heuer | | |
| 2,714,037 A | 7/1955 | Singer et al. | | |
| 2,730,381 A | 1/1956 | Curtiss | | |
| 2,740,027 A | 3/1956 | Budd et al. | | |
| 2,808,491 A ‡ | 10/1957 | Rhee | ............... | H01R 4/64 |
| | | | | 200/25 |
| 2,810,173 A | 10/1957 | Bearden | | |
| 2,875,805 A | 3/1959 | Flora | | |
| 2,985,174 A | 5/1961 | Guth | | |
| 3,039,161 A | 6/1962 | Gagnon | | |
| 3,064,772 A | 11/1962 | Clay | | |
| 3,095,672 A | 7/1963 | Di Tullio | | |
| 3,112,016 A | 11/1963 | Peterson | | |
| 3,136,206 A | 6/1964 | Adams | | |
| 3,194,524 A | 7/1965 | Trumbull | | |
| 3,221,467 A | 12/1965 | Henkels | | |
| 3,231,076 A ‡ | 1/1966 | Freiman | ............... | B65D 67/02 |
| | | | | 206/58 |
| 3,232,393 A | 2/1966 | Atwwod | | |
| 3,232,573 A | 2/1966 | Berman | | |
| 3,242,620 A | 3/1966 | Kaiser | | |
| 3,247,316 A ‡ | 4/1966 | Weimer, Jr. | ............... | H01R 11/20 |
| | | | | 174/94 |
| 3,288,409 A | 11/1966 | Bethea, Jr. | | |
| 3,296,750 A | 1/1967 | Zaleski | | |
| 3,298,653 A | 1/1967 | Omholt | | |
| 3,301,513 A | 1/1967 | Masao | | |
| 3,307,235 A | 3/1967 | Hennings | | |
| 3,318,057 A | 5/1967 | Norsworthy | | |
| 3,333,799 A | 8/1967 | Peterson | | |
| 3,335,995 A | 8/1967 | Pickles | | |
| 3,341,909 A ‡ | 9/1967 | Havener | ............... | B25B 5/101 |
| | | | | 24/486 |
| 3,363,864 A | 1/1968 | Olgreen | | |
| 3,394,524 A | 7/1968 | Howarth | | |
| 3,425,127 A | 2/1969 | Long | | |
| 3,482,369 A | 12/1969 | Burke | | |
| 3,495,363 A | 2/1970 | Johnson | | |
| 3,496,691 A | 2/1970 | Seaburg et al. | | |
| 3,503,244 A | 3/1970 | Joslin | | |
| 3,523,709 A | 8/1970 | Heggy et al. | | |
| 3,527,619 A | 9/1970 | Miley | | |
| 3,565,380 A | 2/1971 | Langren | | |
| 3,572,623 A | 3/1971 | Lapp | | |
| 3,590,543 A | 7/1971 | Heirich | | |
| 3,656,747 A | 4/1972 | Revell, Jr. et al. | | |
| 3,667,182 A | 6/1972 | Stemler | | |
| 3,667,185 A | 6/1972 | Maurer | | |
| 3,715,705 A ‡ | 2/1973 | Kuo | ............... | H01R 4/2495 |
| | | | | 439/42 |
| 3,719,919 A | 3/1973 | Tibolla | | |
| 3,753,326 A | 8/1973 | Kaufman, Sr. | | |
| 3,778,537 A | 12/1973 | Miller | | |
| 3,792,560 A | 2/1974 | Naylor | | |
| 3,809,799 A | 5/1974 | Taylor | | |
| 3,810,069 A ‡ | 5/1974 | Jaconette, Jr. | ............... | F16B 37/041 |
| | | | | 439/97 |
| 3,817,270 A | 6/1974 | Ehrens et al. | | |
| 3,824,664 A | 7/1974 | Seeff | | |
| 3,845,601 A | 11/1974 | Kostecky | | |
| 3,861,098 A | 1/1975 | Schaub | | |
| 3,904,161 A | 9/1975 | Scott | | |
| 3,914,001 A | 10/1975 | Nelson et al. | | |

(56) References Cited

U.S. PATENT DOCUMENTS

| | | | |
|---|---|---|---|
| 3,921,253 A | 11/1975 | Nelson | |
| 3,960,352 A | 6/1976 | Plattner et al. | |
| 3,986,746 A | 10/1976 | Chartier | |
| 4,001,474 A | 1/1977 | Hereth | |
| 4,007,574 A | 2/1977 | Riddell | |
| 4,018,538 A | 4/1977 | Smyrni et al. | |
| 4,034,532 A ‡ | 7/1977 | Reinwall, Jr. | E04D 3/362 52/520 |
| 4,051,289 A | 9/1977 | Adamson | |
| 4,127,975 A | 12/1978 | Judkins | |
| 4,130,970 A | 12/1978 | Cable | |
| 4,141,182 A | 2/1979 | McMullen | |
| 4,147,257 A | 4/1979 | Zippel | |
| 4,162,595 A | 7/1979 | Ramos et al. | |
| 4,162,755 A | 7/1979 | Bott | |
| 4,189,882 A | 2/1980 | Harrison et al. | |
| 4,189,891 A | 2/1980 | Johnson et al. | |
| 4,200,107 A | 4/1980 | Reid | |
| 4,203,646 A | 5/1980 | Desso et al. | |
| 4,215,677 A | 8/1980 | Erickson | |
| 4,223,053 A | 9/1980 | Brogan | |
| 4,252,458 A | 2/1981 | Keen | |
| 4,261,338 A | 4/1981 | McAlister | |
| 4,261,384 A | 4/1981 | Dahlbring | |
| 4,263,474 A ‡ | 4/1981 | Tennant | H01R 12/67 174/84 |
| 4,270,721 A | 6/1981 | Mainor, Jr. | |
| 4,291,934 A ‡ | 9/1981 | Kund | H01R 4/646 439/42 |
| 4,307,976 A | 12/1981 | Butler | |
| 4,321,416 A | 3/1982 | Tennant | |
| 4,351,140 A | 9/1982 | Simpson | |
| 4,358,916 A | 11/1982 | Lacasse | |
| 4,366,656 A | 1/1983 | Simpson | |
| 4,393,859 A | 7/1983 | Marossy et al. | |
| 4,449,335 A | 5/1984 | Fahey | |
| 4,456,321 A | 6/1984 | Jones et al. | |
| 4,461,514 A | 7/1984 | Schwarz | |
| 4,467,582 A | 8/1984 | Hague | |
| 4,475,776 A | 10/1984 | Teramachi | |
| 4,546,586 A | 10/1985 | Knudson | |
| 4,560,224 A ‡ | 12/1985 | Weisenburger | H01R 4/2495 439/42 |
| 4,567,706 A | 2/1986 | Wendt | |
| 4,570,405 A | 2/1986 | Knudson | |
| 4,588,240 A ‡ | 5/1986 | Ruehl | H01R 31/08 439/51 |
| 4,593,877 A | 6/1986 | van der Wyk | |
| 4,601,600 A | 7/1986 | Karlsson | |
| 4,656,794 A | 4/1987 | Thevenin et al. | |
| 4,666,116 A | 5/1987 | Lloyd | |
| 4,674,252 A | 6/1987 | Nicholas et al. | |
| 4,682,454 A | 7/1987 | Simpson | |
| 4,686,809 A | 8/1987 | Skelton | |
| 4,701,586 A | 10/1987 | Berg | |
| 4,704,058 A | 11/1987 | Crunwell | |
| 4,753,425 A ‡ | 6/1988 | Yang | B25B 5/003 269/24 |
| 4,773,791 A | 9/1988 | Hartkorn | |
| 4,782,642 A | 11/1988 | Conville | |
| 4,799,444 A | 1/1989 | Lisowski | |
| 4,805,364 A | 2/1989 | Smolik | |
| 4,809,476 A | 3/1989 | Satchell | |
| 4,810,573 A | 3/1989 | Harriett | |
| 4,835,927 A | 6/1989 | Michlovic | |
| 4,840,529 A | 6/1989 | Phillips | |
| 4,848,858 A | 7/1989 | Suzuki | |
| 4,854,096 A | 8/1989 | Smolik | |
| 4,878,331 A | 11/1989 | Taylor | |
| 4,895,338 A | 1/1990 | Froutzis | |
| 4,901,963 A | 2/1990 | Yoder | |
| 4,905,444 A | 3/1990 | Semaan | |
| 4,909,011 A | 3/1990 | Freeman et al. | |
| 4,949,929 A | 8/1990 | Kesselman et al. | |
| 4,961,712 A | 10/1990 | Schwenk et al. | |
| 4,970,833 A | 11/1990 | Porter | |
| 4,987,699 A | 1/1991 | Gold | |
| 4,991,368 A | 2/1991 | Amstutz | |
| 5,007,612 A | 4/1991 | Manfre | |
| 5,019,111 A | 5/1991 | Dempsey et al. | |
| 5,036,949 A | 8/1991 | Crocker et al. | |
| 5,039,352 A | 8/1991 | Mueller | |
| 5,092,939 A | 3/1992 | Nath et al. | |
| 5,094,435 A | 3/1992 | Depperman | |
| 5,118,571 A | 6/1992 | Petersen | |
| 5,119,612 A | 6/1992 | Taylor et al. | |
| 5,125,608 A | 6/1992 | McMaster et al. | |
| 5,127,205 A | 7/1992 | Eidson | |
| 5,138,820 A | 8/1992 | Pearce | |
| 5,140,793 A | 8/1992 | Knudson | |
| 5,152,107 A | 10/1992 | Strickert | |
| 5,164,020 A | 11/1992 | Wagner et al. | |
| 5,176,462 A | 1/1993 | Chen | |
| 5,187,911 A | 2/1993 | Cotter | |
| 5,213,300 A | 5/1993 | Rees | |
| 5,222,340 A | 6/1993 | Bellem | |
| 5,224,427 A | 7/1993 | Riches et al. | |
| 5,228,248 A | 7/1993 | Haddock | |
| 5,251,993 A | 10/1993 | Sigourney | |
| 5,268,038 A | 12/1993 | Riermeier et al. | |
| 5,271,194 A | 12/1993 | Drew | |
| 5,277,006 A | 1/1994 | Ruster | |
| 5,282,340 A | 2/1994 | Cline et al. | |
| 5,287,670 A | 2/1994 | Funaki | |
| 5,290,366 A ‡ | 3/1994 | Riermeier | H01L 31/048 136/24 |
| 5,307,601 A | 5/1994 | McCracken | |
| 5,312,079 A | 5/1994 | Little, Jr. | |
| 5,313,752 A | 5/1994 | Hatzinikolas | |
| D347,701 S | 6/1994 | McCracken | |
| 5,352,154 A | 10/1994 | Rotter et al. | |
| 5,356,519 A | 10/1994 | Grabscheid et al. | |
| 5,356,705 A | 10/1994 | Kelch et al. | |
| D351,989 S | 11/1994 | Cline et al. | |
| 5,363,615 A | 11/1994 | Christopher et al. | |
| 5,363,624 A | 11/1994 | Cotter | |
| 5,379,567 A | 1/1995 | Vahey | |
| 5,390,453 A | 2/1995 | Untiedt | |
| 5,392,574 A | 2/1995 | Sayers | |
| 5,408,797 A | 4/1995 | Bellem | |
| 5,409,549 A | 4/1995 | Mori | |
| 5,413,063 A | 5/1995 | King | |
| 5,413,397 A | 5/1995 | Gold | |
| 5,417,028 A | 5/1995 | Meyer | |
| 5,425,209 A | 6/1995 | Funaki | |
| 5,426,906 A | 6/1995 | McCracken | |
| 5,439,307 A | 8/1995 | Steinhilber | |
| 5,453,027 A | 9/1995 | Buell et al. | |
| D364,338 S | 11/1995 | Cline | |
| 5,479,752 A | 1/1996 | Menegoli | |
| 5,482,234 A | 1/1996 | Lyon | |
| 5,483,772 A | 1/1996 | Haddock | |
| 5,483,782 A | 1/1996 | Hall | |
| 5,491,931 A | 2/1996 | Haddock | |
| 5,497,591 A | 3/1996 | Nelson | |
| 5,522,185 A | 6/1996 | Cline | |
| 5,533,839 A | 7/1996 | Shimada | |
| D372,421 S | 8/1996 | Cline | |
| 5,557,903 A | 9/1996 | Haddock | |
| 5,571,338 A | 11/1996 | Kadonome et al. | |
| 5,596,858 A | 1/1997 | Jordan | |
| 5,596,859 A | 1/1997 | Horton et al. | |
| 5,598,785 A | 2/1997 | Zaguroli, Jr. | |
| 5,600,971 A ‡ | 2/1997 | Suk | E04D 3/3608 52/470 |
| D378,343 S | 3/1997 | Macor | |
| 5,609,326 A | 3/1997 | Stearns et al. | |
| 5,613,328 A | 3/1997 | Alley | |
| 5,640,812 A | 6/1997 | Crowley et al. | |
| 5,647,178 A | 7/1997 | Cline | |
| 5,660,008 A | 8/1997 | Bevilacqua | |
| 5,664,750 A | 9/1997 | Cohen | |

(56) References Cited

U.S. PATENT DOCUMENTS

| | | | |
|---|---|---|---|
| 5,667,181 A ‡ | 9/1997 | van Leeuwen | E04B 9/18 |
| | | | 248/34 |
| 5,681,191 A | 10/1997 | Robicheau et al. | |
| 5,688,131 A ‡ | 11/1997 | Byfield, Jr. | H01R 4/64 |
| | | | 439/88 |
| D387,443 S | 12/1997 | Blankenbiller | |
| 5,694,721 A | 12/1997 | Haddock | |
| 5,697,197 A | 12/1997 | Simpson | |
| 5,715,640 A | 2/1998 | Haddock | |
| 5,732,513 A | 3/1998 | Alley | |
| 5,743,063 A | 4/1998 | Boozer | |
| 5,743,497 A | 4/1998 | Michael | |
| 5,746,029 A | 5/1998 | Ullman | |
| 5,755,824 A | 5/1998 | Blechschmidt et al. | |
| 5,765,310 A | 6/1998 | Gold | |
| 5,765,329 A | 6/1998 | Huang | |
| 5,787,653 A | 8/1998 | Sakai et al. | |
| 5,794,386 A | 8/1998 | Klein | |
| 5,809,703 A | 9/1998 | Kelly | |
| 5,826,379 A | 10/1998 | Curry | |
| 5,826,390 A | 10/1998 | Sacks | |
| 5,828,008 A | 10/1998 | Lockwood et al. | |
| 5,829,723 A | 11/1998 | Brunner et al. | |
| 5,842,318 A | 12/1998 | Bass et al. | |
| 5,890,340 A | 4/1999 | Rowski | |
| 5,897,088 A | 4/1999 | Kirschner | |
| 5,901,507 A | 5/1999 | Smeja et al. | |
| 5,942,046 A | 8/1999 | Kahlfuss et al. | |
| 5,970,586 A | 10/1999 | Demel et al. | |
| 5,983,588 A | 11/1999 | Haddock | |
| 5,994,640 A | 11/1999 | Bansemir et al. | |
| 5,997,368 A | 12/1999 | Mello et al. | |
| 6,029,415 A | 2/2000 | Culpepper et al. | |
| 6,073,410 A | 6/2000 | Schimpf et al. | |
| 6,073,920 A | 6/2000 | Colley | |
| 6,079,678 A | 6/2000 | Schott et al. | |
| 6,083,010 A ‡ | 7/2000 | Daoud | E05D 11/0081 |
| | | | 439/31 |
| 6,088,979 A | 7/2000 | Neal | |
| 6,095,462 A | 8/2000 | Morgan | |
| 6,099,203 A | 8/2000 | Landes | |
| 6,105,317 A | 8/2000 | Tomiuchi et al. | |
| 6,106,310 A | 8/2000 | Davis et al. | |
| 6,111,189 A | 8/2000 | Garvison et al. | |
| 6,119,317 A | 9/2000 | Pfister | |
| 6,132,070 A | 10/2000 | Vosika et al. | |
| 6,158,180 A | 12/2000 | Edwards | |
| 6,164,033 A | 12/2000 | Haddock | |
| 6,182,403 B1 | 2/2001 | Mimura et al. | |
| 6,186,799 B1 ‡ | 2/2001 | Mello | H01R 4/64 |
| | | | 238/14 |
| 6,206,991 B1 | 3/2001 | Starr | |
| 6,223,477 B1 | 5/2001 | Alley | |
| 6,237,297 B1 | 5/2001 | Paroly | |
| 6,253,496 B1 | 7/2001 | Gilchrist | |
| 6,256,934 B1 | 7/2001 | Alley | |
| 6,269,596 B1 | 8/2001 | Ohtsuka et al. | |
| 6,276,285 B1 | 8/2001 | Ruch | |
| 6,320,114 B1 ‡ | 11/2001 | Kuechler | H01L 31/043 |
| | | | 136/24 |
| 6,336,616 B1 | 1/2002 | Lin | |
| 6,360,491 B1 | 3/2002 | Ullman | |
| 6,364,262 B1 | 4/2002 | Gibson et al. | |
| 6,364,374 B1 | 4/2002 | Noone et al. | |
| 6,370,828 B1 | 4/2002 | Genschorek | |
| 6,382,569 B1 | 5/2002 | Schattner et al. | |
| 6,385,914 B2 | 5/2002 | Alley | |
| 6,393,796 B1 | 5/2002 | Goettl et al. | |
| 6,443,680 B1 ‡ | 9/2002 | Bodin | F16B 23/0038 |
| | | | 411/37 |
| 6,453,623 B1 | 9/2002 | Nelson et al. | |
| 6,470,629 B1 | 10/2002 | Haddock | |
| 6,497,080 B1 | 12/2002 | Malcolm | |
| 6,499,259 B1 | 12/2002 | Hockman | |
| 6,508,442 B1 | 1/2003 | Dolez | |
| 6,521,821 B2 | 2/2003 | Makita et al. | |
| 6,534,702 B1 ‡ | 3/2003 | Makita | F24S 25/20 |
| | | | 136/24 |
| 6,536,166 B1 ‡ | 3/2003 | Alley | E04D 13/10 |
| | | | 411/43 |
| 6,536,729 B1 | 3/2003 | Haddock | |
| 6,576,830 B2 | 6/2003 | Nagao et al. | |
| 6,602,016 B2 | 8/2003 | Eckart et al. | |
| 6,622,441 B2 | 9/2003 | Miller | |
| 6,637,671 B2 | 10/2003 | Alley | |
| 6,647,671 B1 ‡ | 11/2003 | Alley | E04D 13/10 |
| | | | 52/24 |
| 6,655,633 B1 | 12/2003 | Chapman, Jr. | |
| 6,665,991 B2 | 12/2003 | Hasan | |
| 6,688,047 B1 | 2/2004 | McNichol | |
| D487,595 S | 3/2004 | Sherman | |
| 6,715,256 B1 | 4/2004 | Fischer | |
| 6,718,718 B2 | 4/2004 | Haddock | |
| 6,725,623 B1 | 4/2004 | Riddell et al. | |
| 6,730,841 B2 | 5/2004 | Heckeroth | |
| 6,732,982 B1 | 5/2004 | Messinger | |
| 6,751,919 B2 | 6/2004 | Calixto | |
| D495,595 S | 9/2004 | Dressier | |
| D496,738 S | 9/2004 | Sherman | |
| 6,799,742 B2 | 10/2004 | Nakamura et al. | |
| 6,834,466 B2 | 12/2004 | Trevorrow et al. | |
| 6,918,217 B2 | 7/2005 | Jakob-Bamberg et al. | |
| 6,918,727 B2 | 7/2005 | Huang | |
| 6,922,948 B2 | 8/2005 | Smeja et al. | |
| 6,967,278 B2 | 11/2005 | Hatsukaiwa et al. | |
| 7,012,188 B2 | 3/2006 | Erling | |
| 7,013,612 B2 | 3/2006 | Haddock | |
| 7,063,763 B2 | 6/2006 | Chapman, Jr. | |
| 7,100,338 B2 | 9/2006 | Haddock | |
| 7,104,020 B1 | 9/2006 | Suttle | |
| 7,127,852 B1 | 10/2006 | Dressier | |
| 7,191,794 B2 | 3/2007 | Hodges | |
| 7,195,513 B1 | 3/2007 | Gherardini | |
| 7,219,863 B1 | 5/2007 | Collett, II | |
| 7,240,770 B2 | 7/2007 | Mullins et al. | |
| 7,260,918 B2 | 8/2007 | Liebendorfer | |
| 7,281,695 B2 | 10/2007 | Jordan | |
| 7,386,922 B1 | 6/2008 | Taylor et al. | |
| 7,406,924 B1 | 8/2008 | Impey | |
| 7,410,139 B1 | 8/2008 | Rorich | |
| 7,431,252 B2 | 10/2008 | Birli et al. | |
| 7,435,134 B2 | 10/2008 | Lenox | |
| 7,451,573 B2 | 11/2008 | Orszulak et al. | |
| 7,458,555 B2 | 12/2008 | Mastropaolo et al. | |
| 7,459,196 B2 | 12/2008 | Sturm | |
| 7,469,511 B2 | 12/2008 | Wobber | |
| 7,493,730 B2 | 2/2009 | Fennell, Jr. | |
| 7,513,080 B1 | 4/2009 | Showalter | |
| 7,516,580 B2 | 4/2009 | Fennell, Jr. | |
| 7,568,871 B2 ‡ | 8/2009 | Chopp, Jr. | F16B 5/0275 |
| | | | 411/38 |
| 7,578,711 B2 | 8/2009 | Robinson | |
| 7,600,349 B2 | 10/2009 | Liebendorfer | |
| 7,658,356 B1 | 2/2010 | Nehls | |
| 7,686,625 B1 | 3/2010 | Dyer et al. | |
| 7,703,256 B2 | 4/2010 | Haddock | |
| 7,707,800 B2 | 5/2010 | Kannisto | |
| 7,712,278 B2 | 5/2010 | Lonardi | |
| 7,721,492 B2 ‡ | 5/2010 | Plaisted | F24S 40/44 |
| | | | 52/173 |
| 7,731,138 B2 | 6/2010 | Wiesner et al. | |
| 7,733,667 B2 | 6/2010 | Qin et al. | |
| 7,758,003 B2 | 7/2010 | Pourtier et al. | |
| 7,758,011 B2 | 7/2010 | Haddock | |
| 7,762,027 B1 | 7/2010 | Wentworth et al. | |
| 7,766,292 B2 | 8/2010 | Liebendorfer | |
| 7,780,472 B2 | 8/2010 | Lenox | |
| 7,788,874 B2 | 9/2010 | Miller | |
| 7,788,879 B2 | 9/2010 | Brandes et al. | |
| 7,824,191 B1 | 11/2010 | Browder | |
| 7,827,920 B2 | 11/2010 | Beck et al. | |
| 7,845,127 B2 | 12/2010 | Brescia | |
| 7,847,181 B2 | 12/2010 | Brescia | |

(56) References Cited

U.S. PATENT DOCUMENTS

| | | |
|---|---|---|
| 7,861,480 B2 | 1/2011 | Wendelburg et al. |
| 7,861,485 B1 | 1/2011 | Wentworth et al. |
| 7,874,117 B1 | 1/2011 | Simpson |
| 7,891,618 B2 | 2/2011 | Carnevali |
| 7,895,808 B1 | 3/2011 | Wentworth et al. |
| 7,905,064 B1 | 3/2011 | Wentworth et al. |
| 7,915,519 B2 | 3/2011 | Kobayashi |
| 7,926,777 B2 | 4/2011 | Koesema, Jr. |
| 7,954,287 B2 | 6/2011 | Bravo et al. |
| 7,976,257 B2 | 7/2011 | Kufner et al. |
| 7,988,464 B2 | 8/2011 | Kossak et al. |
| 8,011,153 B2 | 9/2011 | Orchard |
| 8,066,200 B2 | 11/2011 | Hepner et al. |
| 8,070,119 B2 | 12/2011 | Taylor |
| 8,092,129 B2 | 1/2012 | Wiley et al. |
| 8,096,503 B2 | 1/2012 | Verweyen |
| 8,109,048 B2 | 2/2012 | West |
| 8,146,299 B2 | 4/2012 | Stearns et al. |
| 8,151,522 B2 | 4/2012 | Stearns et al. |
| 8,153,700 B2 | 4/2012 | Stearns et al. |
| D658,977 S | 5/2012 | Riddell et al. |
| 8,226,061 B2 | 7/2012 | Nehls |
| 8,251,326 B2 | 8/2012 | McPheeters |
| 8,272,172 B2 | 9/2012 | Li |
| 8,294,026 B2 | 10/2012 | Wang et al. |
| 8,312,678 B1 | 11/2012 | Haddock |
| 8,316,590 B2 | 11/2012 | Cusson |
| 8,316,621 B2 | 11/2012 | Safari Kermanshahi et al. |
| D674,513 S | 1/2013 | Liu |
| 8,344,239 B2 | 1/2013 | Plaisted |
| 8,347,572 B2 | 1/2013 | Piedmont |
| 8,375,654 B1 | 2/2013 | West et al. |
| 8,387,319 B1 | 3/2013 | Gilles-Gagnon et al. |
| 8,404,963 B2 ‡ | 3/2013 | Kobayashi ............... F24S 25/61 136/24 |
| 8,407,895 B2 | 4/2013 | Hartelius et al. |
| 8,413,946 B2 ‡ | 4/2013 | Hartelius ................ F24S 25/40 248/50 |
| 8,424,821 B2 | 4/2013 | Liu |
| 8,430,372 B2 | 4/2013 | Haddock |
| 8,448,405 B2 | 5/2013 | Schaefer et al. |
| 8,453,986 B2 | 6/2013 | Schnitzer |
| 8,458,967 B2 | 6/2013 | Kalkanoglu et al. |
| 8,495,997 B1 | 7/2013 | Laubach |
| 8,505,254 B2 | 8/2013 | Welter et al. |
| 8,528,888 B2 | 9/2013 | Header |
| 8,584,424 B2 | 11/2013 | Smith |
| 8,590,223 B2 | 11/2013 | Kilgore et al. |
| 8,627,617 B2 | 1/2014 | Haddock et al. |
| 8,627,632 B2 | 1/2014 | Werner et al. |
| D699,176 S | 2/2014 | Salomon et al. |
| 8,640,402 B1 | 2/2014 | Bilge |
| 8,656,649 B2 | 2/2014 | Haddock |
| 8,683,751 B2 | 4/2014 | Stearns |
| 8,695,290 B1 | 4/2014 | Kim et al. |
| 8,701,354 B2 | 4/2014 | Stearns et al. |
| 8,713,881 B2 | 5/2014 | DuPont et al. |
| 8,733,027 B1 | 5/2014 | Marston et al. |
| 8,745,935 B2 | 6/2014 | DuPont et al. |
| 8,752,338 B2 | 6/2014 | Schaefer et al. |
| 8,756,870 B2 | 6/2014 | Teller et al. |
| 8,770,885 B2 | 7/2014 | Myers |
| 8,776,456 B1 | 7/2014 | Schrock |
| 8,782,983 B2 | 7/2014 | Stearns |
| 8,791,611 B2 | 7/2014 | Arnould et al. |
| 8,806,813 B2 ‡ | 8/2014 | Plaisted ................ F24S 25/35 52/173 |
| 8,806,815 B1 | 8/2014 | Liu et al. |
| 8,813,441 B2 | 8/2014 | Rizzo |
| 8,826,163 B1 | 9/2014 | Chanin et al. |
| 8,826,618 B2 | 9/2014 | Stearns |
| 8,829,330 B2 | 9/2014 | Meyer et al. |
| 8,833,714 B2 | 9/2014 | Haddock et al. |
| 8,839,573 B2 | 9/2014 | Cusson et al. |
| 8,839,575 B1 | 9/2014 | Liu et al. |
| 8,844,234 B2 | 9/2014 | Haddock et al. |
| 8,850,754 B2 | 10/2014 | Rizzo |
| 8,854,829 B1 | 10/2014 | Bopp et al. |
| 8,888,431 B2 | 11/2014 | Haney |
| 8,893,441 B1 ‡ | 11/2014 | Hess, III .................. E04B 1/26 52/92 |
| 8,894,424 B2 | 11/2014 | DuPont |
| D718,703 S | 12/2014 | Rizzo |
| D718,704 S | 12/2014 | Rizzo |
| 8,910,928 B2 | 12/2014 | Header |
| 8,920,586 B2 | 12/2014 | Poulakis |
| 8,935,893 B2 | 1/2015 | Liu et al. |
| 8,938,932 B1 | 1/2015 | Wentworth et al. |
| 8,950,157 B1 | 2/2015 | Schrock |
| 8,955,259 B2 | 2/2015 | Hemingway |
| 8,966,833 B2 | 3/2015 | Ally |
| 8,991,065 B1 | 3/2015 | Schrock |
| 9,003,728 B2 | 4/2015 | Asci |
| 9,003,733 B1 ‡ | 4/2015 | Simpson ................ E04B 7/20 52/478 |
| 9,010,042 B2 | 4/2015 | Anderson et al. |
| 9,011,034 B2 | 4/2015 | Liu |
| 9,052,123 B2 | 6/2015 | Anderson et al. |
| 9,065,191 B2 | 6/2015 | Martin et al. |
| 9,076,899 B2 | 7/2015 | Schrock |
| 9,097,443 B2 | 8/2015 | Liu et al. |
| 9,127,451 B1 | 9/2015 | Boor |
| 9,134,044 B2 | 9/2015 | Stearns et al. |
| D740,113 S | 10/2015 | Olenick |
| 9,175,878 B2 | 11/2015 | Kemmer et al. |
| 9,194,130 B1 | 11/2015 | Stanley |
| 9,200,456 B2 | 12/2015 | Murphy |
| 9,222,263 B2 | 12/2015 | Haddock |
| 9,223,907 B2 | 12/2015 | Chanin et al. |
| 9,306,490 B2 | 4/2016 | Haddock et al. |
| 9,309,910 B2 | 4/2016 | Anderson et al. |
| 9,331,629 B2 | 5/2016 | Cheung et al. |
| 9,341,285 B2 | 5/2016 | Magno, Jr. et al. |
| 9,447,988 B2 | 9/2016 | Stearns et al. |
| 9,473,066 B2 | 10/2016 | Stehan et al. |
| 9,479,110 B2 | 10/2016 | Patton et al. |
| 9,496,697 B1 | 11/2016 | Wentworth |
| 9,534,390 B2 | 1/2017 | Pendley et al. |
| 9,608,559 B2 | 3/2017 | Haddock et al. |
| 9,647,433 B2 | 5/2017 | Meine |
| 9,647,607 B2 | 5/2017 | Patton et al. |
| 9,689,411 B2 | 6/2017 | Meine et al. |
| 9,712,106 B2 | 7/2017 | Wentworth et al. |
| 9,714,670 B2 | 7/2017 | Header |
| 9,722,532 B2 | 8/2017 | Almy |
| 9,732,512 B2 | 8/2017 | Haddock |
| 9,742,173 B2 | 8/2017 | Wentworth |
| 9,755,572 B2 | 9/2017 | Wentworth et al. |
| D800,055 S | 10/2017 | Rothschild |
| 9,813,012 B2 | 11/2017 | Wentworth et al. |
| 9,819,303 B2 | 11/2017 | Ash |
| 9,831,817 B2 | 11/2017 | Rothschild |
| 9,845,584 B1 | 12/2017 | Goldammer |
| 9,850,661 B2 | 12/2017 | Kovacs |
| 9,853,593 B2 | 12/2017 | Cinnamon et al. |
| 9,865,938 B2 | 1/2018 | Meine et al. |
| 9,876,463 B2 | 1/2018 | Jasmin |
| 9,893,676 B2 | 2/2018 | Anderson et al. |
| 9,893,677 B1 | 2/2018 | Liu |
| 9,920,958 B2 | 3/2018 | Haddock et al. |
| 9,926,706 B2 | 3/2018 | Hockman |
| 9,966,745 B2 | 5/2018 | Wentworth |
| 9,985,575 B2 | 5/2018 | Stearns et al. |
| 10,036,414 B2 | 7/2018 | Wiley et al. |
| D827,160 S | 8/2018 | Menton |
| 10,053,856 B2 | 8/2018 | Haddock |
| 10,054,336 B2 | 8/2018 | Haddock et al. |
| D827,873 S | 9/2018 | Menton |
| D827,874 S | 9/2018 | Menton |
| 10,077,562 B2 | 9/2018 | Haddock et al. |
| 10,103,682 B2 | 10/2018 | Haddock et al. |
| 10,103,683 B2 | 10/2018 | Wentworth |
| 10,106,987 B2 | 10/2018 | Haddock et al. |
| 10,141,662 B2 | 11/2018 | Bernard et al. |

(56) References Cited

U.S. PATENT DOCUMENTS

| | | |
|---|---|---|
| 10,186,791 B2 | 1/2019 | Meine et al. |
| 10,202,991 B2 | 2/2019 | Lewis |
| 10,205,418 B2 | 2/2019 | Nayar |
| 10,211,773 B2 | 2/2019 | Jasmin et al. |
| 10,211,775 B1 | 2/2019 | Wentworth et al. |
| 10,218,305 B1 | 2/2019 | Schrock |
| 10,291,176 B2 | 5/2019 | Wentworth et al. |
| 10,312,855 B2 | 6/2019 | Lester et al. |
| 10,337,764 B2 | 7/2019 | Ash et al. |
| 10,359,069 B2 | 7/2019 | Ash et al. |
| 10,385,573 B2 | 8/2019 | Van Leuven |
| 10,454,190 B1 | 10/2019 | Martin |
| 10,472,828 B2 | 11/2019 | Stearns et al. |
| 10,502,457 B2 | 12/2019 | Haddock et al. |
| 10,511,252 B2 | 12/2019 | Wentworth et al. |
| 10,530,293 B2 | 1/2020 | Legall et al. |
| 10,551,090 B2 ‡ | 2/2020 | De Vogel ............ F24S 25/613 |
| 10,594,251 B2 ‡ | 3/2020 | Stearns .............. E04D 13/147 |
| 10,622,935 B1 | 4/2020 | Liu |
| 10,634,175 B2 | 4/2020 | Haddock |
| 10,644,643 B2 | 5/2020 | Stearns et al. |
| 10,673,151 B2 | 6/2020 | Ash et al. |
| 10,686,401 B2 | 6/2020 | Ash et al. |
| 10,731,355 B2 | 8/2020 | Haddock et al. |
| 10,749,459 B1 | 8/2020 | Liu et al. |
| 10,749,466 B2 | 8/2020 | Smeja |
| 10,763,777 B2 | 9/2020 | Stearns et al. |
| 10,797,634 B1 | 10/2020 | Jasmin et al. |
| 10,837,476 B2 | 11/2020 | Lewis |
| 10,851,826 B2 | 12/2020 | Ash et al. |
| 10,859,292 B2 | 12/2020 | Haddock et al. |
| 10,868,491 B2 | 12/2020 | Wentworth et al. |
| D909,853 S | 2/2021 | Jasmin |
| 10,931,225 B2 | 2/2021 | Yang et al. |
| 10,948,002 B2 * | 3/2021 | Haddock ............... F16B 2/10 |
| 11,009,262 B2 | 5/2021 | Ash et al. |
| 11,012,023 B2 | 5/2021 | Stearns et al. |
| D923,203 S | 6/2021 | Muther |
| D923,823 S | 6/2021 | Muther |
| 11,035,126 B2 | 6/2021 | Haddock et al. |
| 11,118,353 B2 | 9/2021 | Stearns et al. |
| 11,121,484 B2 | 9/2021 | Ash et al. |
| 11,121,669 B2 | 9/2021 | Stearns et al. |
| 11,139,773 B2 | 10/2021 | Eriksson |
| 11,139,774 B2 | 10/2021 | Wentworth et al. |
| 11,189,941 B2 | 11/2021 | Ash et al. |
| 11,196,187 B2 | 12/2021 | Ash et al. |
| 11,201,581 B2 | 12/2021 | Stearns et al. |
| 11,296,648 B1 | 4/2022 | Jasmin et al. |
| 11,368,005 B2 | 6/2022 | Meine et al. |
| 2002/0026765 A1 | 3/2002 | Vahey |
| 2002/0088196 A1 | 7/2002 | Haddock |
| 2003/0015637 A1 | 1/2003 | Liebendorfer |
| 2003/0062078 A1 | 4/2003 | Mimura |
| 2003/0070368 A1 | 4/2003 | Shingleton |
| 2003/0131551 A1 | 7/2003 | Mollinger et al. |
| 2003/0146346 A1 | 8/2003 | Chapman, Jr. |
| 2003/0173460 A1 | 9/2003 | Chapman, Jr. |
| 2003/0201009 A1 | 10/2003 | Nakajima et al. |
| 2004/0035065 A1 | 2/2004 | Orszulak et al. |
| 2004/0055233 A1 | 3/2004 | Showalter |
| 2004/0164208 A1 | 8/2004 | Nielson et al. |
| 2004/0231949 A1 | 11/2004 | Le et al. |
| 2004/0237465 A1 | 12/2004 | Refond |
| 2005/0102958 A1 | 5/2005 | Anderson |
| 2005/0115176 A1 | 6/2005 | Russell |
| 2005/0117997 A1 | 6/2005 | Pinzl |
| 2005/0210769 A1 | 9/2005 | Harvey |
| 2005/0257434 A1 | 11/2005 | Hockman |
| 2006/0065805 A1 | 3/2006 | Barton et al. |
| 2006/0075691 A1 | 4/2006 | Verkamp |
| 2006/0096061 A1 | 5/2006 | Weiland et al. |
| 2006/0118163 A1 | 6/2006 | Plaisted et al. |
| 2006/0174571 A1 | 8/2006 | Panasik et al. |
| 2006/0174931 A1 | 8/2006 | Mapes et al. |
| 2006/0254192 A1 | 11/2006 | Fennell, Jr. |
| 2007/0075198 A1 | 4/2007 | Foser |
| 2007/0131273 A1 | 6/2007 | Kobayashi |
| 2007/0199590 A1 | 8/2007 | Tanaka et al. |
| 2007/0241238 A1 | 10/2007 | Neace |
| 2007/0246039 A1 | 10/2007 | Brazier et al. |
| 2007/0248434 A1 | 10/2007 | Wiley et al. |
| 2007/0289229 A1 | 12/2007 | Aldo |
| 2007/0289233 A1 | 12/2007 | Haddock |
| 2008/0035140 A1 | 2/2008 | Placer et al. |
| 2008/0041011 A1 | 2/2008 | Kannisto |
| 2008/0184639 A1 | 8/2008 | Cotter |
| 2008/0190047 A1 | 8/2008 | Allen |
| 2008/0236520 A1 | 10/2008 | Maehara et al. |
| 2008/0265232 A1 | 10/2008 | Terrels et al. |
| 2008/0302407 A1 | 12/2008 | Kobayashi |
| 2009/0000220 A1 | 1/2009 | Lenox |
| 2009/0007520 A1 | 1/2009 | Navon |
| 2009/0194098 A1 | 8/2009 | Placer |
| 2009/0229213 A1 | 9/2009 | Mistelski |
| 2009/0230205 A1 | 9/2009 | Hepner et al. |
| 2009/0320826 A1 | 12/2009 | Kufner |
| 2010/0058701 A1 | 3/2010 | Yao et al. |
| 2010/0133040 A1 | 6/2010 | London |
| 2010/0154784 A1 | 6/2010 | King et al. |
| 2010/0162641 A1 | 7/2010 | Reyal et al. |
| 2010/0171016 A1 | 7/2010 | Haddock |
| 2010/0175738 A1 | 7/2010 | Huss et al. |
| 2010/0192505 A1 | 8/2010 | Schaefer et al. |
| 2010/0193651 A1 | 8/2010 | Railsback et al. |
| 2010/0206303 A1 | 8/2010 | Thorne |
| 2010/0212720 A1 | 8/2010 | Meyer et al. |
| 2010/0276558 A1 | 11/2010 | Faust et al. |
| 2010/0288337 A1 | 11/2010 | Rizzo |
| 2010/0293874 A1 | 11/2010 | Liebendorfer |
| 2010/0314517 A1 | 12/2010 | Patzer |
| 2011/0039458 A1 | 2/2011 | Byrne |
| 2011/0078892 A1 | 4/2011 | Hartelius et al. |
| 2011/0120047 A1 | 5/2011 | Stearns et al. |
| 2011/0138585 A1 | 6/2011 | Kmita et al. |
| 2011/0154750 A1 | 6/2011 | Welter et al. |
| 2011/0174360 A1 | 7/2011 | Plaisted et al. |
| 2011/0179606 A1 | 7/2011 | Magno, Jr. et al. |
| 2011/0209745 A1 | 9/2011 | Korman |
| 2011/0214365 A1 | 9/2011 | Aftanas |
| 2011/0214388 A1 | 9/2011 | London |
| 2011/0232212 A1 | 9/2011 | Pierson et al. |
| 2011/0239546 A1 | 10/2011 | Tsuzuki et al. |
| 2011/0247292 A1 | 10/2011 | Li |
| 2011/0260027 A1 | 10/2011 | Farnham, Jr. |
| 2011/0271611 A1 | 11/2011 | Maracci et al. |
| 2011/0272545 A1 | 11/2011 | Liu |
| 2011/0314752 A1 | 12/2011 | Meier |
| 2012/0073630 A1 | 3/2012 | Wu |
| 2012/0079781 A1 | 4/2012 | Koller |
| 2012/0085041 A1 | 4/2012 | Place |
| 2012/0099943 A1 | 4/2012 | Chiu |
| 2012/0102853 A1 | 5/2012 | Rizzo |
| 2012/0153108 A1 | 6/2012 | Schneider |
| 2012/0167364 A1 | 7/2012 | Koch et al. |
| 2012/0175322 A1 | 7/2012 | Park et al. |
| 2012/0192519 A1 | 8/2012 | Ray |
| 2012/0193310 A1 | 8/2012 | Fluhrer et al. |
| 2012/0201601 A1 | 8/2012 | Rizzo |
| 2012/0244729 A1 | 9/2012 | Rivera et al. |
| 2012/0248271 A1 | 10/2012 | Zeilenga |
| 2012/0298188 A1 | 11/2012 | West et al. |
| 2012/0299233 A1 | 11/2012 | Header |
| 2012/0325761 A1 | 12/2012 | Kubsch et al. |
| 2013/0011187 A1 | 1/2013 | Schuit et al. |
| 2013/0048056 A1 | 2/2013 | Kilgore et al. |
| 2013/0089388 A1 | 4/2013 | Liu et al. |
| 2013/0091692 A1 | 4/2013 | Stanley |
| 2013/0118545 A1 | 5/2013 | Bosler et al. |
| 2013/0149030 A1 | 6/2013 | Merhar et al. |
| 2013/0161462 A1 ‡ | 6/2013 | Haddock ................. F16B 5/06 248/237 |
| 2013/0167470 A1 | 7/2013 | Montgomery et al. |

(56) References Cited

U.S. PATENT DOCUMENTS

| | | | |
|---|---|---|---|
| 2013/0168525 A1‡ | 7/2013 | Haddock | E04D 3/361 248/505 |
| 2013/0220403 A1 | 8/2013 | Rizzo | |
| 2013/0227833 A1 | 9/2013 | Rizzo | |
| 2013/0263917 A1 | 10/2013 | Hamamura | |
| 2013/0313043 A1 | 11/2013 | Lallier | |
| 2013/0340358 A1 | 12/2013 | Danning | |
| 2014/0000681 A1 | 1/2014 | Zhao et al. | |
| 2014/0003861 A1 | 1/2014 | Cheung | |
| 2014/0041202 A1 | 2/2014 | Schnitzer et al. | |
| 2014/0041706 A1‡ | 2/2014 | Haddock | H02S 20/22 136/244 |
| 2014/0069048 A1 | 3/2014 | Ally | |
| 2014/0096462 A1 | 4/2014 | Haddock | |
| 2014/0179133 A1 | 6/2014 | Redel | |
| 2014/0220834 A1 | 8/2014 | Rizzo | |
| 2014/0231605 A1 | 8/2014 | Sharpe et al. | |
| 2014/0260068 A1 | 9/2014 | Pendley et al. | |
| 2014/0261638 A1‡ | 9/2014 | Haddock | F24S 25/615 136/251 |
| 2014/0283467 A1 | 9/2014 | Chabas et al. | |
| 2014/0311087 A1‡ | 10/2014 | Haddock | F24S 25/636 52/801.1 |
| 2014/0311553 A1‡ | 10/2014 | Haddock | E04F 13/12 136/251 |
| 2014/0338273 A1 | 11/2014 | Stapleton | |
| 2014/0341645 A1 | 11/2014 | Liu et al. | |
| 2015/0052834 A1 | 2/2015 | Gies et al. | |
| 2015/0060620 A1 | 3/2015 | Smeja | |
| 2015/0107168 A1 | 4/2015 | Kobayashi | |
| 2015/0129517 A1 | 5/2015 | Wildes | |
| 2015/0200620 A1‡ | 7/2015 | Haddock | F24S 25/636 136/251 |
| 2015/0214884 A1 | 7/2015 | Rizzo | |
| 2015/0247326 A1‡ | 9/2015 | Haddock | F24S 25/636 52/705 |
| 2015/0249423 A1 | 9/2015 | Braunstein et al. | |
| 2016/0025262 A1 | 1/2016 | Stearns et al. | |
| 2016/0049901 A1 | 2/2016 | Muther et al. | |
| 2016/0060869 A1 | 3/2016 | Smeja | |
| 2016/0087576 A1 | 3/2016 | Johansen et al. | |
| 2016/0111835 A1‡ | 4/2016 | Nayar | H02S 40/34 439/12 |
| 2016/0111997 A1‡ | 4/2016 | Ganshaw | F16M 13/02 248/22 |
| 2016/0111998 A1 | 4/2016 | Schmid | |
| 2016/0130815 A1 | 5/2016 | Menegoli | |
| 2016/0160524 A1 | 6/2016 | Malins | |
| 2016/0176105 A1 | 6/2016 | Stanley | |
| 2016/0177984 A1 | 6/2016 | Kovacs et al. | |
| 2016/0268958 A1 | 9/2016 | Wildes et al. | |
| 2017/0040928 A1 | 2/2017 | Schuit et al. | |
| 2017/0067258 A1 | 3/2017 | Stearns et al. | |
| 2017/0073974 A1‡ | 3/2017 | Kovacs | E04D 13/10 |
| 2017/0107723 A1 | 4/2017 | Stearns et al. | |
| 2017/0237386 A1 | 8/2017 | Stephan et al. | |
| 2017/0301265 A1 | 10/2017 | Kyle et al. | |
| 2017/0302221 A1 | 10/2017 | Jasmin | |
| 2017/0336021 A1 | 11/2017 | Anderson | |
| 2018/0013382 A1 | 1/2018 | Smeja | |
| 2018/0031279 A1‡ | 2/2018 | Haddock | F24S 25/636 |
| 2018/0119423 A1‡ | 5/2018 | Haddock | E04D 3/362 |
| 2018/0167026 A1 | 6/2018 | Xie | |
| 2019/0013772 A1 | 1/2019 | Bamat et al. | |
| 2019/0049151 A1 | 2/2019 | Harris et al. | |
| 2019/0106885 A1 | 4/2019 | Stearns et al. | |
| 2019/0123460 A1 | 4/2019 | Ash et al. | |
| 2019/0165717 A1 | 5/2019 | Haddock et al. | |
| 2019/0195252 A1 | 6/2019 | Pryor et al. | |
| 2019/0226214 A1 | 7/2019 | Van Leuven | |
| 2019/0273460 A1 | 9/2019 | Kovacs | |
| 2019/0285224 A1 | 9/2019 | McKechnie et al. | |
| 2019/0296689 A1‡ | 9/2019 | Haddock | H02S 30/00 |
| 2019/0330853 A1 | 10/2019 | Van Leuven | |
| 2019/0343085 A1 | 11/2019 | Donado | |
| 2019/0345719 A1 | 11/2019 | Header | |
| 2019/0363667 A1 | 11/2019 | Braunstein et al. | |
| 2019/0372501 A1 | 12/2019 | Wada et al. | |
| 2020/0144959 A1 | 5/2020 | Stearns et al. | |
| 2020/0191180 A1‡ | 6/2020 | Haddock | H02S 20/23 |
| 2020/0208658 A1 | 7/2020 | Roman | |
| 2020/0217339 A1 | 7/2020 | Haddock | |
| 2020/0252023 A1 | 8/2020 | Stearns et al. | |
| 2020/0263432 A1 | 8/2020 | Haddock | |
| 2020/0313604 A1 | 10/2020 | Harris et al. | |
| 2020/0313611 A1 | 10/2020 | Ash et al. | |
| 2020/0318349 A1 | 10/2020 | Stearns et al. | |
| 2020/0321763 A1 | 10/2020 | Joshi et al. | |
| 2020/0340712 A1 | 10/2020 | Leitch et al. | |
| 2020/0362632 A1 | 11/2020 | Fort | |
| 2021/0005115 A1 | 1/2021 | Johnson | |
| 2021/0028741 A1 | 1/2021 | Stearns et al. | |
| 2021/0067085 A1 | 3/2021 | Stearns et al. | |
| 2021/0079947 A1 | 3/2021 | Ash et al. | |
| 2021/0104973 A1 | 4/2021 | Stearns et al. | |
| 2021/0111546 A1 | 4/2021 | Varale | |
| 2021/0140681 A1 | 5/2021 | Haddock et al. | |
| 2021/0143771 A1 | 5/2021 | Haddock et al. | |
| 2021/0159843 A1 | 5/2021 | Stearns et al. | |
| 2021/0167720 A1 | 6/2021 | Stearns et al. | |
| 2021/0184626 A1 | 6/2021 | Yang et al. | |
| 2021/0194157 A1 | 6/2021 | Ash et al. | |
| 2021/0194158 A1 | 6/2021 | Ash et al. | |
| 2021/0199141 A1* | 7/2021 | Haddock | H02S 20/23 |
| 2021/0265940 A1 | 8/2021 | Stearns et al. | |
| 2021/0376781 A1 | 12/2021 | Stearns et al. | |
| 2021/0376782 A1 | 12/2021 | Stearns et al. | |
| 2021/0388618 A1 | 12/2021 | Stearns et al. | |
| 2022/0140771 A1 | 5/2022 | Stearns et al. | |
| 2022/0145634 A1 | 5/2022 | Stearns et al. | |
| 2022/0149545 A1 | 5/2022 | Ash et al. | |
| 2022/0178586 A1 | 6/2022 | Ash et al. | |
| 2022/0275813 A1 | 9/2022 | Haddock | |
| 2022/0278516 A1 | 9/2022 | Meine et al. | |
| 2022/0298795 A1 | 9/2022 | Haddock et al. | |

FOREIGN PATENT DOCUMENTS

| | | | |
|---|---|---|---|
| AT | T 26329 | ‡ | 11/1906 |
| AT | 298762 | ‡ | 5/1972 |
| AU | 2005201707 | ‡ | 11/2006 |
| AU | 2009101276 | ‡ | 1/2010 |
| AU | 2009245849 | ‡ | 6/2010 |
| AU | 2014362215 | | 6/2015 |
| AU | 2017203660 | | 10/2018 |
| AU | 2016294152 | | 12/2018 |
| CA | 2704915 | | 9/2011 |
| CH | 204783 | ‡ | 5/1939 |
| CH | 388590 | ‡ | 2/1965 |
| CH | 469159 | ‡ | 2/1969 |
| CH | 671063 | ‡ | 7/1989 |
| CN | 202025767 | ‡ | 11/2011 |
| CN | 202577780 | | 12/2012 |
| CN | 103774795 | | 5/2014 |
| CN | 104254654 | | 12/2014 |
| CN | 105208941 | | 12/2015 |
| CN | 206628755 | | 11/2017 |
| CN | 206717199 | | 12/2017 |
| CN | 206737192 | | 12/2017 |
| CN | 206849001 | | 1/2018 |
| CN | 108105222 | ‡ | 6/2018 |
| CO | 6511275 | | 8/2012 |
| DE | 298762 | ‡ | 4/1916 |
| DE | 941690 | ‡ | 4/1956 |
| DE | 2126082 | ‡ | 12/1972 |
| DE | 2523087 | ‡ | 11/1976 |
| DE | 2556095 | ‡ | 6/1977 |
| DE | 3326223 | | 4/1984 |
| DE | 3617225 | | 11/1987 |
| DE | 3723020 | | 1/1989 |
| DE | 3728831 | | 1/1989 |
| DE | 9112788 | | 12/1991 |
| DE | 4115240 | | 10/1992 |

(56) References Cited

FOREIGN PATENT DOCUMENTS

| | | |
|---|---|---|
| DE | 10056177 | 5/2002 |
| DE | 10062697 | 7/2002 |
| DE | 10344202 | 4/2004 |
| DE | 202005006951 | 8/2005 |
| DE | 102005002828 | 8/2006 |
| DE | 202006015336 | 12/2006 |
| DE | 202007002252 | 4/2007 |
| DE | 202007018367 | 7/2008 |
| DE | 102007036206 | 2/2009 |
| DE | 202009010984 | 12/2009 |
| DE | 102008032985 | 1/2010 |
| DE | 202015102936 | 9/2016 |
| DE | 202012013476 | 2/2017 |
| EP | 0481905 | 4/1992 |
| EP | 0722023 ‡ | 7/1996 |
| EP | 0952272 | 10/1999 |
| EP | 1126098 | 8/2001 |
| EP | 1447494 | 8/2004 |
| EP | 1804008 | 7/2007 |
| EP | 2105971 | 9/2009 |
| EP | 2327942 | 6/2011 |
| EP | 2375185 | 10/2011 |
| EP | 2746695 | 6/2014 |
| EP | 2528166 | 9/2015 |
| EP | 3092350 | 4/2019 |
| EP | 3364124 | 10/2019 |
| EP | 3552307 | 10/2019 |
| EP | 3361183 | 12/2019 |
| FR | 469159 | 7/1914 |
| FR | 1215468 | 4/1960 |
| FR | 2468209 | 4/1981 |
| FR | 2515236 | 4/1983 |
| FR | 2638772 | 5/1990 |
| FR | 2697060 ‡ | 4/1994 |
| FR | 2793827 | 11/2000 |
| FR | 2950375 | 3/2011 |
| FR | 2971577 | 8/2012 |
| FR | 2997169 | 4/2014 |
| FR | 3074369 | 12/2019 |
| GB | 2149829 ‡ | 6/1985 |
| GB | 2364077 | 1/2002 |
| GB | 2430946 | 4/2007 |
| GB | 2465484 | 5/2010 |
| GB | 2476104 | 6/2011 |
| JP | S56-158486 | 12/1981 |
| JP | H03-166452 | 7/1991 |
| JP | H04-73367 | 3/1992 |
| JP | H04-366294 | 12/1992 |
| JP | H05-346055 | 12/1993 |
| JP | H08-189150 | 7/1996 |
| JP | H09-177272 ‡ | 7/1997 |
| JP | H09-256562 | 9/1997 |
| JP | H11-172861 | 6/1999 |
| JP | 2000-120235 | 4/2000 |
| JP | 2000-179106 | 6/2000 |
| JP | 2000-234423 | 8/2000 |
| JP | 2000-303638 | 10/2000 |
| JP | 2001-193231 | 6/2001 |
| JP | 2001-303724 | 10/2001 |
| JP | 2002-146978 | 5/2002 |
| JP | 2002-180609 | 6/2002 |
| JP | 2003-096986 | 4/2003 |
| JP | 2003-155803 | 5/2003 |
| JP | 2003-213854 | 7/2003 |
| JP | 2004-060358 | 2/2004 |
| JP | 2004-068270 | 3/2004 |
| JP | 2004-092134 | 3/2004 |
| JP | 2004-124583 | 4/2004 |
| JP | 2004-156326 | 6/2004 |
| JP | 2004-264009 | 9/2004 |
| JP | 2004-278145 | 10/2004 |
| JP | 2005-171623 | 6/2005 |
| JP | 2005-322821 | 11/2005 |
| JP | 2006-097291 | 4/2006 |
| JP | 2009-052278 | 3/2009 |
| JP | 2009-179955 | 8/2009 |
| JP | 2009-185599 | 8/2009 |
| JP | 2011-069130 | 4/2011 |
| JP | 2011-185014 | 9/2011 |
| JP | 2011-236611 | 11/2011 |
| JP | 2012-144903 | 8/2012 |
| JP | 6033922 | 11/2016 |
| JP | 2018-091009 | 6/2018 |
| KR | 100957530 | 5/2010 |
| MX | 2017016056 | 8/2018 |
| NL | 2021378 ‡ | 1/2020 |
| NL | 2021379 ‡ | 1/2020 |
| NL | 2021380 ‡ | 1/2020 |
| NL | 2021740 | 5/2020 |
| PT | 3066398 ‡ | 12/2019 |
| PT | 3066399 ‡ | 12/2019 |
| WO | WO 96/08617 | 3/1996 |
| WO | WO 96/30606 | 10/1996 |
| WO | WO 97/08399 | 3/1997 |
| WO | WO 99/55982 | 11/1999 |
| WO | WO 01/39331 | 5/2001 |
| WO | WO 03/098126 | 11/2003 |
| WO | WO 2008/021714 | 2/2008 |
| WO | WO 2008/028151 | 3/2008 |
| WO | WO 2010/112049 | 10/2010 |
| WO | WO 2010/113003 | 10/2010 |
| WO | WO 2010/121830 | 10/2010 |
| WO | WO 2010/140878 | 12/2010 |
| WO | WO 2011/019460 | 2/2011 |
| WO | WO 2011/154019 | 12/2011 |
| WO | WO 2012/014203 | 2/2012 |
| WO | WO 2012/017711 | 2/2012 |
| WO | WO 2012/048056 | 4/2012 |
| WO | WO 2012/116121 | 8/2012 |
| WO | WO 2013/009375 | 1/2013 |
| WO | WO 2014/194576 | 12/2014 |
| WO | WO 2015/061113 | 4/2015 |
| WO | WO 2016/198305 | 12/2016 |
| WO | WO 2018/169391 ‡ | 9/2018 |
| WO | WO 2019/239024 | 12/2019 |
| WO | WO 2020/022879 | 1/2020 |
| WO | WO 2020/022880 | 1/2020 |
| WO | WO 2020/162746 | 8/2020 |
| WO | WO 2020/187472 | 9/2020 |
| WO | WO 2021/043407 | 3/2021 |
| WO | WO 2021/061866 | 4/2021 |
| WO | WO 2021/086185 | 5/2021 |
| WO | WO 2021/102062 | 5/2021 |
| WO | WO 2021/119458 | 6/2021 |
| WO | WO 2022/240909 | 11/2022 |

OTHER PUBLICATIONS

"Oil Canning—Solutions," Pac-Clad, 2001, 2 pages [retrieved online from: pac-clad.com/aiapresentation/sd021.htm].‡
"Oil Canning," Metal Construction Association, 2003, Technical Bulletin #95-1060, 2 pages.‡
"New 'Alzone 360 system'", Arrid, 2008, 34 pages [retrieved online from: https://web.archive.org/web/20120317120735/www.arrid.com.au/?act=rackingparts].‡
Gallo "Oil-Canning," Metal Roofing Alliance, Ask-the-experts forum, Jun. 7, 2005, 4 pages [retrieved online from: www.metalroofingalliance.net/v2/forums/printview.cfm?action=mboard.members/viewmessages&ForumTopicID=4921&ForumCategoryID=1].‡
Haddock "History and Materials," Metalmag, Metal roofing from A (Aluminum) to Z (Zinc)—Part I, Sep./Oct. 2001, 4 pages.‡
"Solar mount. System," Schletter GmbH, 2012, 1 page [retrieved online from: https://web.archive.org/web/20120316154604/www.schletter.de/152-1-Solar-mounting-systems.html].‡
"Rees-Snow Retention Systems," Weerbewind, 2010, 3 pages [retrieved online from: https://web.archive.org/web/20100310075027/www.rees-oberstdorf.de/en/products/snow-retention-system.html].‡
"Kee Walk—Roof Top Walkway," Simplified Safety, 2011, 3 pages [retrieved online from: https://web.archive.org/web/20120207115154/http://simplifiedsafety.com/solutions/keewalk-rooftop-walkway/].‡
Ideematec Tracking & Mounting Systems [online], Apr. 2008, [retrieved Mar. 6, 2012], Retrieved from http://www.ideematec.de.‡

(56) References Cited

OTHER PUBLICATIONS

"Miller Fusion Roof Anchor Post," Miller Fall Protection, 2011, 3 pages [retrieved online from: https://web.archive.org/web/20111211154954/www.millerfallprotection.com/fall-protection-roducts/roofing-products/miller-fusion-roof-anchor-post].‡
"KeeLine@ The Safety Solution for Horizontal Life Lines," Kee Safety, Ltd. 2012, 2 pages [retrieved online from: https://web.archive.org/web/20120305120830/http://keesafety.co.uk/products/keeline].‡
"Aluminum," Wikipedia, Jul. 3, 2016, 21 pages [retrieved Oct. 3, 2017 from: en.wikipedia.org/w1 ki/Aluminium].‡
"ClampFit-H Product Sheet," Schletter GmbH, Kirchdorf, Germany, Nov. 2015, 2 pages.‡
"ADJ Heavy Duty Lighting C-clamp," Sweetwater, 2011, 3 pages [retrieved online from: http://web.archive.org/web/20111112045516/http://www.sweetwater.com/store/detail/CClamp/].‡
International Search Report and Written Opinion for International (PCT) Patent Application No. PCT/US2019/066343, dated Feb. 19, 2020 9 pages.‡
International Preliminary Report on Patentability for International (PCT) Patent Application No. PT/US2019/066343, dated Jun. 24, 2021 8 pages.
"ERK-TRB-C16 RiverClack Roofing Profile Interface," Enerack, 2021, 2 pages [retrieved online from: www.enerack.com/erk-trb-c16-riverclack-roofing-profile-interface-p00231p1.html].
Haddock "Metallic Coatings for Carbon Steel," Metalmag, Metal roofing from a (Aluminum) to Z (Zinc)—Part II, Nov./Dec. 2001, 8 pages.
Official Action for U.S. Appl. No. 16/714,060, dated Aug. 4, 2020 17 pages.
Notice of Allowance for U.S. Appl. No. 16/714,060, dated Nov. 13, 2020 8 pages.
"Ace Clamp Cut Sheet | 5031 Z1-2," Ace Clamp, Nov. 2018, 1 page.
"S-5! WindClamp™ Install," Metal Roof Innovations, Ltd., 2014, 1 page.
"Wiley Grounding & Bonding Solutions," Hubbell, 2020, 2 pages [retrieved online from: www.hubbell.com/wiley/en/grounding-and-bonding].
"Universal Clamps Brochure for Web," Universal Clamps, 2020, 2 pages.
"Wind Clamps for Metal Roofs," Metal Roof Innovations, Ltd., 2017, Version 081717, 2 pages.
"Wind Clamp Ultra DEK," Metal Roof Innovations, Ltd., Mar. 7, 2011, Drawing No. WC14-A-0-A_CCD, 1 page.
"Wind Clamp Double LOK," Metal Roof Innovations, Ltd., Mar. 7, 2011, Drawing No. WC15-A-0-A_CCD, 1 page.
U.S. Appl. No. 14/257,747, filed Apr. 21, 2014 now U.S. Pat. No. 9,085,900.
U.S. Appl. No. 07/912,845, filed Jul. 13, 1992 now U.S. Pat. No. 5,228,248.
U.S. Appl. No. 08/091,176, filed Jul. 13, 1993 now U.S. Pat. No. 5,483,772.
U.S. Appl. No. 08/482,274, filed Jun. 7, 1995 now U.S. Pat. No. 5,715,640.
U.S. Appl. No. 08/987,368, filed Dec. 9, 1997 now U.S. Pat. No. 5,983,588.
U.S. Appl. No. 09/312,013, filed May 14, 1999 now U.S. Pat. No. 6,164,033.
U.S. Appl. No. 09/698,358, filed Oct. 27, 2000 now U.S. Patent No.
U.S. Appl. No. 10/118,057, filed Apr. 8, 2002 now U.S. Pat. No. 6,718,718.
U.S. Appl. No. 10/824,320, filed Apr. 13, 2004 now U.S. Patent No.
U.S. Appl. No. 08/335,987, filed Nov. 8, 1994 now U.S. Pat. No. 5,694,721.
U.S. Appl. No. 08/336,288, filed Nov. 8, 1994 now U.S. Pat. No. 5,491,931.
U.S. Appl. No. 09/313,105, filed May 17, 1999 now U.S. Pat. No. 6,536,729.
U.S. Appl. No. 09/313,103, filed May 17, 1999 now U.S. Pat. No. 6,470,629.
U.S. Appl. No. 09/758,805, filed Jan. 11, 2001 now U.S. Patent No.
U.S. Appl. No. 10/746,546, filed Dec. 23, 2003 now U.S. Pat. No. 7,100,338.
U.S. Appl. No. 10/746,596, filed Dec. 23, 2003 now U.S. Pat. No. 7,013,612.
U.S. Appl. No. 10/818,469, filed Apr. 5, 2004 now U.S. Patent No.
U.S. Appl. No. 10/823,410, filed Apr. 13, 2004 now U.S. Pat. No. 7,703,256.
U.S. Appl. No. 12/767,983, filed Apr. 27, 2010 now U.S. Patent No.
U.S. Appl. No. 12/960,679, filed Dec. 6, 2010 now U.S. Patent No.
U.S. Appl. No. 11/325,704, filed Jan. 5, 2006 now U.S. Patent No.
U.S. Appl. No. 11/425,338, filed Jun. 20, 2006 now U.S. Patent No.
U.S. Appl. No. 12/707,724, filed Feb. 18, 2010 now U.S. Patent No.
U.S. Appl. No. 11/759,172, filed Jun. 6, 2007 now U.S. Pat. No. 7,758,011.
U.S. Appl. No. 12/832,281, filed Jul. 8, 2010 now U.S. Pat. No. 8,430,372.
U.S. Appl. No. 13/857,759, filed Apr. 5, 2013 now U.S. Patent No.
U.S. Appl. No. 14/697,387, filed Apr. 27, 2015 now U.S. Patent No.
U.S. Appl. No. 14/789,607, filed Jul. 1, 2015 now U.S. Pat. No. 9,732,512.
U.S. Appl. No. 15/471,179, filed Mar. 28, 2017 now U.S. Pat. No. 10,053,856.
U.S. Appl. No. 15/663,081, filed Jul. 28, 2017 now U.S. Pat. No. 10,443,896.
U.S. Appl. No. 12/629,179, filed Dec. 2, 2009 now U.S. Patent No.
U.S. Appl. No. 12/542,132, filed Aug. 17, 2009 now U.S. Pat. No. 8,312,678.
U.S. Appl. No. 13/667,816, filed Nov. 2, 2012 now U.S. Pat. No. 8,656,649.
U.S. Appl. No. 14/153,925, filed Jan. 13, 2014 now U.S. Pat. No. 9,222,263.
U.S. Appl. No. 13/403,463, filed Feb. 23, 2012 now U.S. Pat. No. 8,833,714.
U.S. Appl. No. 14/444,405, filed Jul. 28, 2014 now U.S. Patent No.
U.S. Appl. No. 14/500,919, filed Sep. 29, 2014 now U.S. Pat. No. 9,611,652.
U.S. Appl. No. 15/452,388, filed Mar. 7, 2017 now U.S. Patent No.
U.S. Appl. No. 15/621,092, filed Jun. 13, 2017 now U.S. Pat. No. 10,077,562.
U.S. Appl. No. 15/621,739, filed Jun. 13, 2017 now U.S. Pat. No. 10,106,987.
U.S. Appl. No. 16/129,606, filed Sep. 12, 2018 now U.S. Pat. No. 10,731,355.
U.S. Appl. No. 164/592,521, filed Oct. 3, 2019 now U.S. Pat. No. 11,035,126.
U.S. Appl. No. 14/030,615, filed Sep. 18, 2013 now U.S. Patent No.
U.S. Appl. No. 14/005,784, filed Jun. 13, 2014 now U.S. Pat. No. 9,530,916.
U.S. Appl. No. 15/386,911, filed Dec. 21, 2016.
U.S. Appl. No. 14/205,613, filed Mar. 12, 2014 now U.S. Pat. No. 9,147,785.
U.S. Appl. No. 14/840,206, filed Aug. 31, 2015 now U.S. Pat. No. 9,608,559.
U.S. Appl. No. 15/470,533, filed Mar. 27, 2017 now U.S. Pat. No. 10,103,682.
U.S. Appl. No. 16/139,853, filed Sep. 24, 2018.
U.S. Appl. No. 16/754,519, filed Apr. 8, 2020.
U.S. Appl. No. 10/810,114, filed Mar. 25, 2004 now U.S. Pat. No. 7,513,080.
U.S. Appl. No. 13/545,808, filed Jul. 10, 2012.
U.S. Appl. No. 13/724,976, filed Dec. 21, 2012 now U.S. Pat. No. 9,086,185.
U.S. Appl. No. 14/789,714, filed Jul. 1, 2015.
U.S. Appl. No. 13/712,474, filed Dec. 12, 2012 now U.S. Pat. No. 8,844,234.
U.S. Appl. No. 14/469,153, filed Aug. 26, 2014.
U.S. Appl. No. 16/539,960, filed Aug. 13, 2019 now U.S. Pat. No. 10,859,292.
U.S. Appl. No. 17/110,621, filed Dec. 3, 2020.
U.S. Appl. No. 15/798,023, filed Oct. 30, 2017 now U.S. Pat. No. 10,640,980.

(56) References Cited

OTHER PUBLICATIONS

U.S. Appl. No. 13/965,441, filed Aug. 13, 2013 now U.S. Pat. No. 8,925,263.
U.S. Appl. No. 14/558,356, filed Dec. 2, 2014 now U.S. Pat. No. 9,306,490.
U.S. Appl. No. 16/821,885, filed Mar. 17, 2020.
U.S. Appl. No. 17/203,481, filed Mar. 16, 2021.
U.S. Appl. No. 17/203,483, filed Mar. 16, 2021.
U.S. Appl. No. 16/866,080, filed May 4, 2020.
U.S. Appl. No. 16/360,923, filed Mar. 21, 2019 now U.S. Pat. No. 10,903,785.
U.S. Appl. No. 17/156,469, filed Jan. 22, 2021.
U.S. Appl. No. 16/714,060, filed Dec. 13, 2019 now U.S. Pat. No. 10,948,002.
U.S. Appl. No. 13/720,461, filed Dec. 19, 2012.
U.S. Appl. No. 15/628,927, filed Jun. 21, 2017 now U.S. Pat. No. 10,634,175.
U.S. Appl. No. 16/824,651, filed Mar. 19, 2020.
U.S. Appl. No. 12/855,850, filed Aug. 13, 2010 now U.S. Pat. No. 10,054,336.
U.S. Appl. No. 12/856,827, filed Aug. 16, 2010 now U.S. Pat. No. 9,920,958.
U.S. Appl. No. 12/856,844, filed Aug. 16, 2010 now U.S. Pat. No. 8,627,617.
U.S. Appl. No. 16/106,299, filed Aug. 21, 2018 now U.S. Pat. No. 10,502,457.
U.S. Appl. No. 08/383,477, filed Feb. 2, 1995.
U.S. Appl. No. 08/285,280, filed Aug. 1, 1994 now U.S. Pat. No. 5,557,903.
"Aerocompact® Compactmetal TR Checklist," Aerocompact, Aug. 30, 2021, CL TR ENG EU V1, 2 pages [retrieved online from: cdn.intelligencebank.com/eu/share/8MnR/YJMd/ZBPL4/original/AEROCOMPACT_CL_TR_ENG_V1_WEB].
"Aerocompact® Compactmetal TR," Aerocompact, Sep. 2, 2021, PB TR ENG EU V1, 3 pages[retrieved online from: cdn.intelligencebank.com/eu/share/8MnR/qMBXP/VYrWa/original/AEROCOMPACT_Leaflet_TR_ENG_V1_WEB].
"CompactMetal TR59 | TR74 Assembly Instructions," Aerocompact, Sep. 2021, 27 pages.
"Grounding Clip for Electrical Protection," ARaymond, 2016, 2 pages.
"Installation Instructions for Rayvolt®—Grounding clip for Framed PV Modules," ARaymond, Feb. 2016, Version 2.2, 1 page.
"Code: The SR-EC-010," Lockseam Ltd., 2018, Datasheet SR-EC-010 Version 2.0, 6 pages.
"EZ Grip Metal Deck Mount," SunModo Corp., 2019, 1 page.
"EZ Grip Metal Deck Mount," SunModo Corp., 2019, Product page, 3 pages [retrieved online May 30, 2019 from: sunmodo.com/product/ez-grip-metal-deck-mount/#].
"Fix2000 check list," SchletterGmbH, last updated Jul. 2010, 1 page.
"LM-KS-700," Lumax Energy, 2018, 1 page.
"LM-TBR-VL," Lumax, 2014, 3 pages [retrieved online from: www.lumaxenergy.co.za/lm-tbr-vl/].
"Metal Roof Deck Mount Kit," SunModo Corp., Oct. 16, 2018, Product Drawing, 1 page.
"Non-Penetrative Clamps with Roofs," Clenergy, Dec. 2021, Datasheet, 5 pages.
"PV-ezRack Klip-lok Interface," Clenergy, 2020, 1 page.
"PV-ezRack SolarRoof-Black Anodized," Clenergy, 2020, 4 pages.
"Standing Seam Rail Free One Sheet," SunModo, Corp., 2020, 2 pages.
"Standing Seam RiverClack Clamp," Shanghai Woqin New Energy Technology Co., Ltd., 2018, 4 pages [retrieved online on Mar. 23, 2022 from: www.wochnmount.com/Details.html?product_id=36].
"SunDock™ Standing Seam Rail-Free Attachment System," SunModo Corp., 2018, 1 page.
"SunDock Standing Seam PV Mounting System Installation Manual," SunModo, 2019, Doc. No. D10160-V006,14 pages.
"Universal Klip-lok Interface pre-assembly with Cross Connector Clamp," Clenergy, 2020, 1 page.
"Universal Klip-lok Interface pre-assembly with Tin Interface A with ezClick module," Clenergy, 2020, 1 page.
Official Action for Australia Patent Application No. 2019397167, dated Mar. 17, 2022 4 pages.
Official Action with Machine Translation for China Patent Application No. 201980091153.2, dated Aug. 31, 2022 15 pages.
Extended Search Report for European Patent Application No. 19894564.4, dated Aug. 4, 2022 8 pages.

\* cited by examiner
‡ imported from a related application

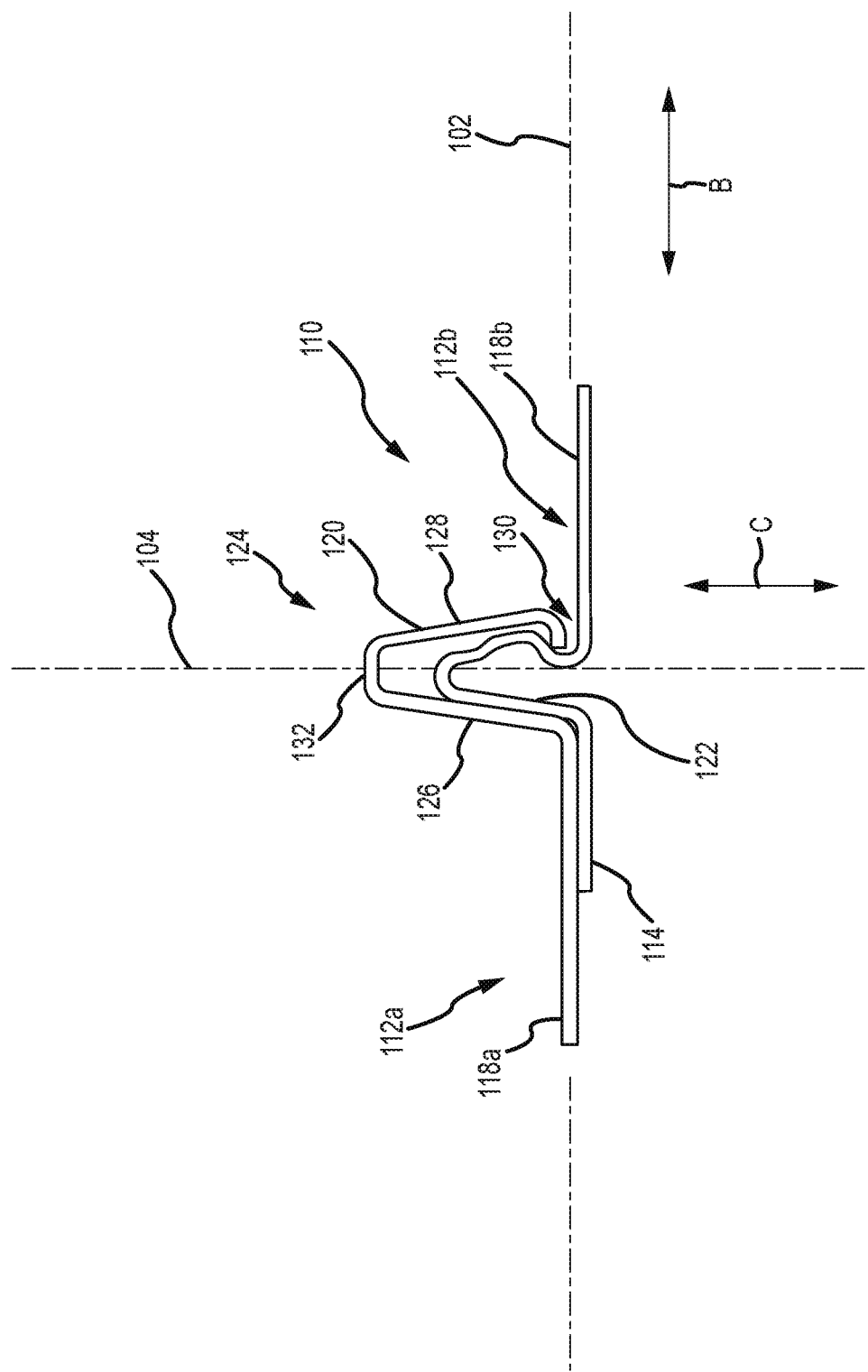

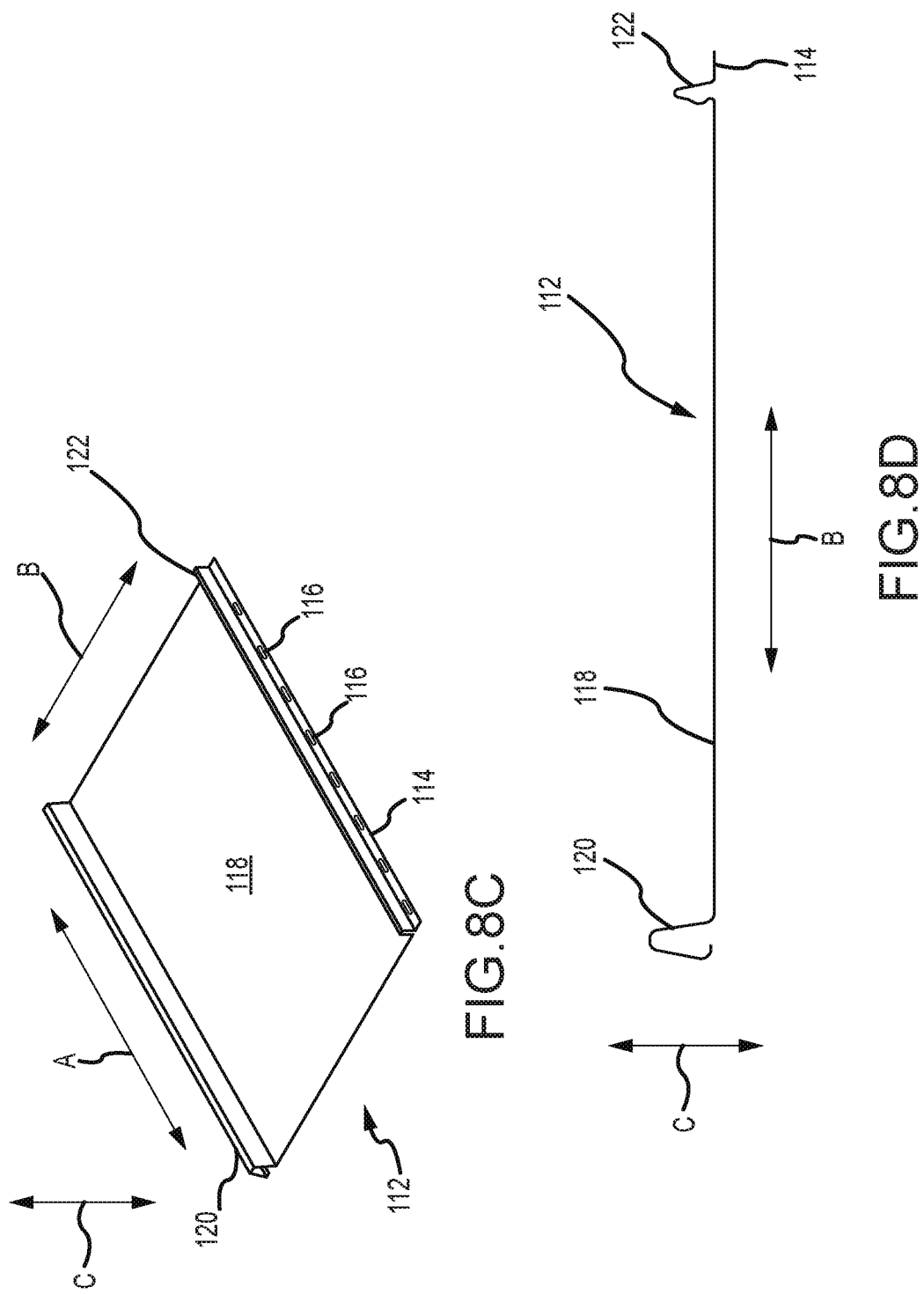

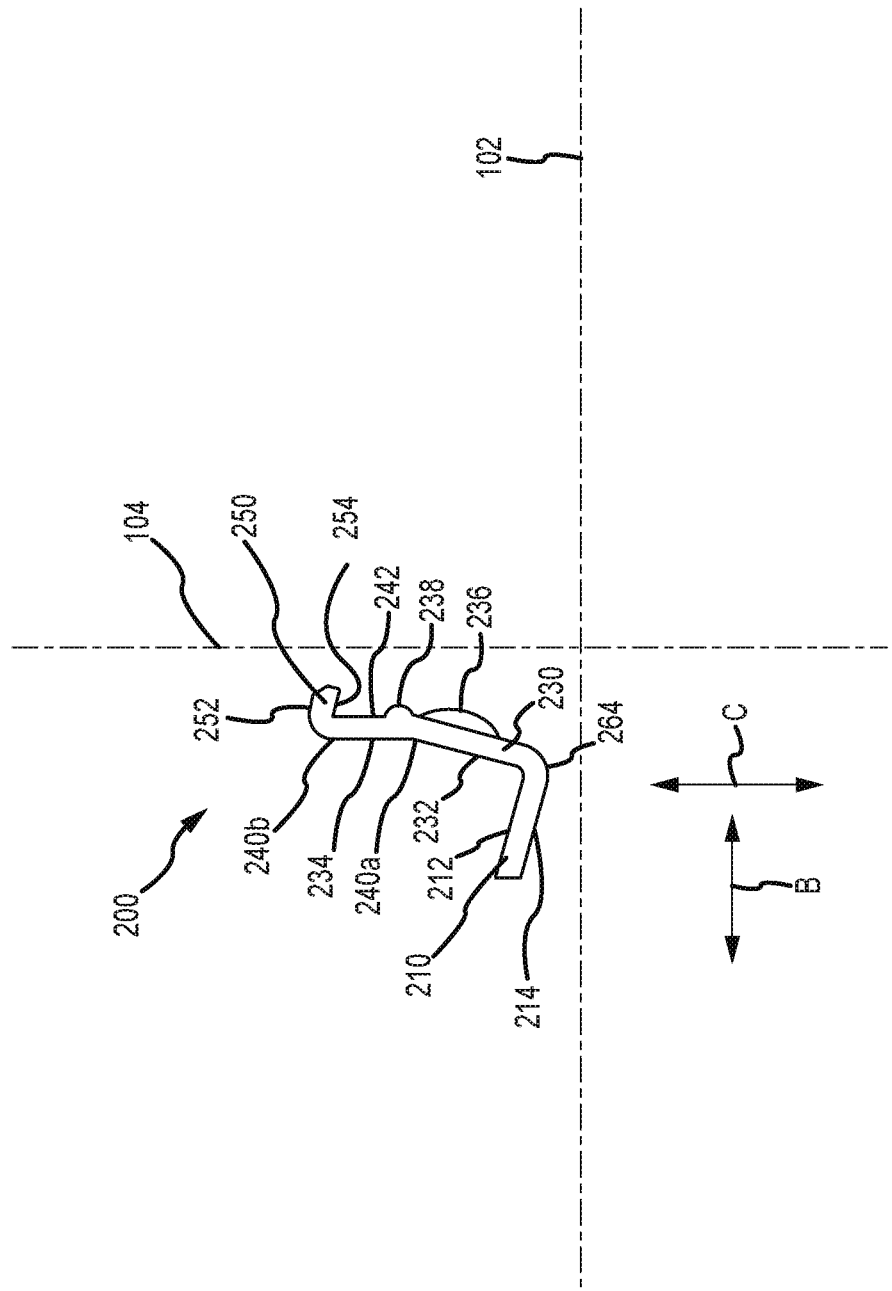

MOUNTING DEVICE FOR NAIL STRIP PANELS

CROSS REFERENCE TO RELATED APPLICATIONS

This application is a continuation of U.S. patent application Ser. No. 16/714,060, filed on Dec. 13, 2019, now U.S. Pat. No. 10,948,002, issued on Mar. 16, 2021, which claims priority to and the benefits under 35 U.S.C. § 119(e) of U.S. Provisional Application No. 62/779,789, filed on Dec. 14, 2018, and U.S. Provisional Application No. 62/828,913, filed on Apr. 3, 2019, which are each incorporated herein by reference in their entireties.

FIELD OF THE INVENTION

The present invention generally relates to mounting devices and, more particularly, to mounting devices that may be used with nail strip panels.

BACKGROUND

Metal panels are being increasingly used to define building surfaces such as roofs and sidewalls. One type of metal panel is a standing seam panel, where the edges of adjacent standing seam panels of the building surface are interconnected in a manner that defines a standing seam. Standing seam panels are expensive compared to other metal panels, and building surfaces defined by metal panels may be more costly than other types of building surface constructions.

Other types of metal panels are commercially available and can be used to define a roofing surface. One such panel configuration is commonly referred to as a trapezoidal rib panel (e.g., formed from an appropriate metal alloy). Such a trapezoidal rib panel may include one or more trapezoidal ribs with a base section positioned on each side thereof, and furthermore may include one or more minor ribs (although some trapezoidal rib panels may in fact not use any minor ribs). In any case, an edge portion of one trapezoidal rib panel may be nested with an edge portion of an adjacent trapezoidal rib panel to collectively define a trapezoidal rib as well.

It is often desirable to install various types of structures on building surfaces, such as heating, air conditioning, and ventilation equipment. Photovoltaic or solar cells have existed for some time, and have been installed on various building roofs. A photovoltaic cell is typically incorporated into a perimeter frame of an appropriate material (e.g., aluminum) to define a photovoltaic module or solar cell module. Multiple photovoltaic modules may be arranged to define a photovoltaic module array, where rows of photovoltaic modules are typically disposed perpendicular to the pitch of a sloped roofing surface and where columns of photovoltaic modules are typically disposed along the pitch of such a sloped roofing surface (e.g., a row of photovoltaic modules of a photovoltaic module array may extend/be disposed perpendicular to the pitch of a pitched roofing surface; a column of photovoltaic modules of a photovoltaic module array may extend/be disposed along the pitch of a pitched roofing surface).

SUMMARY

An aspect of the present disclosure is to provide a mounting assembly which includes an insert to engage a nail strip seam rib of a building surface positioned within a slot of a mounting body.

In accordance with one aspect of the present disclose, a mounting assembly that is disposable on a nail strip seam rib of a building surface comprises: (1) a mounting body, comprising: (a) a top and a bottom that are spaced from one another in a vertical dimension, the bottom including a first bottom surface and a second bottom surface; (b) a first side surface and a second side surface that are spaced from one another in a lateral dimension; (c) a pair of ends that are spaced from one another in a longitudinal dimension; (d) a slot to receive the nail strip seam rib and which extends between the pair of ends, is located between the first side surface and the second side surface, and is defined by a first slot sidewall that extends inwardly from the first bottom surface, a second slot sidewall that extends inwardly from the second bottom surface, and a slot base that extends between the first slot sidewall and the second slot sidewall; and (e) a threaded hole that extends through the first side surface to the slot, the threaded hole extending along an axis that is oblique to the vertical dimension; (2) an insert that is at least partially disposable in the slot; and (3) a threaded fastener disposable in the threaded hole to engage the insert.

In one embodiment, the insert comprises a first leg, a second leg, and a third leg that are each disposed in different orientations relative to one another. The second leg is positioned between the first leg and the third leg. The first leg extends from a first surface of the second leg and the third leg extends from a second surface of the second leg.

In one embodiment, an upper surface of the first leg is disposed in at least generally parallel relation with the first bottom surface of the mounting body when the insert is disposed in the slot.

In one embodiment, the insert is of a one-piece construction.

In one embodiment, the first surface of the second leg has a profile that at least substantially matches a profile of the first slot sidewall.

In one embodiment, the first leg has a first length that is greater than a length of the first bottom surface of the mounting body such that the first leg extends beyond the first side surface when the first surface of the second leg is disposed in adjacent relation to the first slot sidewall.

In one embodiment, the second leg of the insert further comprises one or more of: an insert slot in the first surface that is of a first width, and a channel disposed between the insert slot and the second surface of the second leg that is of a second width. The second width of the channel is wider than the first width of the insert slot to define a pair of deflectable cantilevers that are alignable with the threaded hole when the insert is disposed in the slot. In one embodiment, the insert slot intersects the channel.

In one embodiment, the second leg of the insert further comprises a dimple in the deflectable cantilevers that is alignable with the threaded hole such that when the threaded fastener is advanced through the threaded hole the dimple is engaged by a distal end of the threaded fastener.

In one embodiment, the second leg further comprises a first protrusion that extends from the second surface opposite to the insert slot. The first protrusion is alignable with the threaded hole when the insert is disposed in the slot.

In one embodiment, an extent of the third leg in the lateral dimension is less than an extent of the slot base in the lateral dimension. Optionally, the first leg and the third leg are disposed in at least generally parallel relation.

In one embodiment, the mounting body is of a one-piece construction.

In one embodiment, the second slot sidewall comprises a first section and a second section. The second section of the second slot sidewall is located between the first section of the second slot sidewall and the slot base in the vertical dimension. In one embodiment, the first and second sections of the second slot sidewall are disposed in different orientations.

In one embodiment, the second section of the second slot sidewall is arcuate in an end view of the mounting body.

In one embodiment, the first slot sidewall comprises a first section and a second section. The second section of the first slot sidewall is located between the first section of the first slot sidewall and the slot base in the vertical dimension.

In one embodiment, the first section of the first slot sidewall, the second section of the first slot sidewall, the first section of the second slot sidewall, and the second section of the second slot sidewall are each disposed in different orientations.

In one embodiment, the second slot sidewall comprises a nose that extends from a lower end of the second slot sidewall, relative to the vertical dimension, and in a direction that the first slot sidewall is spaced from the second slot sidewall.

In one embodiment, the axis of the threaded hole is oriented at an angle of between about 5° and about 25° relative to a first reference plane defined by the second bottom surface of the mounting body. Accordingly, when the threaded fastener is rotated into the threaded hole, a distal end of the threaded fastener advances in converging relation to the first reference plane.

In one embodiment, a threaded hole extends into the top of the mounting body. Optionally, the threaded hole can extend through the top and the slot base to the slot. In one embodiment, the threaded hole is approximately parallel to the vertical dimension.

In one embodiment, the mounting body is defined in relation to a first reference plane and a second reference plane. The first reference plane includes the longitudinal dimension and the lateral dimension. The second reference plane is orthogonal to the first reference plane and includes the longitudinal dimension and the vertical dimension.

In one embodiment, the first bottom surface is disposed in diverging relation to the first reference plane proceeding from the slot to the first side surface. In one embodiment, the first bottom surface is generally planar. Optionally, the second bottom surface is approximately parallel to the first reference plane. In another embodiment, the second bottom surface is generally planar.

In one embodiment, the slot base is disposed in non-parallel relation to the first reference plane. In another embodiment, the slot base is disposed in converging relation to the first reference plane proceeding from an intersection with the first slot sidewall to an intersection with the second slot sidewall.

In one embodiment, the first section of the first slot sidewall is disposed in diverging relation to the second reference plane proceeding from an intersection with the second section of the first slot sidewall to an intersection with the bottom.

In one embodiment, the second section of the first slot sidewall is parallel to the second reference plane.

In one embodiment, the first section of the second slot sidewall is disposed diverging relation to second reference plane proceeding from an intersection with the second section of the second slot sidewall toward the bottom.

In one embodiment, at least part of the second section of the second slot sidewall is spaced further from the second reference plane compared to a portion of the first section of the second slot sidewall that is adjacent-most to the second section of the second slot sidewall.

In one embodiment, the second section of the second slot sidewall initially proceeds away from second reference plane and thereafter proceeds back toward the second reference plane in extending from an intersection with the first section of the second slot sidewall to an intersection with the slot base.

Another aspect of the present disclosure is a mounting body disposable on a nail strip seam rib of a building surface, comprising: (1) a top surface; (2) a first side surface spaced from a second side surface in a lateral dimension; (3) a first end spaced from a second end in a longitudinal dimension; (4) a slot that extends between the first and second ends and which is defined by a first slot sidewall, a second slot sidewall, and a slot base that extends between the first slot sidewall and the second slot sidewall; (5) a nose that extends from the second slot sidewall into the slot; (6) a first bottom surface spaced from a second bottom surface by the slot; and (7) a threaded hole that extends through the first side surface to the slot, the threaded hole extending along an axis that is oblique to a vertical dimension. In one embodiment, the mounting body is of a one-piece construction.

In one embodiment, the second slot sidewall comprises a first section that is generally planar and that extends from the nose in a direction of the slot base, and a second section located between the first section of the second slot sidewall and the slot base in the vertical dimension. The second section of the second slot sidewall is arcuate in an end view of the mounting body.

In one embodiment, the first slot sidewall comprises a first section that is generally planar and that extends from the first bottom surface in a direction of the slot base, and a second section being located between the first section of the first slot sidewall and the slot base in the vertical dimension.

In one embodiment, the first section of the first slot sidewall is oriented approximately orthogonal to the slot base.

In one embodiment, the second section of the first slot sidewall is generally planar and disposed in a different orientation than the first sections of the first and second slot sidewalls.

In one embodiment, the second side surface comprises an angled portion adjacent to the second bottom surface.

In one embodiment, a second threaded hole extends into the top surface toward the slot base.

In one embodiment, the second bottom surface is generally planar and defines a first reference plane that is approximately parallel to the top surface.

In one embodiment, the first bottom surface is spaced from the first reference plane in a direction toward the top surface.

In one embodiment, the first bottom surface and the slot base are oriented approximately parallel to the axis of the threaded hole.

In one embodiment, the slot is configured to receive an insert such that a first leg of the insert is positioned adjacent to the first bottom surface, a second leg of the insert is positioned adjacent to the first slot sidewall, a third leg of the insert is positioned adjacent to the slot base, and a threaded fastener advanced in the threaded hole engages the second leg.

In one embodiment, a length of the first bottom surface is less than a length of the first leg.

In one embodiment, the first slot sidewall has a profile that at least substantially matches a profile of the second leg of the insert.

In one embodiment, a length of the slot base is greater than a length of the third leg.

In one embodiment, the second leg of the insert includes an insert slot that is of a first width.

In one embodiment, the second leg of the insert includes a channel that is of a second width that is wider than the first width of the insert slot to define a pair of deflectable cantilevers that are alignable with the threaded hole when the insert is disposed in the slot.

In one embodiment, the second leg of the insert further comprises a dimple in the deflectable cantilevers that is alignable with the threaded hole when the insert is disposed in the slot.

In one embodiment, the second leg further comprises a first protrusion that extends from a surface opposite to the insert slot, the first protrusion being alignable with the threaded hole when the insert is disposed in the slot.

In one embodiment, the insert is of a one-piece construction.

In one embodiment, the axis of the threaded hole is oriented at an angle of between about 5° and about 25° relative to a first reference plane defined by the second bottom surface of the mounting body. Accordingly, when the threaded fastener is rotated into the threaded hole, a distal end of the threaded fastener advances in converging relation to the first reference plane.

Still another aspect of the present disclosure is to provide a mounting assembly disposable on a nail strip seam rib of a building surface, comprising: (1) a one-piece mounting body with: (a) a top surface; (b) a first side surface spaced from a second side surface in a lateral dimension; (c) a first end spaced from a second end in a longitudinal dimension; (d) a slot that extends between the first and second ends and which is defined by a first slot sidewall, a second slot sidewall, and a slot base that extends between the first slot sidewall and the second slot sidewall; (e) a nose that extends from the second slot sidewall into the slot; (f) a first bottom surface spaced from a second bottom surface by the slot; and (g) a threaded hole that extends through the first side surface to the slot, the threaded hole extending along an axis that is oblique to a vertical dimension; (2) an insert that is at least partially disposable in the slot and which includes: (a) a first leg disposable adjacent to the first bottom surface, wherein a length of the first leg is greater than a length of the first bottom surface; (b) a second leg disposable adjacent to the first slot sidewall, the second leg including an insert slot and a channel; and (c) a third leg disposable adjacent to the slot base, a length of the third leg being less than a length of the slot base; and (3) a threaded fastener disposable in the threaded hole to engage the insert slot and channel of the second leg. In one embodiment, the insert is of a one-piece construction.

One aspect of the present disclosure is an insert that is at least partially disposable in a slot of a mounting body, comprising: a first leg, a second leg, and a third leg that are each disposed in different orientations relative to one another, the second leg being positioned between the first leg and the third leg, the first leg extending from a first surface of the second leg and the third leg extending from a second surface of the second leg.

In one embodiment, the first leg has a first length that is greater than a second length of the third leg.

In one embodiment, a lower surface of the first leg is approximately parallel to an upper surface of the third leg.

In one embodiment, the first leg and the third leg are disposed in at least generally parallel relation.

In one embodiment, the insert is of a one-piece construction.

In one embodiment, the insert is at least generally z-shaped in an end view.

In one embodiment, an outside corner between the first leg and the second leg is rounded.

In one embodiment, the second leg comprises a first section and a second section.

In one embodiment, the first section of the second leg and the second section of the second leg are disposed in different orientations.

In one embodiment, the second leg comprises an insert slot in the first surface. The insert slot is of a first width.

In one embodiment, the second leg comprises a channel disposed between the insert slot and the second surface of the second leg.

In one embodiment, the channel is of a second width that is wider than the first width of the insert slot. The channel defines a pair of deflectable cantilevers.

In one embodiment, the second leg comprises a dimple in the deflectable cantilevers.

In one embodiment, the second leg further comprises a first protrusion that extends from the second surface opposite to the insert slot.

In one embodiment, at least a portion of the first protrusion is positioned closer to the third leg than the insert slot.

In one embodiment, the second leg further comprises a second protrusion that extends from the second surface.

In one embodiment, the second protrusion is positioned between the first protrusion and the third leg.

In one embodiment, the first protrusion has a larger extent in a vertical dimension compared to the second protrusion.

In one embodiment, the first protrusion is defined by a first radius and the second protrusion is defined by a second radius with the first radius being larger than the second radius.

Another aspect of the present disclosure is a building section comprising a mounting assembly disposed in an installed configuration on a panel assembly. The installed configuration for the mounting assembly is defined relative to a longitudinal dimension, a lateral dimension, a vertical dimension, a first reference plane, and a second reference plane, with the first reference plane comprising the longitudinal dimension and the lateral dimension, and with the second reference plane being orthogonal to the first reference plane and comprising the longitudinal dimension and the vertical dimension.

The panel assembly of the building section comprises a plurality of interconnected panels and a plurality of ribs that are each hollow, that each have a length that extends in the longitudinal dimension, that are spaced from and parallel to one another, and that each protrude relative to adjacent portions of the panel assembly. The plurality of ribs comprises a first rib and the panel assembly further comprises a first base section on a first side of the first rib and a second base section on a second side of the first rib. The second side of the first rib comprises a recess.

The mounting assembly of the building section is disposed in the installed configuration on the first rib and with no portion of the mounting assembly extending below the first reference plane in the vertical dimension. The mounting assembly comprises a mounting body that includes a top and a bottom that are spaced from one another in the vertical dimension, a first side surface and a second side surface that are spaced from one another in the lateral dimension, and a pair of ends that are spaced from one another in the longitudinal dimension, the bottom comprising a slot that extends between the pair of ends and that defines a length of the slot. The slot is located between the first side surface and the second side surface in the lateral dimension and is defined by a first slot sidewall on the first side of the first rib, a second slot sidewall on the second side of the first rib, and a slot base that extends between the first slot sidewall and the second slot sidewall. The second slot sidewall comprises a nose that has a length in the longitudinal dimension. A threaded hole extends through the first side surface to the slot, the threaded hole extending along an axis that is oblique to the vertical dimension. At least an upper section of the first rib is received within the slot and the nose is disposed within the recess on the second side of the first rib. In one embodiment, the mounting body is of a one-piece construction.

The mounting assembly also comprises an insert that is at least partially disposed in the slot between the first rib and the first slot sidewall. The insert comprises a first leg, a second leg, and a third leg that are each disposed in different orientations relative to one another, with the second leg being between the first leg and the third leg and with the third leg being between the second leg and the slot base. In one embodiment, the insert is of a one-piece construction.

A threaded fastener extends through the threaded hole of the mounting body and at least partially into the slot. The threaded fastener engages the insert and forces the insert against the first side of the first rib.

In one embodiment, the second leg of the insert includes an insert slot that is of a first width.

In one embodiment, the second leg of the insert includes a channel that is of a second width that is wider than the first width of the insert slot to define a pair of deflectable cantilevers that are aligned with the threaded hole.

In one embodiment, the second leg of the insert further comprises a dimple in the deflectable cantilevers that is aligned with the threaded hole.

In one embodiment, the second leg further comprises a first protrusion that extends from a surface opposite to the insert slot, the first protrusion engaged against the first side of the first rib.

In one embodiment, the axis of the threaded hole is oriented at an angle of between about 5° and about 25° relative to a first reference plane defined by a second bottom surface of the mounting body. Accordingly, when the threaded fastener is rotated into the threaded hole, a distal end of the threaded fastener advances in converging relation to the first reference plane.

The Summary is neither intended nor should it be construed as being representative of the full extent and scope of the present disclosure. The present disclosure is set forth in various levels of detail in the Summary as well as in the attached drawings and the Detailed Description and no limitation as to the scope of the present disclosure is intended by either the inclusion or non-inclusion of elements, components, etc. in this Summary. Additional aspects of the present disclosure will become more clear from the Detailed Description, particularly when considered together with the drawings.

The phrases "at least one," "one or more," and "and/or," as used herein, are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

The term "a" or "an" entity, as used herein, refers to one or more of that entity. As such, the terms "a" (or "an"), "one or more" and "at least one" can be used interchangeably herein.

Unless otherwise indicated, all numbers expressing quantities, dimensions, conditions, ratios, ranges, and so forth used in the specification and claims are to be understood as being modified in all instances by the term "about" or "approximately". Accordingly, unless otherwise indicated, all numbers expressing quantities, dimensions, conditions, ratios, ranges, and so forth used in the specification and claims may be increased or decreased by approximately 5% to achieve satisfactory results. In addition, all ranges described herein may be reduced to any sub-range or portion of the range.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials, or acts and the equivalents thereof shall include all those described in the Summary, Brief Description of the Drawings, Detailed Description, Abstract, and Claims themselves.

BRIEF DESCRIPTION OF THE FIGURES

The accompanying drawings, which are incorporated in and constitute a part of the specification, illustrate embodiments of the disclosed system and together with the general description of the disclosure given above and the detailed description of the drawings given below, serve to explain the principles of the disclosed system(s) and device(s).

FIG. 8B is an end view of a nail strip seam rib of the panel assembly used by the building section of FIG. 8A.

FIG. 8C is a perspective view of a nail strip panel of the panel assembly used by the building section of FIG. 8A.

FIG. 8D is an end view (a lateral edge) of the nail strip panel of FIG. 8C.

FIG. 8G is an end view of the insert for the mounting assembly used by the building section of FIG. 8A.

The drawings are not necessarily to scale. In certain instances, details that are not necessary for an understanding of the disclosure or that render other details difficult to perceive may have been omitted. It should be understood, of course, that the disclosure is not necessarily limited to the embodiments illustrated herein. As will be appreciated, other embodiments are possible using, alone or in combination, one or more of the features set forth above or described below. For example, it is contemplated that various features and devices shown and/or described with respect to one embodiment may be combined with or substituted for features or devices of other embodiments regardless of whether or not such a combination or substitution is specifically shown or described herein.

DETAILED DESCRIPTION

Figure 1:
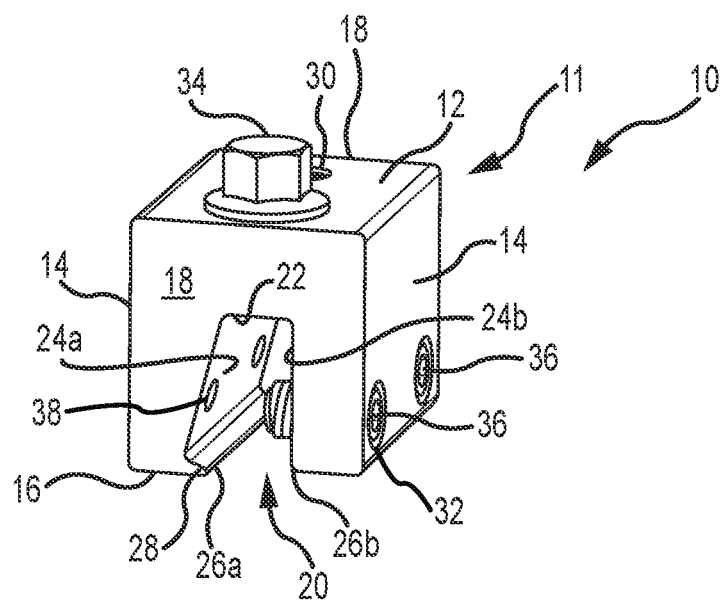
FIG. 1 is a perspective view of one embodiment of a mounting device for use with nail strip panels.
Figure 2:
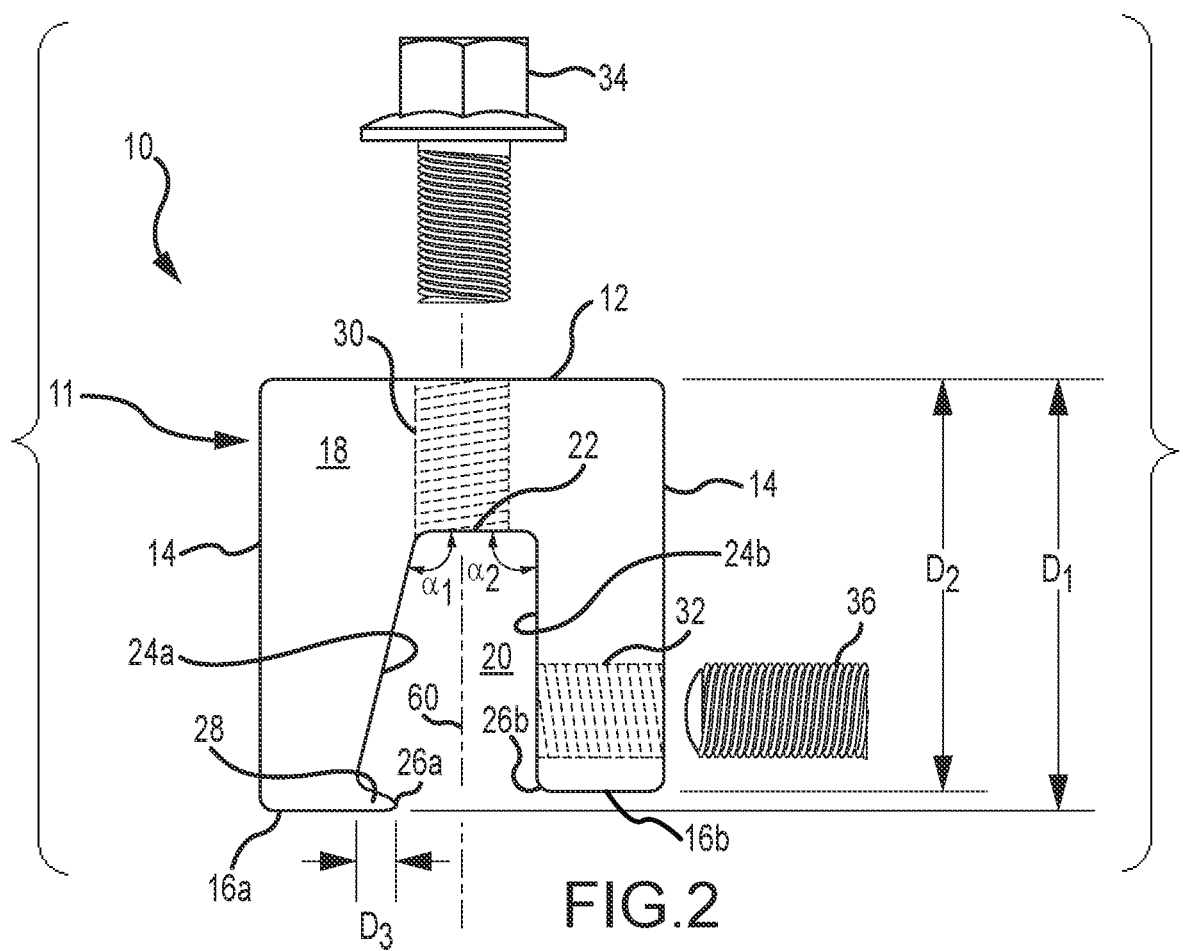
FIG. 2 is an end view of the mounting device of FIG. 1.

One embodiment of a mounting device is illustrated in FIGS. 1 and 2, and is identified by reference numeral 10. This mounting device 10 is in the form of a mounting body 11, at least one mounting fastener 34, and at least one seam fastener 36. The mounting body 11 may be of one-piece construction (e.g., an extruded part). The mounting body 11 may be characterized as lacking any joints of any kind. The mounting body 11 may be configured so as to have no separable parts.

The mounting body 11 may be formed from any appropriate material or combination of materials (e.g., a metal alloy), and includes an upper surface 12, an oppositely disposed lower surface 16, a pair of oppositely disposed side surfaces 14, and a pair of oppositely disposed ends 18. The spacing between the ends 18 coincides with a length dimension for the mounting body 11, the spacing between the side surfaces 14 coincides with a width dimension for the mounting body 11, and the spacing between the upper surface 12 and lower surface 16 coincides with a height or depth dimension for the mounting body 11 (as well as for slot 20, discussed below).

The upper surface 12 of the mounting body 11 includes at least one flat section. A substantial portion of the upper surface 12 is flat in the illustrated embodiment—all except the transition between the upper surface 12 and each of the two side surfaces 14, which may be rounded and/or chamfered. A single reference plane may contain at least a substantial portion of the upper surface 12 of the mounting body 11. In any case, typically the mounting device 10 will be installed on a panel assembly such that its upper surface 12 projects at least generally upwardly to accommodate supporting one or more attachments that may be appropriately secured to the mounting body 11. In this regard, the upper surface 12 may include at least one threaded hole 30 on a flat section thereof for receiving a corresponding mounting fastener 34 (e.g., the mounting fastener 34 may be threaded into a pre-defined threaded hole 30 on a flat section of the upper surface 12 and that extends into the mounting body 11). Although two threaded holes 30 are shown in the illustrated embodiment, any appropriate number of threaded holes 30 may be utilized. Multiple threaded holes 30 may typically be spaced along the length dimension of the mounting body 11. Another option is for the mounting fastener 34 to be self-tapping (i.e., so as to not require a threaded hole in the mounting body 11 prior to initially installing the mounting fastener 34 on the mounting body 11).

The lower surface 16 of the mounting body 11 includes a slot 20 that extends between the two ends 18 of the mounting body 11, and it is located between the pair of side surfaces 14 of the mounting body 11. This slot 20 is defined by a slot base 22 and a pair of slot sidewalls 24a, 24b. The slot sidewalls 24a, 24b are spaced apart to receive at least an end section of a standing seam of a panel assembly (e.g., standing seam 52 of panel assembly 40, discussed below in relation to FIGS. 3 and 4). As the mounting body 11 is of one-piece construction, the first slot sidewall 24a is always maintained in a fixed position relative to the second slot sidewall 24b.

Each of the slot sidewalls 24a, 24b includes at least one flat section. In the illustrated embodiment, the entirety of the second slot sidewall 24b is flat or generally planar, while the entirety of the first slot sidewall 24a is also flat or generally planar other than a nose or projection 28 located at a lower extreme thereof (for example, proximate to the lower surface 16a) and for optional depressions or recesses 38 (where each such recess is axially aligned with a seam fastener 36). Any such nose or projection 28 extends at least generally in the direction that the second slot sidewall 24b is spaced from the first slot sidewall 24a. One embodiment has the nose 28 extending a distance D3 (measured in the width dimension) of at least about 0.1" from the adjacent flat portion of the first slot sidewall 24a. Another embodiment has this distance D3 being at least about 0.15", or between about 0.05" and about 0.3".

At least one threaded hole 32 may extend from one of the side surfaces 14, through the body 11, and intersects the first slot sidewall 24a or the second slot sidewall 24b. In the illustrated embodiment, the threaded hole(s) 32 intersect with the second slot sidewall 24b (e.g., it may be that no threaded holes 32 extend through the mounting body 11 to intersect with the first slot sidewall 24a). Two threaded holes 32 are shown in the illustrated embodiment; however, any appropriate number of threaded holes 32 may be utilized. Multiple threaded holes 32 are typically spaced along the length dimension of the body 11.

An appropriate seam fastener 36 may be directed through a given threaded hole 32 of the mounting device 10 so as to extend into the slot 20 to engage a standing seam and secure the same against the opposing slot sidewall 24a or 24b (the first slot sidewall 24a in the illustrated embodiment). A cavity 38 of any appropriate type may optionally be included on this opposing slot sidewall 24a or 24b (the first slot sidewall 24a in the illustrated embodiment) to allow the aligned seam fastener 36 to deflect a corresponding portion of the standing seam into this cavity, although such cavity may not be required in all instances. In any case and in one embodiment, the seam fastener 36 only interfaces with an exterior surface of a standing seam disposed in the slot 20. In one embodiment, the seam fastener 36 engages a sidewall 54 of the standing seam that extends away from the panel assembly 40. The threaded hole 32 may be oriented such that an end of the seam fastener 36 contacts the standing seam 52. In one embodiment, an axis of the threaded hole 32 is oriented oblique to the upper surface. In this manner, a distal end of the seam fastener 36 advanced into the threaded hole will proceed in a direction away from the upper surface. The end of the seam fastener 36 that interfaces with such a standing seam may be convex, rounded, or of a blunt-nosed configuration to provide a desirable interface with this standing seam (e.g., non-penetrating). Another option is for the seam fastener(s) 36 to be self-tapping (i.e., so as to not require a threaded hole prior to initially installing the seam fastener 34 on the body 11).

A number of characterizations may be made in relation to the slot 20 of the mounting device 10, and which may apply individually or in any combination. The first slot sidewall 24a and the second slot sidewall 24b are disposed other than in parallel relation—the first slot sidewall 24a is not parallel to the second slot sidewall 24b. The first slot sidewall 24a and the second slot sidewall 24b may be characterized as being disposed in different orientations. In some embodiments, the orientation of the first slot sidewall 24a and of the second slot sidewall 24b relative to each other and relative to the slot base 22 may be selected based on the contour of a standing seam such as the standing seam 52 upon which the mounting device 10 may be installed. For example, where the standing seam 52 is wider closer to the nail strip panels 42 comprising the seam ribs 46a and 46b that make up the standing seam 52 and narrows farther from those nail strip panels 42, the slot 20 of the mounting device 10 may be configured to be wider farther from the slot base 22 and narrower closer to the slot base 22, as is the case in the embodiment of FIG. 2.

A first included angle $\alpha_1$ is defined between the slot base 22 and the first slot sidewall 24a (e.g., between a flat or generally planar section of the slot base 22 and an adjacent flat or generally planar section of the first slot sidewall 24a). In the illustrated embodiment, this included angle $\alpha_1$ is greater than 90°. A second included angle $\alpha_2$ is defined between the slot base 22 and the second slot sidewall 24b (e.g., between a flat section of the slot base 22 and an adjacent flat or generally planar section of the second slot sidewall 24b). In the illustrated embodiment, this included angle $\alpha_2$ is at least substantially 90°. The magnitude of the included angle $\alpha_1$ is thereby greater than the magnitude of the included angle $\alpha_2$. One embodiment has the included angle $\alpha_1$ being within a range of about 100° to about 110°. Another embodiment has the included angle $\alpha_1$ being about 105°. The angles $\alpha_1$ and $\alpha_2$ may be selected based on the angles of the sidewalls 54 of a standing seam such as the standing seam 52 upon which the mounting device 10 may be installed.

FIG. 2 illustrates a reference plane 60 that extends through the slot 20 at a location that is between the first slot sidewall 24a and the second slot sidewall 24b. The reference plane 60 may be orthogonal to one or more of the slot base 22 and the upper surface 12. The reference plane 60 may extend in the above-noted height or depth dimension for the mounting device 10. One characterization of the configuration of the slot 20 is that the first slot sidewall 24a extends from the slot base 22 and away from the reference plane 60, while the second slot sidewall 24b extends from the slot base 22 at least substantially parallel to this same reference plane 60.

The slot 20 may be characterized as having a variable width, including a continually variable width for at least a substantial portion of its depth (up to the nose 28 of first slot sidewall 24a). The spacing between the first slot sidewall 24a and the second slot sidewall 24b may progressively increase proceeding away from the slot base 22 up to the nose 28 of the first slot sidewall 24a. In one embodiment, the second slot sidewall 24b is disposed orthogonally to at least one of the upper surface 12 and the slot base 22, while the first slot sidewall 24a extends from the slot base 22 at least generally away from the second slot sidewall 24b.

The first slot sidewall 24a and the second slot sidewall 24b may be characterized as terminating at different elevations when the depth of the slot 20 extends in the vertical dimension (generally parallel to reference plane 60). The up-and-down dimension in the view presented in FIG. 2 corresponds with this depth dimension for the slot 20. The width dimension of the slot 20 coincides with the spacing between the first slot sidewall 24a and the second slot sidewall 24b. The length dimension of the slot 20 coincides with the spacing between the ends 18 of the mounting body 11. The lower surface 16a at its intersection with the first slot sidewall 26a may be offset in the vertical dimension (when the depth of the slot 20 extends in the vertical dimension) from the lower surface 16b at its intersection with the second slot sidewall 26b.

The first slot sidewall 24a may be characterized as extending from the slot base 22 to a first/lower edge 26a, while the second slot sidewall 24b may be characterized as extending from the slot base 22 to a second/lower edge 26b. In the illustrated embodiment, the nose 28 includes the first edge 26a of the first slot sidewall 24a. The upper surface 12 and the first edge 26a of the first slot sidewall 24a are separated by a distance D1 measured in a first dimension (the vertical dimension in the view presented in FIG. 2, and that is orthogonal to a flat section of the upper surface 12), while the upper surface 12 and the second edge 26b of the second slot sidewall 24b are separated by a distance D2 measured in this same first dimension. As illustrated in FIG. 2, the distance D1 is greater than the distance D2. The spacing between the slot base 22 and the first edge 26a of the first slot sidewall 24a, measured in this same first dimension, is also greater than the spacing between the slot base 22 and the second edge 26b of the second slot sidewall 24b.

Figure 3:
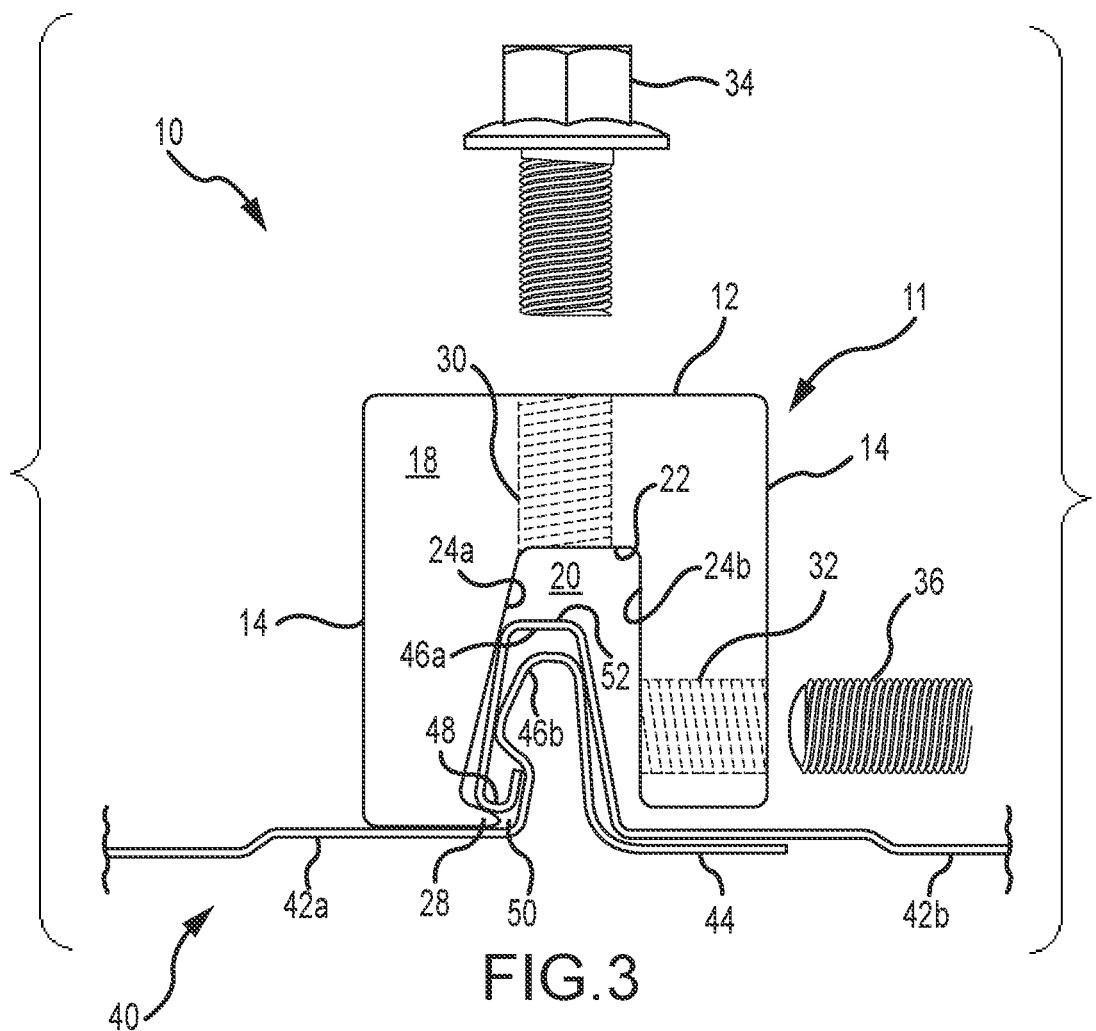
FIG. 3 is an end view of the mounting device of FIG. 1, positioned on a standing seam of a panel assembly defined by multiple nail strip panels of a first configuration.
Figure 4:
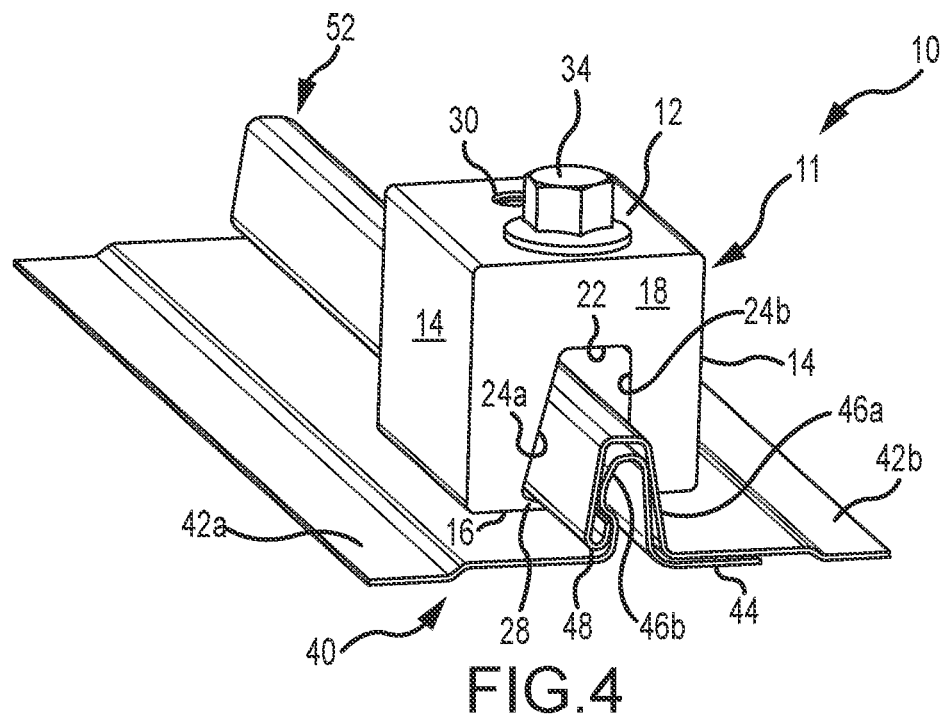
FIG. 4 is a perspective view of the mounting device of FIG. 1, positioned on a standing seam of a panel assembly of the type presented in FIG. 3.

FIGS. 3 and 4 show the mounting device 10 positioned on a standing seam 52 of one embodiment of a panel assembly 40. The panel assembly 40 may be used to define any appropriate surface, including a roofing surface or a wall surface. The panel assembly 40 is defined by a plurality of what are commonly referred to as nail strip panels 42 or the like. Each nail strip panel 42 includes a nail strip flange 44, a left seam rib 46a (a rib used to define a seam 52), and a right seam rib 46b (a rib used to define a seam 52). The left seam rib 46a and right seam rib 46b of a given nail strip panel 42 are spaced in the width dimension of the nail strip panel 42. Each nail strip panel 42 may include one or more flat sections, as well as one or more other structures such as crests, minor ribs, intermediate ribs, pencil ribs, striations, fluting, or flutes.

The left nail strip panel 42a in FIGS. 3 and 4 would be secured to an underlying support structure (e.g., a deck) by extending a plurality of suitable fasteners (e.g., nails, screws) through the nail strip flange 44 (e.g., spaced along the length of the nail strip flange 44—the length dimension extending into the page in the view presented in FIG. 3) and into the underlying support structure. The left seam rib 46a for the right nail strip panel 42b illustrated in FIGS. 3 and 4 may then be positioned over the right seam rib 46b for the left nail strip panel 42a illustrated in FIGS. 3 and 4 to define a standing seam 52. Nail strip panels 42 may be installed in this manner to define a panel assembly 40 of a desired size (both in the length and width dimensions).

Each standing seam 52 of the panel assembly includes a recess 50 on one side thereof (the left side in the views of FIGS. 3 and 4). This recess 50 is defined below an end section 48 of the left seam rib 46a of the standing seam 52, a lower portion of the right seam rib 46b of this same standing seam 52, and a base of the nail strip panel 42 associated with the noted right seam rib 46b. The nose 28 on the lower portion of the first slot sidewall 24a may be directed into this recess 50 so as to be disposed under the end section 48 of the corresponding left seam rib 46a in the view shown in FIG. 3. This provides increased lift-off resistance for the mounting device 10 on this standing seam 52.

Figure 5:
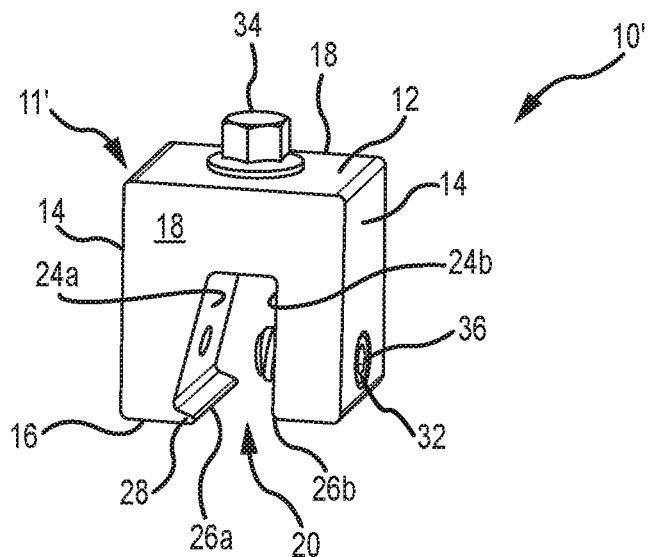
FIG. 5 is a perspective view of another embodiment of a mounting device for nail strip panels.

FIG. 5 illustrates a variation of the mounting device 10 of FIGS. 1-4. Corresponding components are identified by the same reference numeral. Those corresponding components that differ in at least some respect are identified by a "single prime" designation in FIG. 5. One difference between the mounting device 10' of FIG. 5 and the mounting device 10 of FIGS. 1-4 is that the mounting device 10' has a single threaded hole 32 which accommodates a single seam fastener 36 (versus the multiple seam fasteners 36 used by the mounting device 10 of FIGS. 1-4). Another difference is that the mounting device 10' of FIG. 5 accommodates a single mounting fastener 34 (versus the multiple mounting fasteners 34 used by the mounting device 10 of FIGS. 1-4). As such, the mounting body 11' of the mounting device 10' may be characterized as being "shorter" in the length dimension (coinciding with the spacing between the ends 18) than the mounting body 11 of the mounting device 10.

Figure 6:
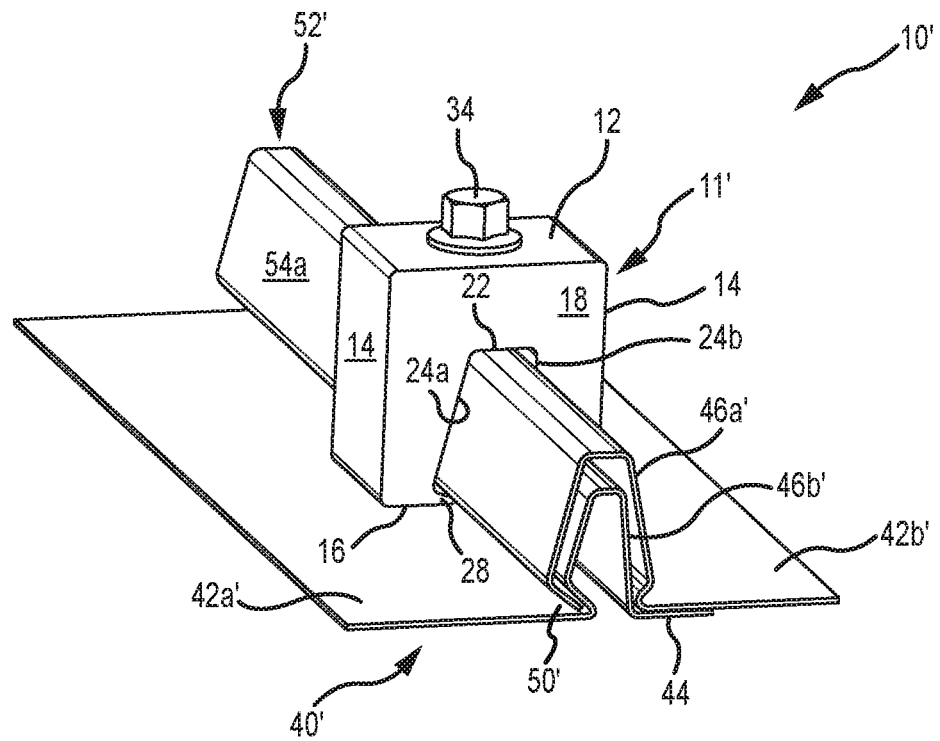
FIG. 6 is a perspective view of the mounting device of FIG. 5, positioned on a seam of a panel assembly defined by multiple nail strip panels of a second configuration.
Figure 7:
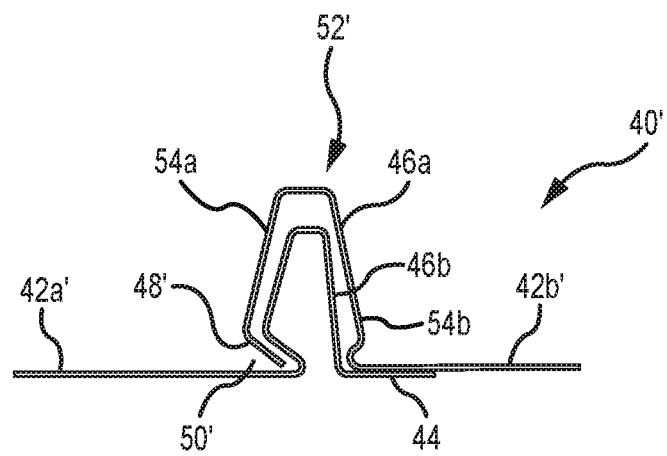
FIG. 7 is an enlarged end view of a standing seam from the panel assembly of FIG. 6.

FIG. 6 shows the mounting device 10' of FIG. 5 being positioned on a standing seam 52' of another embodiment of a panel assembly 40'. The panel assembly 40' is defined by nail strip panels 42' at least generally of the above-described type, but which use a left seam rib 46a' and right seam rib 46b' of a different configuration that discussed above, which in turn collectively define a standing seam 52' of a different configuration (FIG. 7). The nose 28 of the mounting device 10' is again positioned within the recess 50' on one side of the standing seam 52' and at least generally in accordance with the foregoing. However, the recess 50' is of a different configuration, being defined primarily by the end section 48' of one nail strip panel 42b' and a base section of the other nail strip panel 42a' that defines this seam 52'.

It should be appreciated that the mounting device 10 of the embodiment described in conjunction with FIGS. 1-4 may be used on the panel assembly 40' shown in FIG. 7, and that the mounting device 10' of FIG. 5 may be used on the panel assembly 40 shown in FIGS. 3-4. Each of the mounting devices 10, 10' may be used by any panel assembly defined by nail strip panels of the type described herein (where each nail strip panel includes two seam ribs that are spaced in its width dimension, such that one seam rib of one nail strip panel may be "nested" with a seam rib of an adjacent nail strip panel to define a standing seam).

One embodiment of a building section is illustrated in FIGS. 8A-8G and is identified by reference numeral 100. There are two main components of the building section 100—a panel assembly 110 (that defines a corresponding building surface) and a mounting assembly 140. The building section 100 may be used for any appropriate application, including as a roofing surface. The mounting assembly 140, more specifically a mounting body 150 of the mounting assembly 140, is disposed in an upright position when the mounting assembly 140 is in an installed configuration on the panel assembly 110 and where the mounting assembly 140 is appropriately secured relative to the panel assembly 110. The upright position for the mounting body 150, and including the installed configuration for the mounting assembly 140, is defined herein relative to a first reference plane 102 and a second reference plane 104 that are disposed in orthogonal (perpendicular) relation to one another, a longitudinal dimension represented by the arrow A, a lateral dimension represented by the arrow B, and a vertical dimension represented by the arrow C. Generally, the longitudinal dimension (arrow A) and the lateral dimension (arrow B) may be characterized as being within the first reference plane 102, while the longitudinal dimension (arrow A) and the vertical dimension (arrow C) may be characterized as being within the second reference plane 104, with the longitudinal dimension (arrow A), lateral dimension (arrow B), and vertical dimension (arrow C) being orthogonal to one another.

Figure 8A:
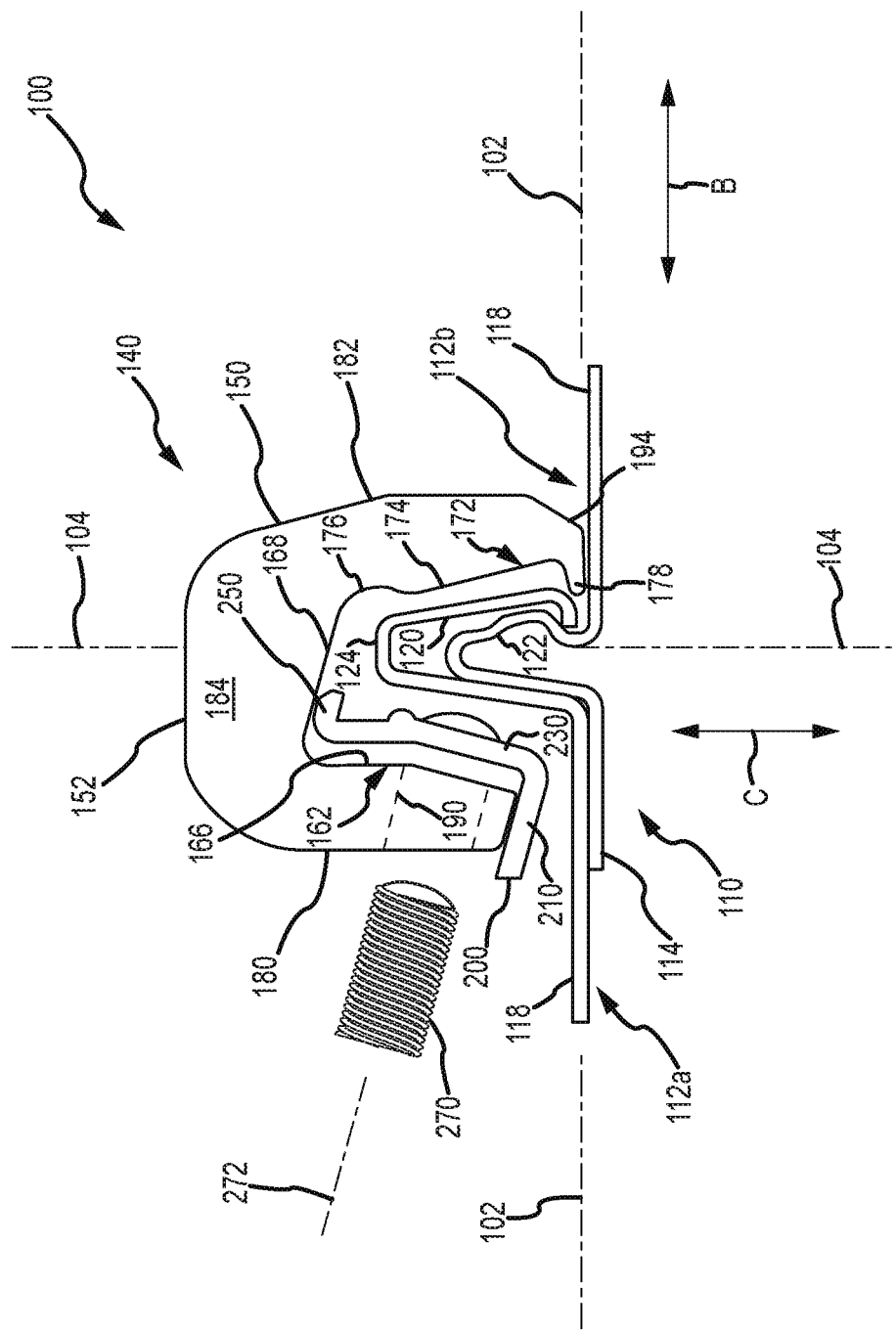
FIG. 8A is an end view of one embodiment of a building section that includes a mounting assembly in position for being installed on a panel assembly.

FIG. 8A shows the mounting assembly 140 in position for installation relative to a corresponding nail strip seam rib 124 of the panel assembly 110. In the installed configuration for the mounting assembly 140, the second reference plane 104 is disposed approximately or substantially parallel to a second section 166 of a first slot sidewall 162 of the mounting body 150 for the mounting assembly 140 and no portion of the mounting body 150 extends below the first reference plane 102. In at least some (if not most/all) cases, the first reference plane 102 (which is orthogonal to the second reference plane 104) should contain/be disposed parallel to the length and width of the building surface that is defined by the panel assembly 110. As such and for the case of a pitched building surface defined by the panel assembly 110 (e.g., a roofing surface): 1) the first reference plane 102 should be oriented to contain/be disposed parallel to the pitch of the building surface; 2) the second reference plane 104 should then be oriented orthogonal to the pitch of the pitched building surface; 3) the lateral dimension (arrow B) is one that proceeds along an axis of constant elevation along the building surface; 4) the longitudinal dimension (arrow A) is one that proceeds along an axis that is of continually-changing elevation along the building surface and that is orthogonal to the lateral dimension; and 5) the vertical dimension (arrow C) is one that proceeds along an axis that is oriented perpendicular to the pitch of the building surface. However, it may be that the mounting body 150 is tilted relative to the panel assembly 110 in the installed configuration such that the first reference plane 102 is not actually coplanar with/parallel to a plane that contains the length and width dimensions of the panel assembly 110. Although the second section 166 of the first slot sidewall 162 of the mounting body 150 would still be approximately parallel to the second reference plane 104 in this instance, the second reference plane 104 would now be disposed at an angle other than 90° relative to the plane that contains the length and width dimensions of the panel assembly 110 (in such a case, portions of the panel assembly 110 may be characterized as being spaced from one another at least generally in the lateral dimension or at least generally in the vertical dimension). References herein to aspects of the mounting assembly 140 (including the mounting body 150) in relation to one or more of the first reference plane 102, the second reference plane 104, the longitudinal dimension (arrow A), the lateral dimension (arrow B), and the vertical dimension (arrow C) pertain to the mounting assembly 140 being in the installed configuration unless otherwise noted to the contrary.

Details of the panel assembly 110 are shown in FIGS. 8A-8D. The panel assembly 110 is defined by a plurality of nail strip panels 112 that are interconnected so as to define a plurality of nail strip seam ribs 124 (although the mounting assembly 150 may be used with other panel assemblies having any appropriate type of a ribs that each have pair of sidewalls that are spaced from one another, including hollow ribs). Each nail strip panel 112 includes a first seam rib section 120 (which defines an exterior of the corresponding nail strip seam rib 124), a base section 118, a second seam rib section 122 (interiorly disposed of the corresponding nail strip seam rib 124), and a nail strip flange 114. The first seam rib section 120 is disposed along one edge portion of the nail strip panel 112, while the second seam rib section 122 and nail strip flange 114 are disposed on an opposite edge portion of the nail strip panel 112. Any appropriate spacing may exist between the first seam rib section 120 and the second seam rib section 122.

The first seam rib section 120 and the second seam rib section 122 may be characterized as being at least generally spaced in the lateral dimension (arrow B). Both the first seam rib section 120 and the second seam rib section 122 have a length that coincides with the longitudinal dimension (arrow A). Both the first seam rib section 120 and the second seam rib section 122 protrude at least generally in the vertical dimension (arrow C), including in relation to an adjacent portion of the base section 118. The base section 118 may be of any appropriate configuration. In the illustrated embodiment, the entire base section 118 is flat such that the base section 118 may be characterized as being disposed within/parallel to the first reference plane 102. However, the base section 118 may include one or more minor ribs, flutes, striations, or the like (not shown).

FIGS. 8A and 8B each show how an adjacent pair of nail strip panels 112 may be interconnected to define a nail strip seam rib 124 that includes at least one interior space (e.g., the nail strip seam rib 124 may be characterized as "hollow"). One nail strip panel 112b is positioned on appropriate support structure (e.g., a deck or decking) and a plurality of fasteners may be directed through the nail strip flange 114 to secure the nail strip panel 112b to the underlying support structure. This may be facilitated by having the nail strip flange 114 include a plurality of apertures 116 (generally illustrated in FIG. 8C) that are spaced along the length dimension (arrow A) of the nail strip panel 112. Another nail strip panel 112a is then positioned such that its first seam rib section 120 is positioned over the second seam rib section 122 of the nail strip panel 112b that is already been secured to the underlying support structure in the above-noted manner. As such, the base section 118 of the second-installed nail strip panel 112a is disposed over the nail strip flange 114 of the first-installed nail strip panel 112b. Any number of nail strip panels 112 may be interconnected and anchored to the underlying support structure in the same general manner to define a plurality of nail strip seam ribs 124 that are spaced from one another and that have their respective length dimensions being disposed in parallel relation (a length dimension of each nail strip seam rib 124 being within the longitudinal dimension—arrow A), where the nail strip seam ribs 124 are spaced from one another at least generally in the lateral dimension (arrow B)). When the panel assembly 110 defines a portion of a sloped roofing surface, the length dimension of the nail strip seam ribs 124 will be along the pitch of this sloped roofing surface such that the elevation of a given nail strip seam rib 124 will continually change proceeding along its length dimension.

Each nail strip seam rib 124 of the panel assembly 110 includes a first rib sidewall 126, a second rib sidewall 128, and an upper end 132 (e.g., an uppermost end of the nail strip seam rib 124). The first rib sidewall 126 and the second rib sidewall 128 are spaced from one another at least generally in the lateral dimension (arrow B), while the upper end 132 is spaced from the base sections 118 of the corresponding nail strip panels 112 at least generally in the vertical dimension (arrow C). The second rib sidewall 128 includes a recess 130 that is disposed adjacent to its corresponding base section 118. In the illustrated embodiment, this recess 130 is defined by a space between the first seam rib section 120 of one nail strip panel 112a and the base section 118b of the other nail strip panel 112b.

There are many different configurations/profiles of nail strip seam rib panels and that may be used to define the panel assembly 110 for the building section 100. It should be appreciated that a given nail strip panel seam rib profile for one nail strip panel may be characterized as being different from a nail strip seam rib profile for another nail strip panel with regard to geometry, dimensions, or both. As such, the first rib sidewall 126, the second rib sidewall 128, or both may be disposed in different orientations from that shown in FIGS. 8A and 8B, there may be a different spacing between corresponding portions of the first rib sidewall 126 and the second rib sidewall 128 from that shown in FIGS. 8A and 8B, the upper end 132 of the nail strip stream rib 124 may be disposed at a different elevation (e.g., relative to the first reference plane 102), or any combination thereof. In any case, the mounting assembly 140 includes a mounting body 150 and an insert 200 to accommodate the panel assembly 110 utilizing a variety of different nail strip seam rib profiles.

Figure 8E:
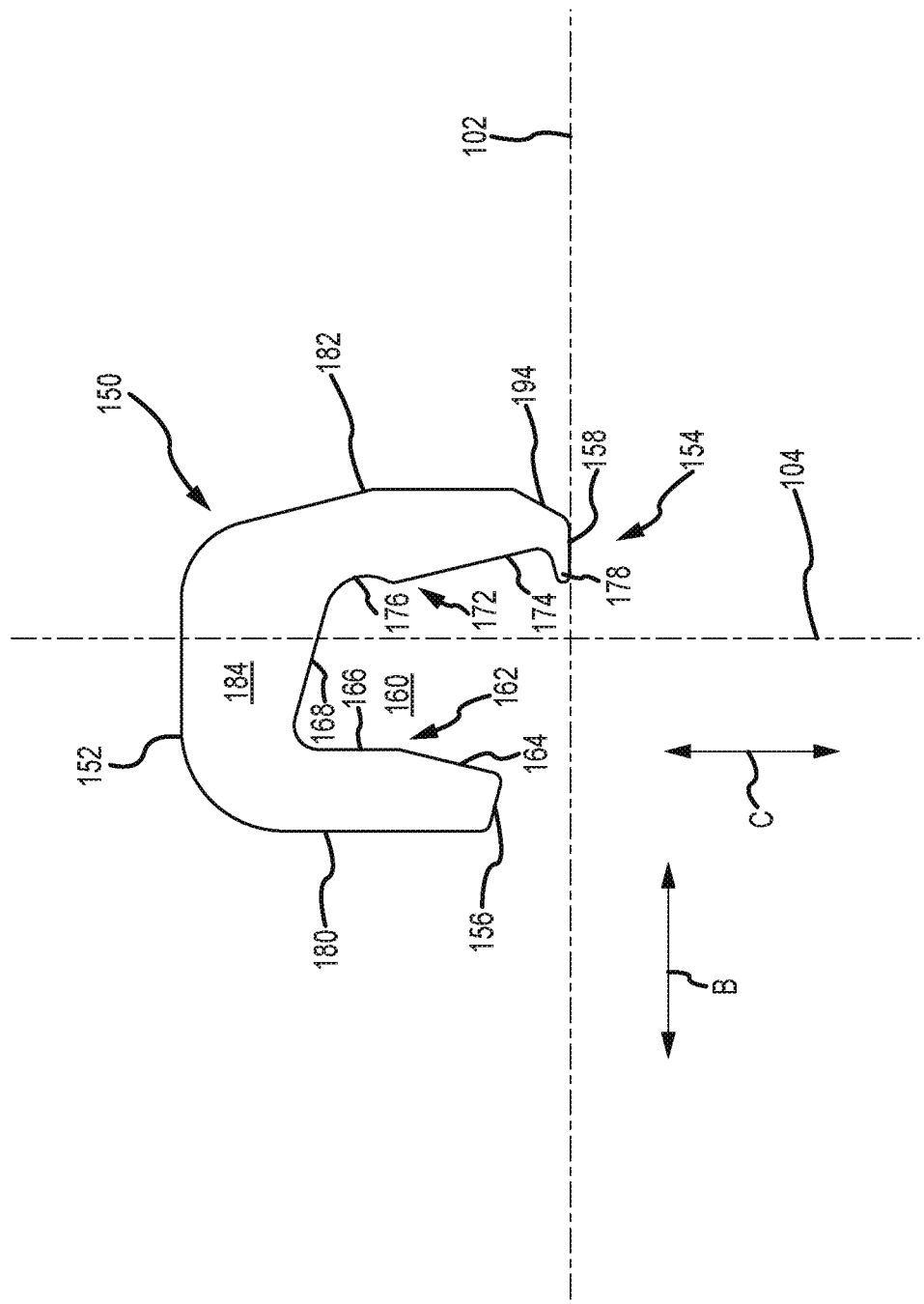
FIG. 8E is an end view of a mounting body for the mounting assembly used by the building section of FIG. 8A.
Figure 8F:
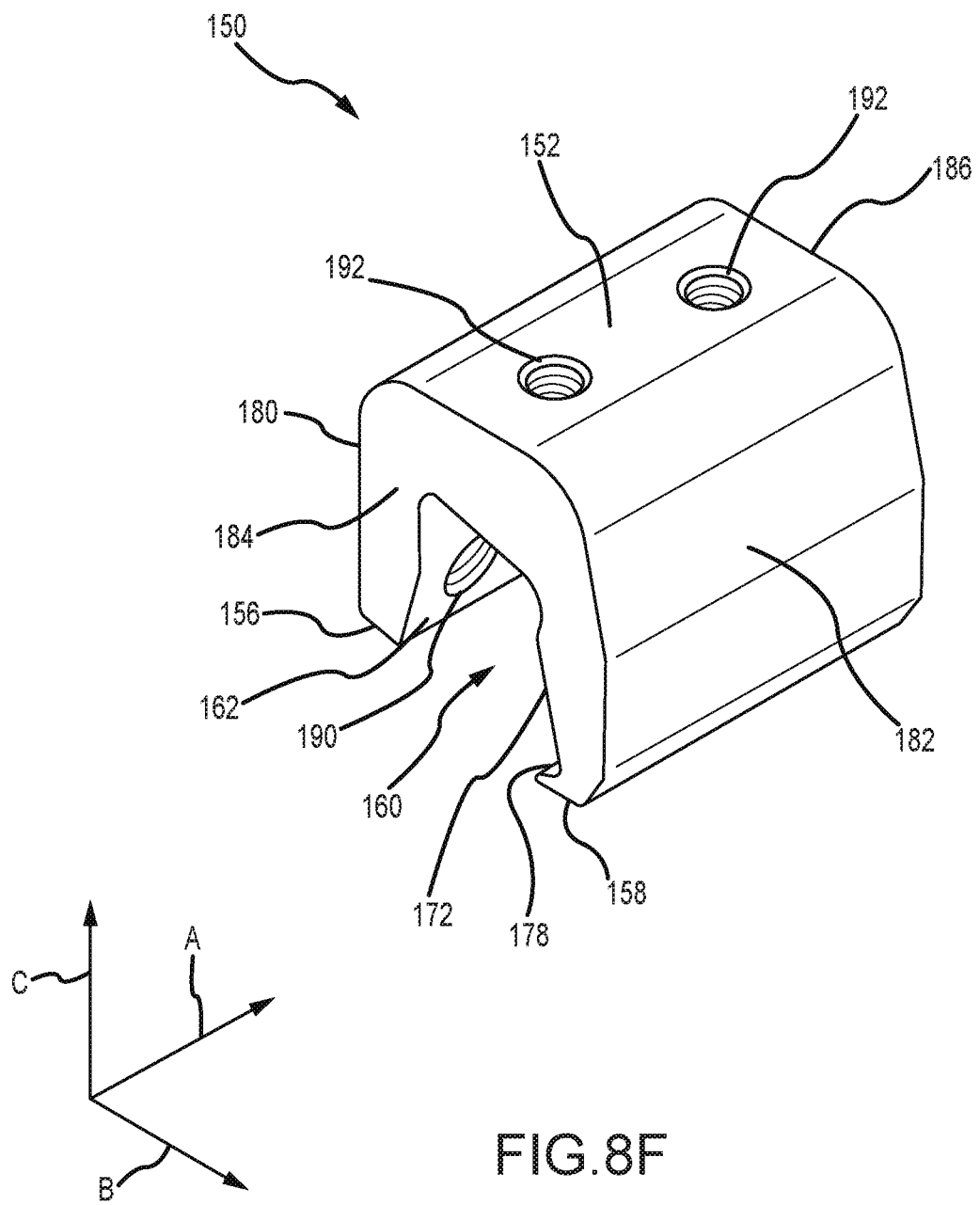
FIG. 8F is a perspective view of the mounting body of FIG. 8E.

Details of the mounting body 150 are shown in FIGS. 8A, 8E, and 8F. One embodiment has the mounting body 150 being of a one-piece or integral construction (e.g., an extrusion), and with the mounting body 150 being formed from any appropriate material or combination of materials (e.g., a metal or a metal alloy). In any case, the mounting body 150 includes a top 152 and bottom 154 that are oppositely disposed and that are spaced from one another in the vertical dimension (arrow C), a first side surface 180 and a second side surface 182 that are oppositely disposed and that are spaced from one another in the lateral dimension (arrow B), and a first end 184 and a second end 186 that are oppositely disposed and that are spaced from one another in the longitudinal dimension (arrow A). The top 152 includes at least one surface that is substantially flat and that is generally parallel to the first reference plane 102 (e.g., for interfacing with a structure being attached to the mounting body 150). The second side surface 182 comprises an angled portion 194 immediately adjacent a second bottom surface 158 (described below). The angled portion 194 provides relief for the nail strip panel 112, which may bend toward the angled portion 194 when the mounting assembly 140 is installed on a nail strip seam rib 124.

The bottom 154 of the mounting body 150 includes a slot 160 that extends between its first end 184 and its second end 186. A length of the slot 160 (and more generally a length of the mounting body 150) is within the longitudinal dimension (arrow A). The slot 160 may be characterized as being at least generally concave, as being on an exterior surface of the mounting body 150, or both.

The bottom 154 further includes a first bottom surface 156 that is disposed on one side of the slot 160, and a second bottom surface 158 that is disposed on an opposite side of the slot 160 (i.e., the first bottom surface 156 and second bottom surface 158 are spaced in the lateral dimension (arrow B)). In the illustrated embodiment, the first bottom surface 156 is disposed in diverging relation to the first reference plane 102 proceeding from the slot 160 to the first side surface 180 (or the first bottom surface 156 may be characterized as being disposed in converging relation to the first reference plane 102 proceeding from the first side surface 180 to the slot 160), while the second bottom surface 158 is disposed within or approximately parallel to the first reference plane 102. Both the first bottom surface 156 and the second bottom surface 158 may be of a flat or generally planar configuration. The first bottom surface 156 is spaced further from the first reference plane 102 than the second bottom surface 158 (e.g., the first bottom surface 156 is spaced relative to second bottom surface 158 in the vertical dimension (arrow C)), with the first bottom surface 156 being disposed at a higher elevation than the second bottom surface 158 in the installed configuration. The second bottom surface 158 may be disposed within the first reference plane 102.

Both the size and shape of the slot 160 accommodate the mounting body 150 being installable on a variety of nail strip seam rib profiles. The slot 160 is collectively defined by the first slot sidewall 162 and a second slot sidewall 172 that are spaced from one another in the lateral dimension (arrow B), and a slot base 168 that is spaced from the bottom 154 in the vertical dimension (arrow C). The first slot sidewall 162 is positioned on one side of the second reference plane 104 and may be characterized as proceeding from an intersection with the first bottom surface 156 to an intersection with the slot base 168. The second slot sidewall 172 is positioned on the opposite side of the second reference plane 104 and may be characterized as proceeding from an intersection with the second bottom surface 158 to an intersection with the slot base 168.

The first slot sidewall 162 includes a first section 164 and a second section 166, with the second section 166 being disposed between the first section 164 and the slot base 168 (e.g., in the vertical dimension—arrow C). Different orientations are used for the first section 164 and second section 166 of the first slot sidewall 162. The first section 164 of the first slot sidewall 162 is disposed in converging relation to the second reference plane 104 proceeding from an intersection with the first bottom surface 156 to an intersection with the second section 166 (or the first section 164 of the first slot sidewall 162 may be characterized as being disposed in diverging relation to the second reference plane 104 proceeding from an intersection with the second section 166 to an intersection with the first bottom surface 156). In one configuration, the first section 164 is approximately orthogonal to the slot base 168. The second section 166 of the first slot sidewall 162 can be disposed approximately parallel to the second reference plane 104 as noted above. Accordingly, the second section 166 may be approximately orthogonal to the top 152. Both the first section 164 and the second section 166 of the first slot sidewall 162 may be in the form of a flat or generally planar surface.

The slot base 168 extends between and interconnects the first slot sidewall 162 and the second slot sidewall 172 at a location that is spaced from the bottom 154 of the mounting body 150 in the vertical dimension (arrow C). One characterization is that the slot base 168 is disposed in non-parallel relation to the first reference plane 102. Another characterization is that the slot base 168 is disposed in converging relation to the first reference plane 102 proceeding from an intersection with the first slot sidewall 162 to an intersection with the second slot sidewall 172 (the slot base 168 may be characterized as disposed in diverging relation to the first reference plane 102 proceeding from an intersection with the second slot sidewall 172 to an intersection with the first slot sidewall 162). The slant angle of the slot base 168 may be the same as or similar to the slant of an upper surface 252 of the third leg 250 of the insert 200 (illustrated in FIG. 8G), and/or may be the same as or similar to the slant of an axis 272 of a threaded hole(s) 190 through the first side surface 180 and the first slot sidewall 162 (shown in FIG. 8A). As a result, as the threaded fastener 270 is advanced within the threaded hole 190 against the insert 200 and pushes the insert 200 away from the first sidewall 162, the upper surface 252 of the insert 200 generally follows the plane of the slot base 168 (e.g., the distance between the top 152 of the mounting body 150 and the upper surface 252 of the insert 200 increases). In one embodiment, the first bottom surface 156 and the slot base 168 are each approximately parallel to the axis 272 of the threaded hole 190.

The second slot sidewall 172 includes a first section 174, a second section 176, and a nose 178. The second section 176 is disposed between the first section 174 and the slot base 168 (e.g., in the vertical dimension—arrow C), while the first section 174 is disposed between the nose 178 and the second section 176 (e.g., in the vertical dimension—arrow C). Different orientations are used for the first section 174 and second section 176 of the second slot sidewall 172. The first section 174 of the second slot sidewall 172 is disposed in converging relation to the second reference plane 104 proceeding from an intersection with the nose 178 to an intersection with the second section 176 (or the first section 174 of the second slot sidewall 172 may be characterized as being disposed in diverging relation to the second reference plane 104 proceeding from an intersection with the second section 176 to an intersection with the nose 178). The first section 174 may be in the form of a flat or generally planar surface.

The second section 176 of the second slot sidewall 172 may be curved or arcuate in an end view of the mounting body 150 (e.g., FIG. 8E). The second section 176 may be configured to provide a space or recess for receiving a portion of a nail strip seam rib when the mounting assembly 140 is in the installed configuration on a corresponding nail strip seam rib. More specifically, to the extent a nail strip seam rib is deformed (e.g., squeezed into a narrower configuration) due to the compressive force applied by the mounting body 150 and the insert 200, resulting in an increase in the height of the nail strip seam rib, the second section 176 provides a space for the upper portion of the nail strip seam rib to fill. At least part of the second section 176 of the second slot sidewall 172 is spaced further from the second reference plane 104 compared to an adjacent-most portion of the first section 174 of the second slot sidewall 172. In this regard, the second section 176 of the second slot sidewall 172 may be described as at least initially proceeding away from the second reference plane 104 and thereafter proceeding back toward the second reference plane 104 in extending from an intersection with the first section 174 of the second slot sidewall 172 to an intersection with the slot base 168. The first section 174 may have a greater extent in the vertical dimension (arrow C) than the second section 176. In one embodiment, the first section 164 of the first slot sidewall 162, the second section 166 of the first slot sidewall 162, the first section 174 of the second slot sidewall 172, and the second section 176 of the second slot sidewall 172 are each disposed in different orientations.

The nose 178 may be characterized as being part of the second slot sidewall 172 and in any case is disposed within the recess 130 on the second rib sidewall 128 of the nail strip seam rib 124 when the mounting assembly 140 is installed over a seam rib such as the seam rib 124. While seam ribs come in many different configurations, almost all seam ribs have a recess such as the recess 130 on one side thereof. The nose 178 fits into such recesses and prevents the mounting assembly 140, and in particular the mounting body 150, from lifting up and over the seam rib upon insertion and tightening of the threaded fastener(s) 270. The nose 178 includes the above-noted second bottom surface 158. An oppositely-disposed upper surface of the nose 178 is disposed in converging relation to the first reference plane 102 proceeding from an intersection with the first section 174 of the second slot sidewall 172 and in the direction that the first slot sidewall 162 is spaced from the second slot sidewall 172. A free end of the nose 178 can be spaced from the first section 174 to define a width of between approximately 0.05 inches to approximately 0.3 inches, or approximately 0.15 inches.

One or more threaded holes 192 extend from the top 152 and at least into the mounting body 150 to allow a corresponding fastener 34 (e.g., FIGS. 10A-10E) to secure an appropriate attachment or other structure to the mounting body 150 (e.g., an attachment or other structure may be positioned on a flat portion of the top 152 of the mounting body 150). Optionally, the threaded holes 192 extend through the top 152 and through the slot base 168. In this manner, an end of the fastener 34 may project at least partially into the slot. Alternatively, a threaded hole 192 may have a depth that is less than the thickness of the slot base 168 such that the threaded hole 192 does not extend through the slot base 168. Each threaded hole 192 may also be characterized as having a centerline which is oriented approximately parallel to the second reference plane 104 (e.g., approximately perpendicular to the first reference plane 102).

One or more threaded holes 190 extend from the first side surface 180 of the mounting body 150 to the slot 160 to secure the mounting body 150 to a corresponding nail strip seam rib 124 using a corresponding threaded fastener 270 (e.g., a threaded seam rib fastener). Each such threaded fastener 270 may be characterized as rotating about an axis 272 of the threaded holes 190, and which may also be characterized as a centerline through the corresponding threaded hole 190 in the mounting body 150. This axis 272 is disposed at an angle. More specifically, this axis 272 is disposed in converging relation to the first reference plane 102 proceeding from the first side surface 180 of the mounting body 150 to the first slot sidewall 162 of the mounting body 150. As such, the threaded fastener 270 proceeds both laterally (in the lateral dimension—arrow B) and downwardly (in the vertical dimension—arrow C) in securing the mounting assembly 140 to the nail strip seam rib 124. The angled orientation of the threaded hole 190 in the mounting body 150 beneficially causes the insert 200 to exert a more even clamping force against a nail strip seam rib (which is also angled, and may in some embodiments be roughly perpendicular to the angle of the axis 272 and threaded hole 190). The angled orientation of the threaded hole 190 in the mounting body 150 also beneficially allows a drill, screwdriver, or other device used to advance the threaded fastener 270 in the threaded hole 190 to be held at an angle relative to the surface from which the nail strip seam rib extends, which increases the clearance between the drill, screwdriver, or other device and thus facilitates use of the drill, screwdriver, or other device to advance the threaded fastener 270 in the threaded hole 190. The axis 272 may be oriented at an angle of between about 5° and about 25° relative to the first reference plane 102. Optionally, the angle of the axis 272 is between about 13° and about 16°. In one configuration, the axis 272 is approximately perpendicular to the first section 164 of the first slot sidewall.

The mounting assembly 140 uses an insert 200 (FIGS. 8A and 8G) in conjunction with the above-described mounting body 150 to allow the mounting assembly 140 to be installed on a variety of nail strip panel profiles. The insert 200 beneficially adjusts the width of the slot 160 to fit and engage nail strip seam ribs of various profiles and sizes. At least part of the insert 200 is disposed within the slot 160 of the mounting body 150 between the first slot sidewall 162 and the first rib sidewall 126 of the nail strip seam rib 124. The threaded fastener(s) 270 used by the mounting assembly 140 exerts a force on the insert 200 such that the nail strip seam rib 124 is compressed between the insert 200 and the second slot sidewall 172 of the mounting body 150. One drawback of mounting assemblies that do not include an insert such as the insert 200 is that set screws or other fasteners used therewith may puncture or scratch the seam rib 124 as the set screws or other fasteners are tightened, and before sufficient clamping force is achieved. In addition to reducing the effectiveness of such mounting assemblies, unnecessary holes in the building surface are undesirable both for functional and aesthetic reasons. For example, a puncture or scratch may allow water to corrode the building surface and/or infiltrate into the seam rib 124. The insert beneficially distributes the force exerted by the threaded fastener(s) 270 across a greater area of the seam rib 124, thus greatly reducing the risk of puncturing a hole in the seam rib 124. The insert 200 achieves the desired amount of clamping force through increased friction resulting from the pressure of the insert 200 against the seam rib 124, and thus enables the mounting assembly 140 to remain in place while reducing or eliminating any need to achieve a mechanical interlock between the mounting assembly 140 and the seam rib 124 (i.e. by deforming the seam rib 124) to hold the mounting assembly 140 in place. In at least some embodiments, the insert 200 will be spaced from the first slot sidewall 162 of the mounting body 150 when the mounting assembly 140 is in its installed configuration. The distance between the insert 200 and the first slot sidewall 162 when the mounting body 150 has been installed on a seam rib 124 may vary depending on the width of the profile of the seam rib 124.

A first surface 240 of the insert 200 that faces or projects toward the first slot sidewall 162 is of a complementary shape—the insert 200 may be disposed in at least substantially mating relation with both the first section 164 of the first slot sidewall 162 and the second section 166 of the first slot sidewall 162 (e.g., FIG. 8A). In this regard, the insert 200 may be characterized as having a first leg 210, a second leg 230, and a third leg 250, with the second leg 230 being disposed between the first leg 210 and the third leg 250 (e.g., the in vertical dimension—arrow C), with the third leg 250 being disposed between the second leg 230 and the slot base 168 (e.g., in the vertical dimension—arrow C), and with the second leg 230 being disposed in a different orientation than both the first leg 210 and the third leg 250.

One characterization is that the first leg 210 proceeds away from the second reference plane 104 and extends from an intersection with the first surface 240 of the second leg 230, while the third leg 250 proceeds toward the second reference plane 104 and extends from an intersection with a second surface 242 of the second leg 230. For instance, the insert 200 may be characterized as being at least generally z-shaped in an end view (e.g., FIG. 8G). The first leg 210 and the third leg 250 may be disposed at least generally parallel to one another.

The first leg 210 extends from an intersection with the second leg 230 to a free end of the insert 200. Optionally, the first leg 210 is approximately orthogonal to the second leg. An upper surface 212 and an oppositely-disposed lower surface 214 define a thickness of the first leg 210. The upper surface 212 may be flat or generally planar, and may be disposed in interfacing relation to the first bottom surface 156 when the first surface 240 of the second leg 230 of the insert 200 is positioned against the first slot sidewall 162 (e.g., at least prior to the mounting assembly 140 being disposed in an installed configuration on the panel assembly 110, or when the mounting assembly 140 is in a pre-installed configuration). The first leg 210 has a length that is less than a length of the first bottom surface 156. When the second leg 230 of the insert 200 is positioned against the first slot sidewall 162 of the mounting body 150, the free end of the first leg 210 of the insert 200 may also protrude beyond the first side surface 180 of the mounting body 150 (e.g., FIG. 8A). In any case, the first leg 210 may prevent/limit rotation of the insert 200 relative to the mounting body 150 in the clockwise direction in the view presented in FIG. 8A (by the engagement of the first leg 210 against the first bottom surface 156 of the mounting body 150). At least part of the first leg 210 may be disposed under the first bottom surface 156 with the mounting assembly 140 being in the installed configuration.

The corner 264 between the first leg 210 and the second leg 230 is located such that when the insert 200 is pressed against a nail strip seam rib 124 by advancement of a threaded fastener 270 against the insert 200, the corner 264 may contact the first rib sidewall 126 and/or the base section 118. To avoid scratching a paint finish of, or otherwise aesthetically damaging, the first rib sidewall 126 and/or the base section 118, the corner 264 is rounded.

The first surface 240 of the second leg 230 of the insert 200 that faces or projects toward the first slot sidewall 162 of the mounting body 150 (or away from the second reference plane 104) has a profile that at least substantially matches a profile of the first slot sidewall 162. In this regard, the second leg 230 has a first section 232 and a second section 234. The insert 200 is disposable relative to the mounting body 150 (e.g., at least prior to the mounting assembly 140 being disposed in an installed configuration on the panel assembly 110, or when the mounting assembly 140 is in a pre-installed configuration) such that the first surface 240 of the first section 232 of the insert 200 that faces or projects toward the first slot sidewall 162 of the mounting body 150 is disposed at least generally parallel with the first section 164 of the first slot sidewall 162 of the mounting body 150, and such that the first surface 240 of the second section 234 of the insert 200 that faces the first slot sidewall 162 of the mounting body 150 is disposed at least generally parallel with the second section 166 of the first slot sidewall 162 of the mounting body 150. The insert 200 may be disposed, including prior to the mounting assembly 140 being in the installed configuration on the nail strip seam rib 124 or a pre-installed configuration, such that the first section 232 of the second leg 230 of the insert 200 is disposed in interfacing relation with the first section 164 of the first slot sidewall 162 of the mounting body 150 and such that the second section 234 of the second leg 230 of the insert 200 is disposed in interfacing relation with the second section 166 of the first slot sidewall 162 of the mounting body 150.

The second surface 242 of the second leg 230 of the insert 200 that faces or projects at least generally in the direction of the nail strip seam rib 124 (or in the direction of the second reference plane 104) may optionally include at least one of a first protrusion or projection 236 and a second protrusion or projection 238. The insert 200 is disposed in the slot 160 of the mounting body 150 such that the second protrusion 238 is spaced further from the first reference plane 102 compared to the first protrusion 236. The first protrusion 236 may be characterized as having a larger extent in the vertical dimension (arrow C) compared to the second protrusion 238. One embodiment has the first protrusion 236 being defined by a first radius and the second protrusion 238 being defined by a second radius, with the first radius (associated with the first protrusion 236) being larger than the second radius (associated with the second protrusion 238). One or more of the first protrusion 236 and the second protrusion 238 may each optionally extend along the entire length of the insert 200 (in the longitudinal dimension—arrow A). Alternatively, in one configuration, the first or second protrusion 236, 238 may have a length that is less than the length of the insert 200. The protrusions 236, 238 may have a generally rounded or arcuate profile in an end view of the insert 200 to avoid scratching a paint finish of, or otherwise aesthetically damaging, the first rib sidewall 126. At least the first protrusion 236 contacts (e.g., deforms) the nail strip seam rib 124 in a manner to enhance the retention of the mounting assembly 140 on the nail strip seam rib 124. In at least certain instances both the first protrusion 236 and the second protrusion 238 may contact (e.g., deform) the nail strip seam rib 124 at spaced locations (e.g., spaced in the vertical dimension—arrow C) and in a manner to enhance the retention of the mounting assembly 140 on the nail strip seam rib 124. Moreover, the first protrusion 236 and the second protrusion 238 beneficially help the insert 200 maintain the desired orientation relative to the nail strip seam rib 124 and the mounting body 150 during and after installation of the mounting assembly 140 on the nail strip seam rib 124.

The third leg 250 extends from an intersection with the second leg 230 to another free end of the insert 200. An upper surface 252 and an oppositely-disposed lower surface 254 define a thickness of the third leg 250. The upper surface 252 may be flat or generally planar, and may be spaced from and/or disposed in at least generally parallel relation to the slot base 168 (e.g., at least prior to the mounting assembly 140 being disposed in an installed configuration on the panel assembly 110, or when the mounting assembly 140 is in a pre-installed configuration). In any case, the extent of the third leg 250 in the lateral dimension (arrow B) is less than an extent of the slot base 168 in the lateral dimension (arrow B). Optionally, the extent of the third leg 250 in the lateral dimension may be less than an extent of the first leg 210 in the lateral dimension. The third leg 250 may prevent/limit rotation of the insert 200 relative to the mounting body 150 in the counterclockwise direction in the view presented in FIG. 8A (by the engagement of the third leg 250, and more specifically of the upper surface 252, against the slot base 168). For example, in embodiments where the upper surface 252 is disposed in at least generally parallel relation to the slot base 168, the contact between the upper surface 252 and the slot base 168 along the parallel surfaces thereof keeps the insert 200 from rotating as described, particularly while the threaded fastener(s) 270 is/are being advanced.

The characterizations set forth in this paragraph and in the following paragraph all apply when the mounting assembly 140 is in the installed configuration on the panel assembly 110. The threaded fastener(s) 270 extends into the slot 160 of the mounting body 150, engages a corresponding portion of the insert 200, and forces the insert 200 in the direction of the second slot sidewall 172 of the mounting body 150 and into engagement with the first rib sidewall 126 of the nail strip seam rib 124. In one embodiment, a distal end of the threaded fastener 270 may interface with the first surface 240 of the first section 232 of the second leg. The nail strip seam rib 124 may be compressed between the insert 200 and the second slot sidewall 172 of the mounting body 150, and furthermore the nail strip seam rib 124 may deform in the direction of the second slot sidewall 172 of the mounting body 150 (including where a portion of the nail strip seam rib 124 is directed into the recess defined by the second section 176 of the second slot sidewall 172). The insert 200 may be spaced from the first slot sidewall 162 of the mounting body 150 (via the engagement by the corresponding threaded fastener(s) 270). Although the first surface 240a of the first section 232 of the second leg 230 of the insert 200 that faces the first section 164 of the first slot sidewall 162 could be disposed in parallel relation and the first surface 240b of the second section 234 of the second leg 230 of the insert 200 that faces the first second 166 of the first slot sidewall 162 could then also be disposed in parallel relation, such may not be the case for all nail strip seam rib profiles that may be used for the panel assembly 110. That is, the insert 200 may be disposed in a different orientation from that illustrated in FIG. 8A when the mounting assembly 140 is in its installed configuration on the panel assembly 110.

The third leg 250 of the insert 200 may be disposed above, spaced from, engaged with, or any combination thereof, the upper end 132 of the nail strip seam rib 124. The first surface 240 of the second leg 230 of the insert 200 that faces the first slot sidewall 162 of the mounting body 150 may be disposed at least generally parallel with the first rib sidewall 126 of the nail strip seam rib 124 when the mounting assembly 140 is in its installed configuration on the panel assembly 110. At least part of the second slot sidewall 172 of the mounting body 150 will be engaged with the second rib sidewall 128 of the nail strip seam rib 124 when the mounting assembly 140 is in its installed configuration on the panel assembly 110, including at least in relation to the nose 178 of the mounting body 150 being disposed within the recess 130 on the second rib sidewall 128 of the nail strip seam rib 124 (although other portions of the second slot sidewall 172 of the mounting body 150 could also be engaged with the second rib sidewall 128). Disposing the nose 178 of the mounting body 150 within the recess 130 on the second rib sidewall 128 of the nail strip seam rib 124 should provide a degree of "lift off" resistance for the mounting assembly 140 relative to the nail strip seam rib 124. Moreover, with the nose 178 positioned within the recess 130, the compressive force exerting by the mounting assembly 140 on the nail strip seam rib 124 beneficially reinforces the lock of the snap-together seam rib.

Figure 9A:
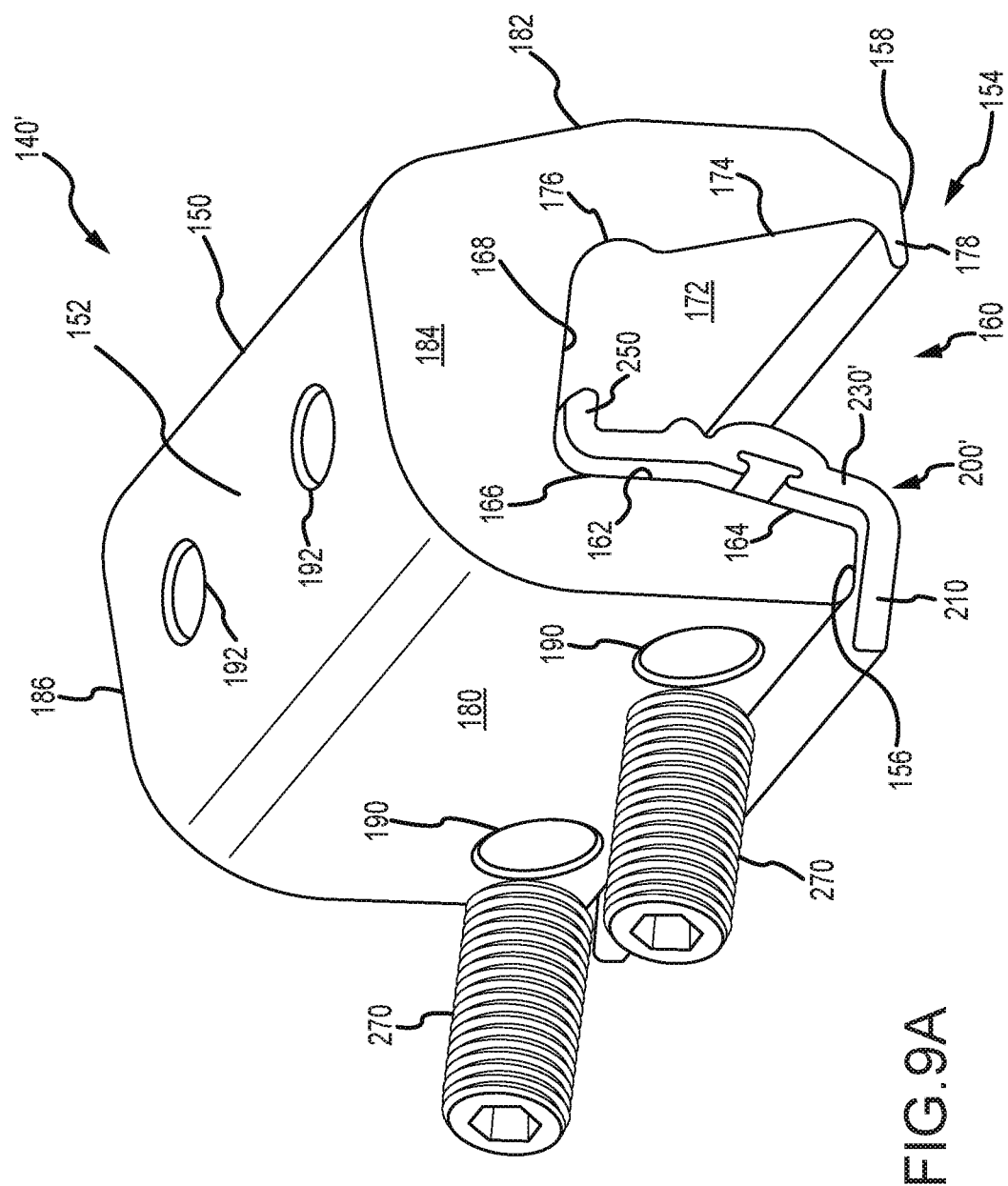
FIG. 9A is a perspective view of a variation of the mounting assembly shown in FIG. 8A.
Figure 9B:
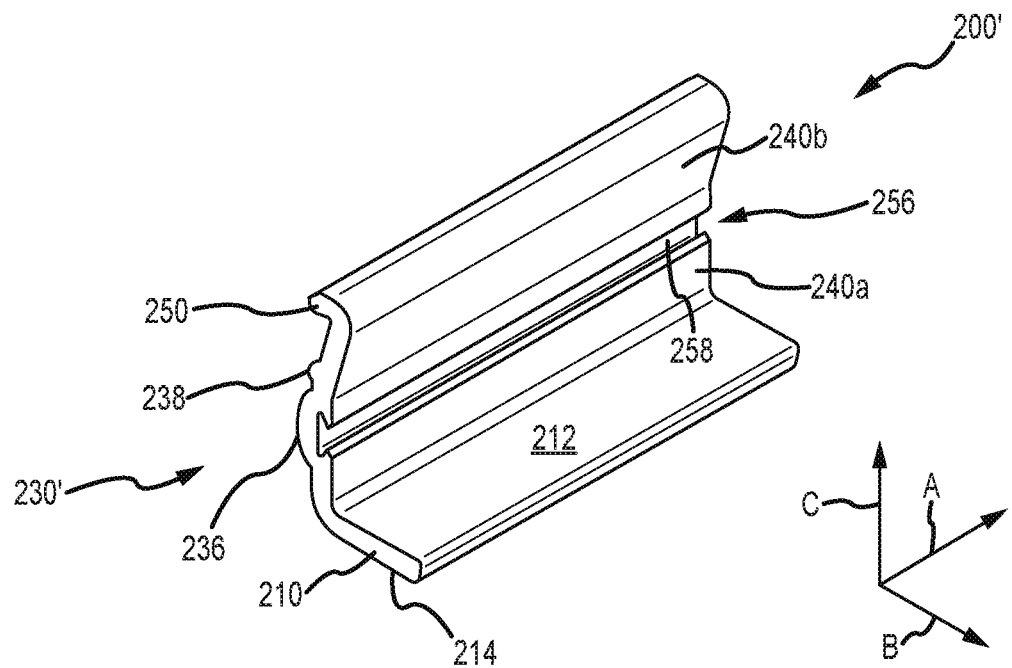
FIG. 9B is a perspective view of the insert used by the mounting assembly of FIG. 9A.
Figure 9C:
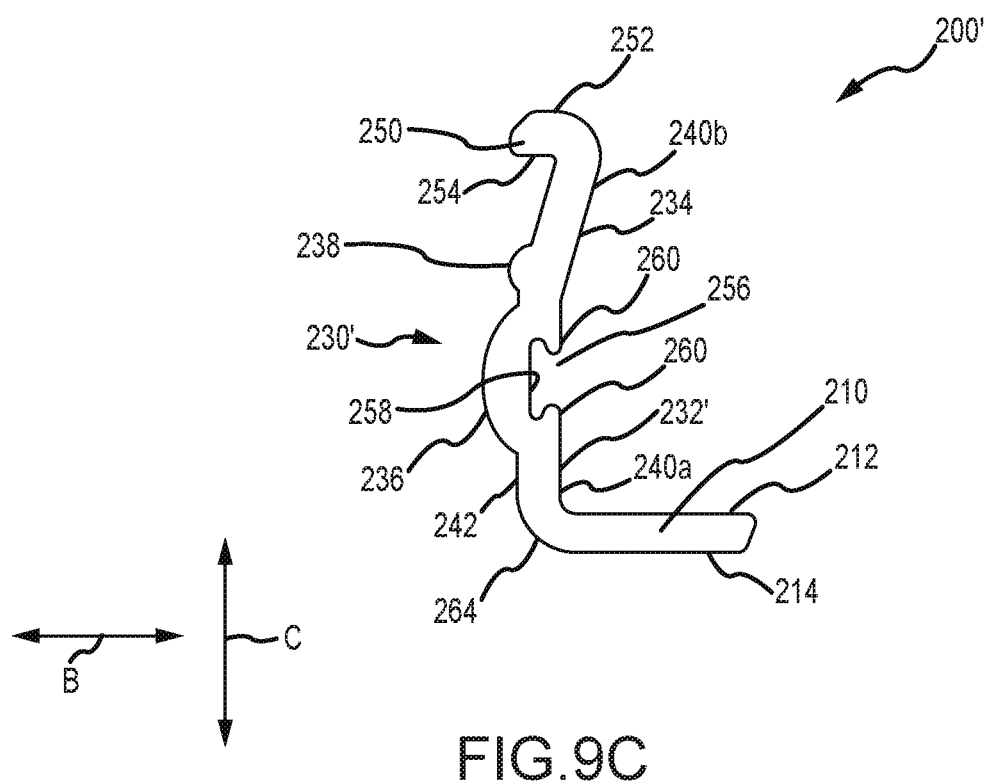
FIG. 9C is an end view of the insert used by the mounting assembly of FIG. 9A.

A variation of the mounting assembly 140 of FIGS. 8A and 8E-8G is presented in FIGS. 9A-9C and is identified by reference numeral 140'. The corresponding components of these two embodiments are identified by the same reference numerals. Those corresponding components that differ in at least some respect between these two embodiments are identified by "single prime" designation in FIGS. 9A-9C. Generally, the mounting assembly 140' uses the same mounting body 150, but in combination with a different insert 200'.

The primary difference between the insert 200 (FIGS. 8A and 8G) and the insert 200' (FIGS. 9A-9C) is that the insert 200' (FIGS. 9A-9C) includes an insert slot 256 on the first surface 240 of the second leg 230' that faces the first slot sidewall 162 of the mounting body 150, along with a channel 258 that is positioned "behind" this insert slot 256. In one configuration, the insert slot 256 is formed in the first section 232' of the second leg 230. Moreover, the insert slot 256 may be formed in an opposing relation to the first projection 236. The insert slot 256 extends to and intersects the channel 258, such that the insert slot 256 is located between the first slot sidewall 162 of the mounting body 150 and the channel 258 of the insert 200'. Optionally, the insert slot 256 and the channel 258 are substantially centered on a midpoint of the first projection 236.

The insert slot 256 and channel 258 may each optionally extend along the entire length of the insert 200' (in the longitudinal dimension—arrow A), with the insert slot 256 again being located between the channel 258 and the first slot sidewall 162 of the mounting body 150. Alternatively, the insert slot 256 and channel may extend along only a portion of the length of the insert 200'. The insert slot has a first width and the channel 258 has a second width that both extend in the vertical dimension (arrow C) with the second width of the channel 258 being wider than the first width of the insert slot 256. This defines a pair of cantilevers or tangs 260 (the space between the free ends of the cantilevers 260 defining the width of the insert slot 256). The insert slot 256 and channel 258 are positioned to receive the threaded fastener 270 when the threaded fastener 270 is advanced against the insert 200'. Moreover, as the threaded fastener 270 pushes against the cantilevers 260, a corresponding portion of the cantilevers 260 may deflect toward the channel 258, while the remaining portions of the cantilevers 260 remain in place. Engagement of the threaded fastener 270 with the cantilevers 260 and channel 258 in this manner beneficially helps to prevent the insert 200' and mounting assembly 140' from lifting off of a seam rib or standing seam on which the mounting assembly 140' is installed, and further beneficially helps to prevent the insert 200' and the mounting body 150 from sliding relative to each other, and more specifically helps to prevent the insert 200' from moving relative to the threaded fastener 270.

Figure 10A:
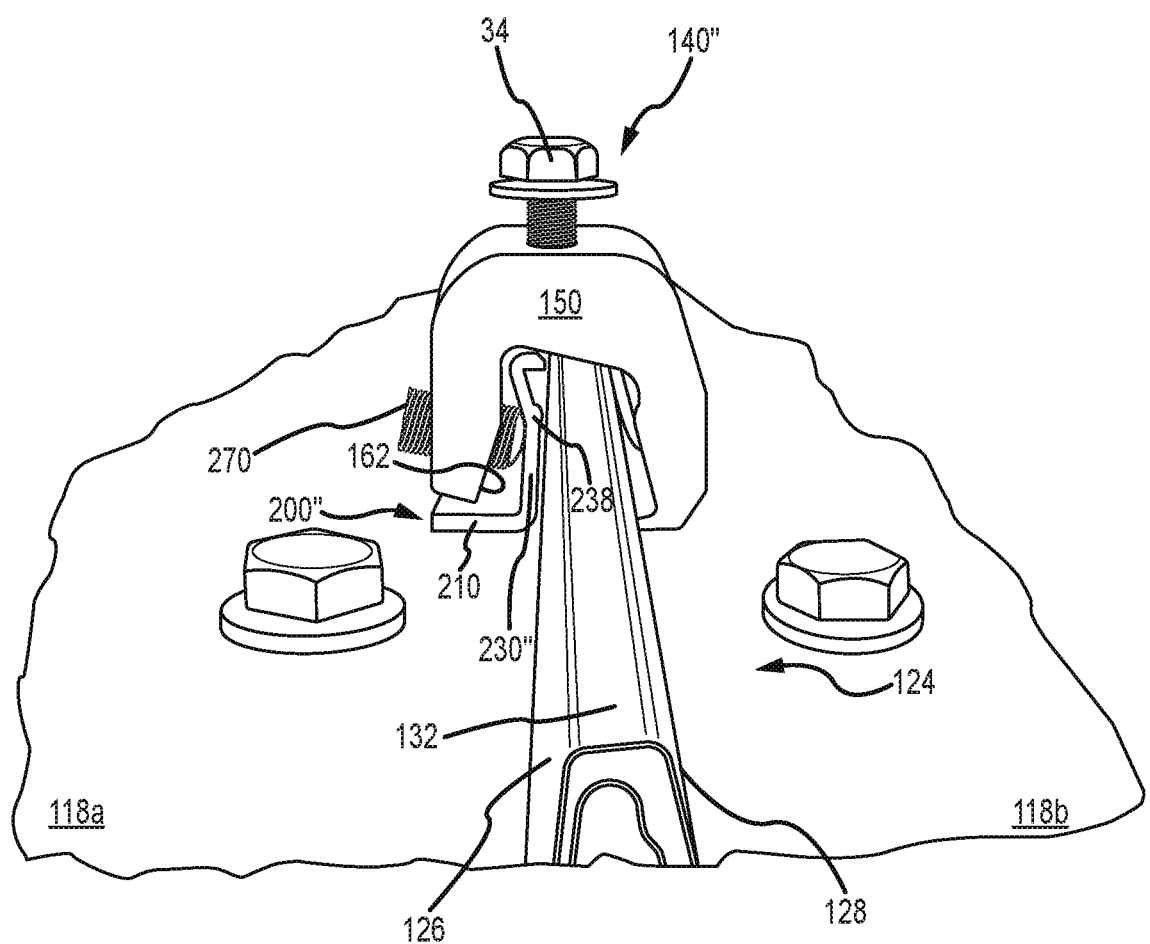
FIGS. 10A-10E illustrate a sequence for installing a mounting assembly on a nail strip seam rib in accordance with the embodiment of FIG. 8A.

One option for disposing a variation of the above-discussed mounting assembly 140 in the installed configuration on a nail strip seam rib 124 is illustrated with reference to FIGS. 10A-10E. The mounting assembly 140" uses the above-described mounting body 150 with yet another embodiment of an insert 200", namely one that includes a single projection or protrusion 238 on the second leg 230" of the insert 200". The mounting body 150 is positioned such that at least an upper section of the nail strip seam rib 124 is disposed within the slot 160 of the mounting body 150, such that the insert 200" is positioned between the first slot sidewall 162 (of the mounting body 150) and the first rib sidewall 126 (of the nail strip seam rib 124), and such that the nose 178 (of the mounting body 150) is at least aligned with the recess 130 (on the second rib sidewall 128 of the nail strip seam rib 124), all as shown in FIG. 10A. The lower surface 214 of the first leg 210 may be disposed on the base section 118a of the corresponding nail strip panel 112 such that the insert 200" is "standing" on the panel assembly 110, although such is not required.

Figure 10B:
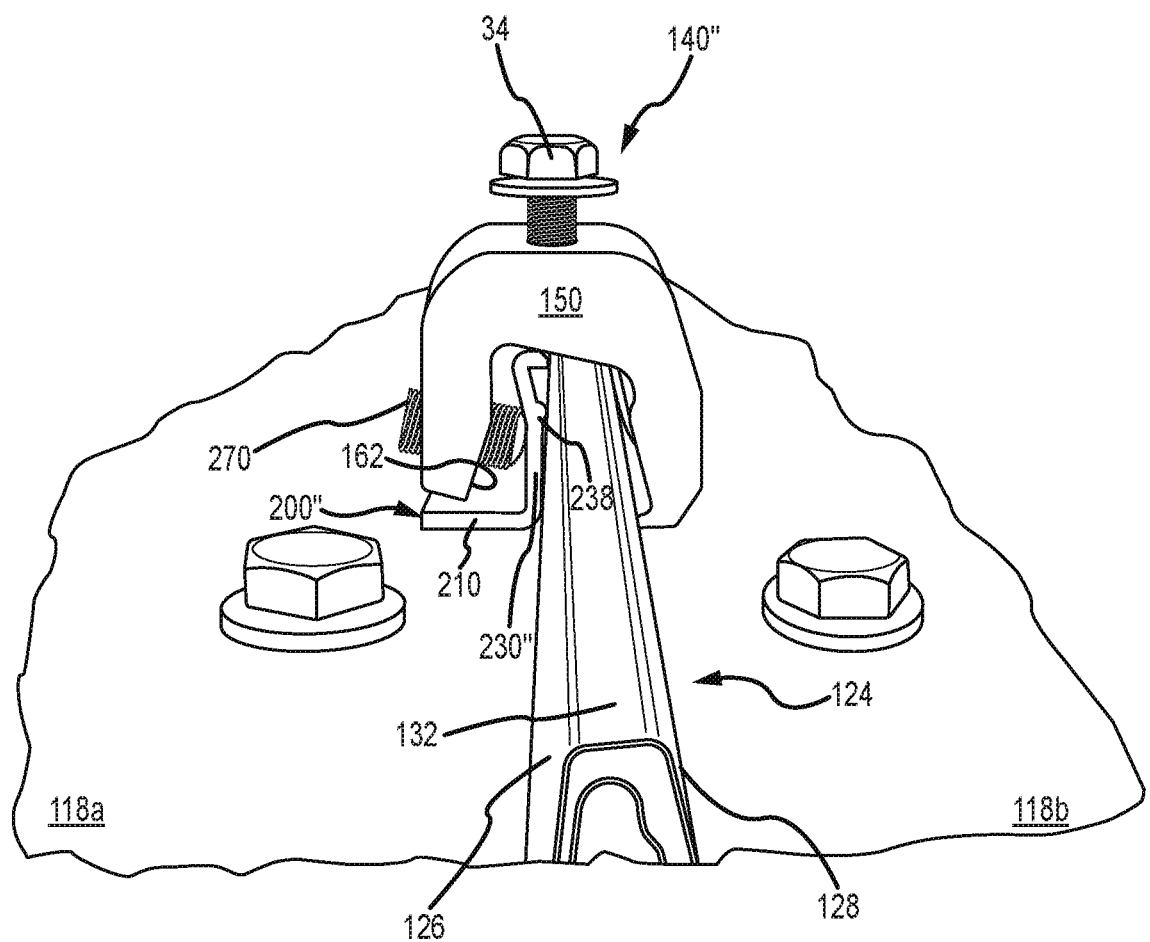
Figure 10C:
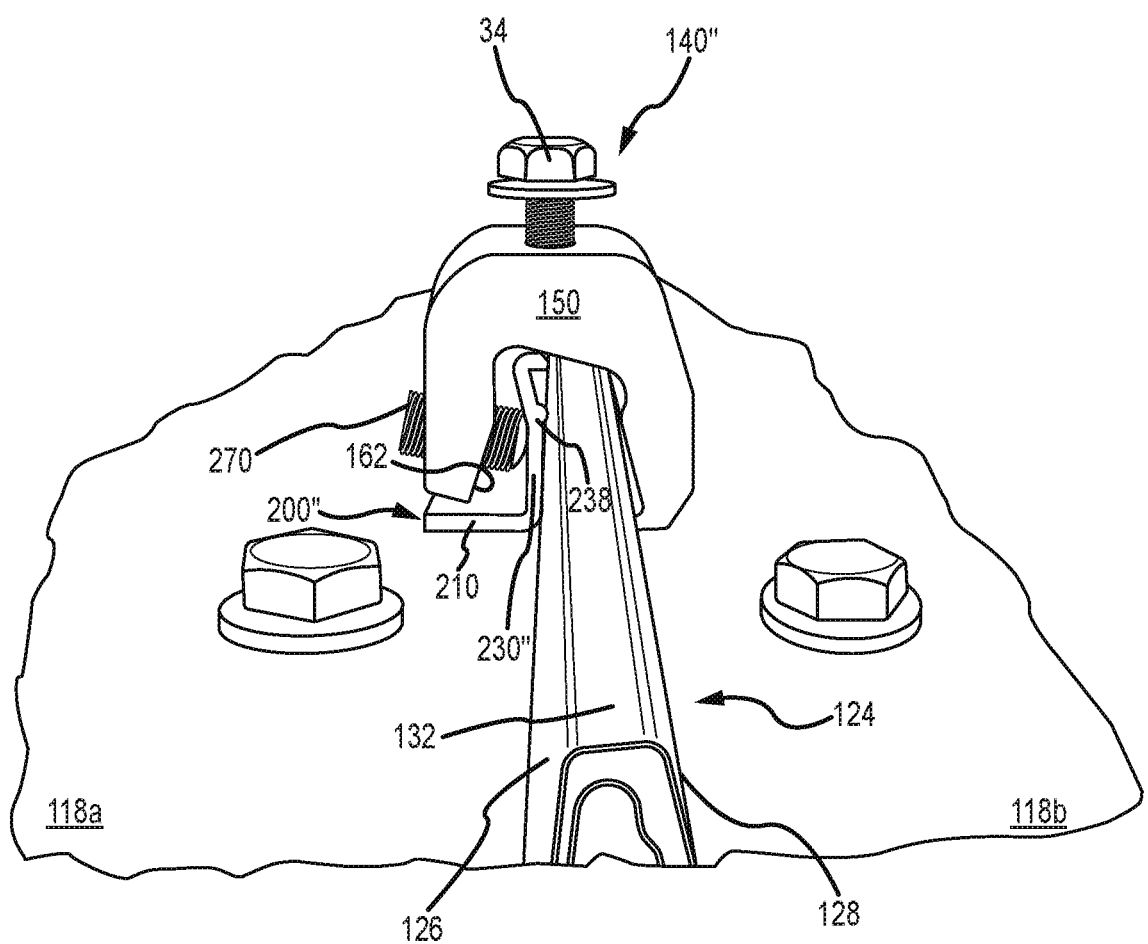
Figure 10D:
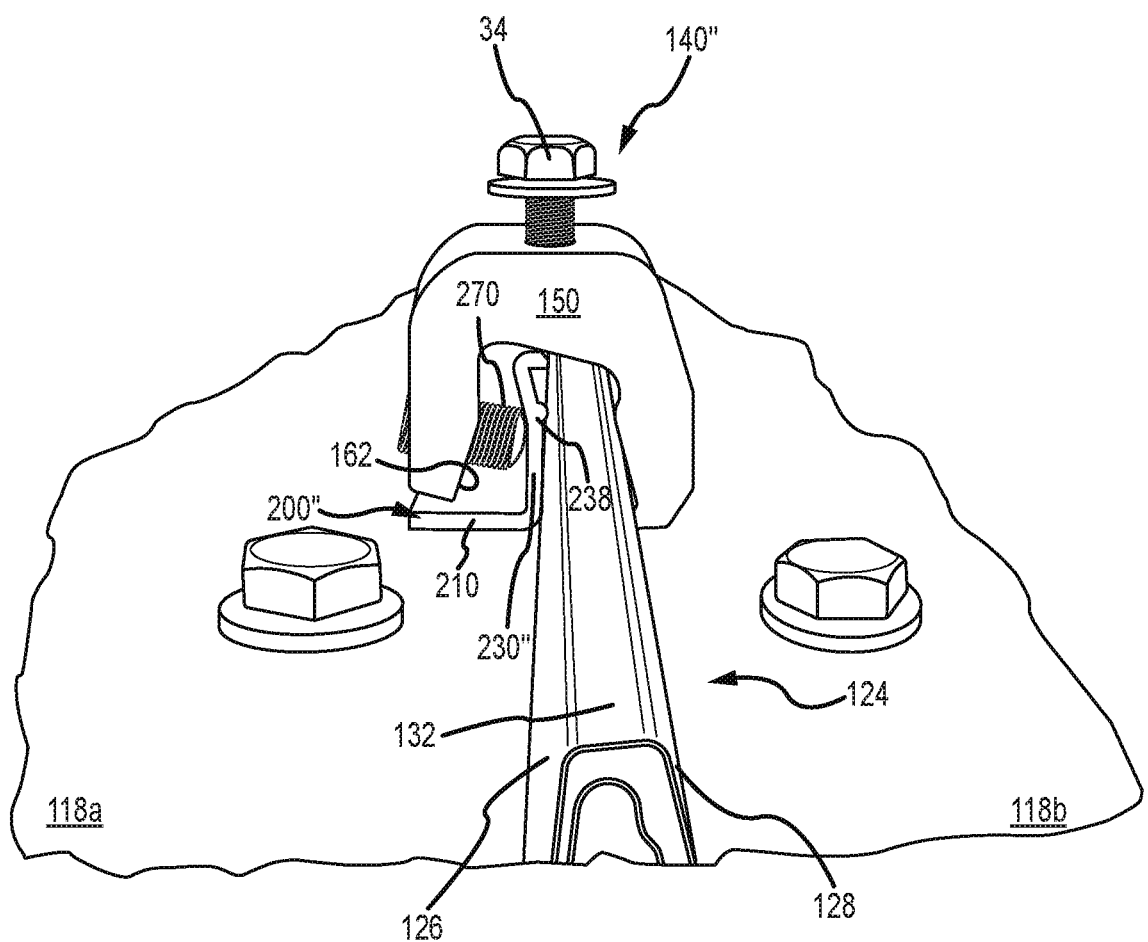
Figure 10E:
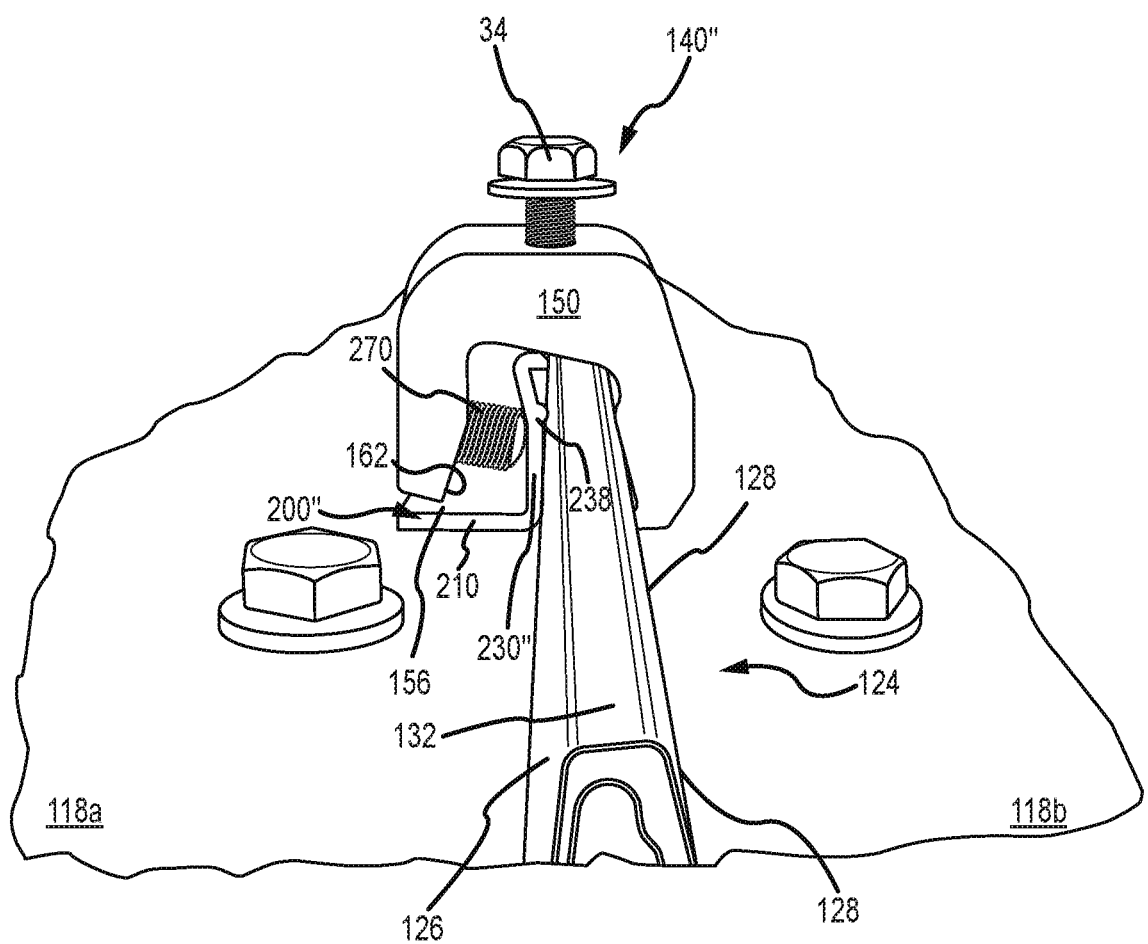

At least one threaded fastener 270 may be disposed within and threadably engaged with a corresponding hole 190 through the mounting body 150, and may be advanced relative to the mounting body 150 along the axis 272 to engage the second leg 230" of the insert 200" by the threaded fastener 270 extending into the slot 160 of the mounting body 150. This initial engagement may result in a clockwise rotation or pivoting (in the view shown in FIG. 10A) of the insert 200" relative to the mounting body 150 and about an axis that corresponds with the intersection between its first leg 210 and second leg 230", such that the second leg 230" of the insert 200" moves/pivots toward the nail strip seam rib 124 and as shown in FIG. 10B. Continued advancement of the seam rib fastener(s) 270 relative to the mounting body 150 and in the direction of the corresponding nail strip seam rib 124 (and with the insert 200" now being engaged with the first rib sidewall 126 of the nail strip seam rib 124), may pull the mounting body 150 toward the second rib sidewall 128 of the nail strip seam rib 124 to dispose the nose 178 of the mounting body 150 within the recess 130 on the second rib sidewall 128 of the nail strip seam rib 124 (FIG. 10C). In any case, continued advancement of the threaded fastener(s) 270 relative to the mounting body 150 and in the direction of the corresponding nail strip seam rib 124 (and with the insert 200" remaining engaged with the first rib sidewall 126 of the nail strip seam rib 124 and with the nose 178 of the mounting body 150 being within the recess 130 on the second sidewall 128 of the nail strip seam rib 124), should move the insert 200" toward the second slot sidewall 172 of the mounting body 150 and which should cause the insert 200" to deform a corresponding portion of the first rib sidewall 126 of the nail strip seam rib 124 (the portion engaged by the projection 238) and as shown in FIG. 10D. This may direct a portion of the nail strip seam rib 124 toward the second section 176 of the second slot sidewall 172 of the mounting body 140 (e.g., into a recess defined by the second section 176 of the second slot sidewall 172 of the mounting body 150). Also note the change of position in the lateral dimension of the first leg 210 of the insert 200" between FIG. 10C and FIG. 10D. FIG. 10E illustrates the installed configuration for the mounting assembly 140" on the nail strip seam rib 124. At least part of the first leg 210 of the insert 200" remains under the first bottom surface 156 of the mounting body 150 in the installed configuration illustrated in FIG. 10E (although the first leg 210 of the insert 200" is spaced from the first bottom surface 156 of the mounting body 150 in the vertical dimension—arrow C).

Figure 11A:
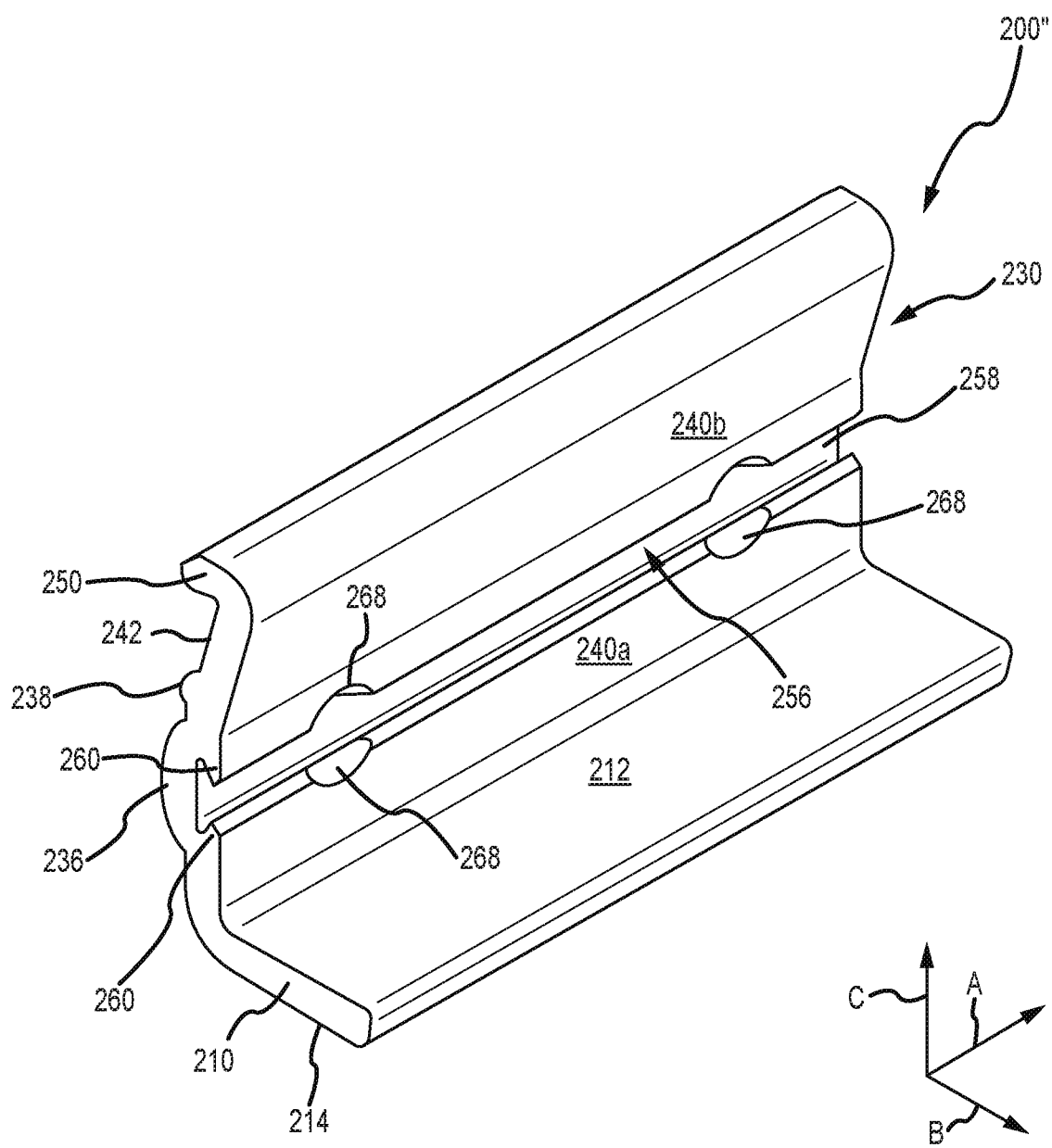
FIG. 11A is a perspective view of another variation of an insert of the present disclosure which includes dimples associated with an insert slot.
Figure 11B:
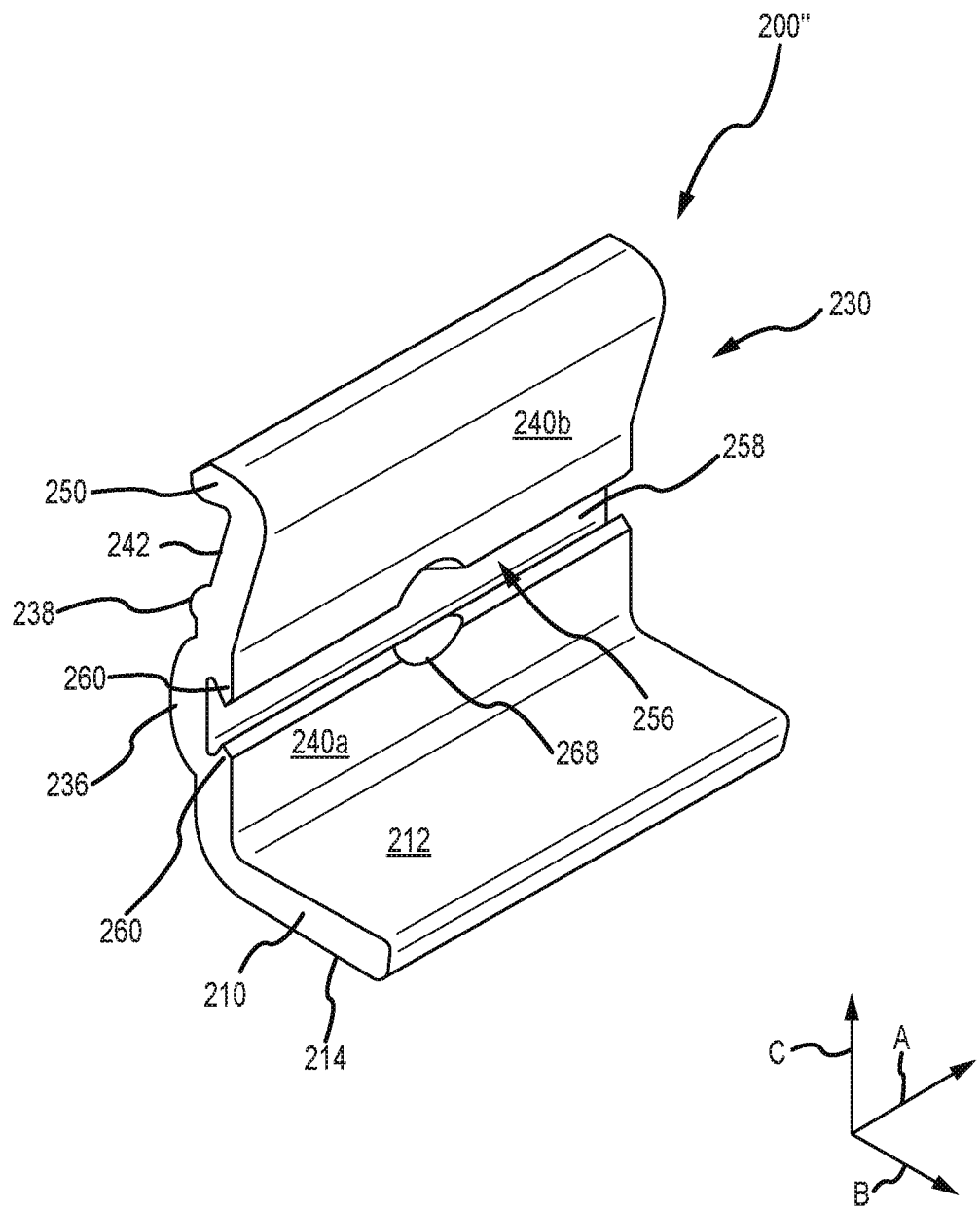
FIG. 11B is a perspective view of an insert similar to the insert of FIG. 11A and which includes a single dimple.

FIGS. 11A-11B illustrate inserts 200" and 200''', respectively, which may be substituted for the inserts 200 and 200' in the mounting assemblies 140 of all embodiments described herein. The inserts 200" and 200''' are substantially similar to the inserts 200-200', except that the insert 200" is provided with a pair of dimples 268 in the cantilevers 260 and the insert 200''' is provided with a single dimple 268 in the cantilevers 260. The dimples 268 in both the insert 200" and the insert 200''' are positioned opposite the threaded hole(s) 190 in the mounting body 150, so that when a threaded fastener 270 is advanced through a threaded hole 190, it will contact the insert 200" or 200''' at the dimple 268. In addition to assisting with proper alignment of the inserts 200" and 200''' within the mounting body 150, the inclusion of dimples 268 in the inserts 200" and 200' beneficially reduces the likelihood that an insert 200" or 200''' will slide relative to the mounting body 150 along the direction of a nail strip seam rib 124 during and after installation of a mounting assembly that utilizes the insert 200" or 200'''.

The dimples may be formed by punching or otherwise, and may be formed after the inserts 200" and 200''' are otherwise formed. For example, in some embodiments, the inserts 200" and 200''' (except for the dimple(s) 268) may be formed by extrusion, after which the dimple(s) 268 may be formed by punching. Alternatively, in another embodiment, the dimple(s) 268 can be formed by removing material from the inserts, such as by grinding, milling or drilling.

The dimple(s) 268 can be substantially centered on the axis or centerline 272 of the threaded hole 190. The dimple 268 is positioned on the second leg 230 of the insert 200 in an opposing relationship to the first projection 236. Optionally, a diameter of the dimple 268 is approximately equal to a diameter of the threaded fastener 270. For example, the diameter of the dimple 268 may be approximately 0.36 inches. A diameter of the threaded hole 190 is less than approximately 0.5 inches, or approximately 0.375 inches.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A mounting assembly disposable on a rib of a nail strip, comprising:
   a mounting body, comprising:
      a top surface;
      a first bottom surface and a second bottom surface, the first and second bottom surfaces spaced from the top surface in a vertical dimension;
      a first side surface and a second side surface that are spaced from one another in a lateral dimension;
      a pair of ends that are spaced from one another in a longitudinal dimension;
      a slot to receive the rib and which extends between the first and second bottom surfaces toward the top surface;
      a threaded hole that extends through the first side surface along a first axis to the slot, the first axis oriented at an oblique angle to a first reference plane;
      an aperture that extends through the top surface along a second axis, the second axis oriented approximately parallel to a second reference plane that is perpendicular to the first reference plane; and
   an insert that is at least partially disposable in the slot, comprising:
      a first leg extending in a first direction;
      a second leg extending from the first leg and comprising:
         a first surface;
         a second surface opposite to the first surface; and
         an insert slot in the first surface; and
      a third leg extending from the second leg in a second direction that is different than the first direction.

2. The mounting assembly of claim 1, wherein the first leg, the second leg, and the third leg are each disposed in different orientations relative to one another, wherein the first leg extends from the first surface of the second leg, and wherein the third leg extends from the second surface of the second leg.

3. The mounting assembly of claim 1, wherein an upper surface of the first leg is positioned proximate to the first bottom surface of the mounting body when the insert is disposed in the slot, and wherein the first surface of the second leg has a profile that at least substantially matches a profile of a first slot sidewall of the slot.

4. The mounting assembly of claim 1, further comprising a threaded fastener disposable in the threaded hole to engage the first surface of the insert.

5. The mounting assembly of claim 1, wherein the insert slot is of a first width and the second leg of the insert further comprises:
  a channel disposed between the insert slot and the second surface of the second leg, the channel having a second width, wherein the insert slot intersects the channel and the second width of the channel is wider than the first width of the insert slot to define a pair of deflectable cantilevers that are alignable with the threaded hole when the insert is disposed in the slot.

6. The mounting assembly of claim 5, wherein the second leg of the insert further comprises:
  a dimple in the deflectable cantilevers that is alignable with the threaded hole such that when a threaded fastener is advanced through the threaded hole the dimple is engaged by a distal end of the threaded fastener; or
  a first protrusion that extends from the second surface opposite to the insert slot, wherein the first protrusion is alignable with the threaded hole.

7. The mounting assembly of claim 1, wherein the insert further comprises a first endwall spaced from a second endwall in the longitudinal dimension, and wherein the insert slot extends in the longitudinal dimension from the first endwall to the second endwall.

8. The mounting assembly of claim 7, wherein the insert slot comprises a first open end extending through the first endwall and a second open end extending through the second endwall.

9. The mounting assembly of claim 1, wherein the slot comprises:
  a first slot sidewall that extends from the first bottom surface toward the top surface, wherein the threaded hole extends through the first slot sidewall;
  a second slot sidewall spaced from the first slot sidewall and that extends from the second bottom surface toward the top surface; and
  a slot base that extends between the first slot sidewall and the second slot sidewall.

10. The mounting assembly of claim 9, wherein:
  the second slot sidewall comprises a first section and a second section, with the second section of the second slot sidewall being located between the first section of the second slot sidewall and the slot base in the vertical dimension, and wherein the first and second sections of the second slot sidewall are disposed in different orientations; and
  the first slot sidewall comprises a first section and a second section, with the second section of the first slot sidewall being located between the first section of the first slot sidewall and the slot base in the vertical dimension, and wherein the first section of the first slot sidewall, the second section of the first slot sidewall, and the first section of the second slot sidewall are each disposed in different orientations.

11. The mounting assembly of claim 9, wherein the second slot sidewall comprises a nose that extends from a lower end of the second slot sidewall, relative to the vertical dimension, and in a direction that the first slot sidewall is spaced from the second slot sidewall.

12. The mounting assembly of claim 1, wherein the insert slot has a first width measured in the vertical dimension, the first width being less than a diameter of the threaded hole.

13. The mounting assembly of claim 1, wherein the first axis of the threaded hole is oriented at an angle of between about 5° and about 25° relative to the first reference plane, wherein at least a portion of the top surface is parallel to the first reference plane, and wherein when a threaded fastener is rotated into the threaded hole, a distal end of the threaded fastener advances in converging relation to the first reference plane.

14. A mounting assembly disposable on a rib of a nail strip positioned on a building surface, comprising:
  a mounting body, comprising:
    a top surface;
    a first side surface spaced from a second side surface in a lateral dimension;
    a first end spaced from a second end in a longitudinal dimension;
    a slot that extends between the first and second ends and which is defined by a first slot sidewall, a second slot sidewall, and a slot base that extends between the first slot sidewall and the second slot sidewall; and
    a threaded hole that extends through the first side surface and the first slot sidewall to the slot, wherein the mounting body is of a one-piece construction; and
  an insert that is at least partially disposable in the slot, comprising:
    a first endwall spaced from a second endwall in the longitudinal dimension;
    a first surface that faces the first slot sidewall when the insert is positioned within the slot;
    a second surface opposite the first surface and that faces the second slot sidewall when the insert is positioned within the slot; and
    an insert slot in the first surface that extends in the longitudinal dimension from the first endwall to the second endwall.

15. The mounting assembly of claim 14, wherein:
  the second slot sidewall comprises:
    a first section that is generally planar and that extends in a direction of the slot base; and
    a second section located between the first section of the second slot sidewall and the slot base in a vertical dimension, wherein the second section of the second slot sidewall is arcuate in an end view of the mounting body; and
  the first slot sidewall comprises:
    a first section that is generally planar and that extends in a direction of the slot base; and
    a second section located between the first section of the first slot sidewall and the slot base in the vertical dimension, wherein the second section of the first slot sidewall is generally planar and disposed in a different orientation than the first sections of the first and second slot sidewalls.

16. The mounting assembly of claim 14, wherein the insert slot comprises:
  a first open end extending through the first endwall;

a second open end extending through the second endwall; and a first width measured in a vertical dimension, the first width being less than a diameter of the threaded hole.

17. The mounting assembly of claim 14, wherein the threaded hole extends along a first axis that is oriented at an oblique angle to a first reference plane defined by the lateral dimension and the longitudinal dimension.

18. The mounting assembly of claim 17, further comprising an aperture that extends through the top surface along a second axis, the second axis oriented parallel to a second reference plane that is perpendicular to the first reference plane.

19. The mounting assembly of claim 14, wherein the insert comprises a first leg, a second leg, and a third leg, and wherein:
   the first leg extends in a first direction away from a first surface of the second leg;
   the second leg extends in a second direction between the first and third legs and the second leg includes the insert slot; and
   the third leg extends in a third direction away from a second surface of the second leg, the third direction being different than the first direction, wherein when the insert is positioned within the slot the third leg is positioned adjacent to the slot base.

20. A mounting assembly disposable on a rib of a building surface, comprising:
   a one-piece mounting body with:
      a top surface;
      a first side surface spaced from a second side surface in a lateral dimension;
      a first end spaced from a second end in a longitudinal dimension;
      a slot that extends between the first and second ends and which is defined by a first slot sidewall, a second slot sidewall, and a slot base that extends between the first slot sidewall and the second slot sidewall;
      a bottom surface spaced from the top surface in a vertical dimension, the bottom surface including a first bottom surface spaced from a second bottom surface by the slot; and
      a threaded hole that extends through the first side surface and the first slot sidewall to the slot;
   an insert that is at least partially disposable in the slot and which includes:
      a first leg disposable adjacent to the first bottom surface;
      a second leg disposable adjacent to the first slot sidewall, wherein the second leg includes an insert slot that extends from a first endwall to a second endwall of the insert; and
      a third leg disposable adjacent to the slot base; and
   a threaded fastener disposable in the threaded hole to engage the insert.

* * * * *